United States Patent
Hayashi et al.

(10) Patent No.: US 12,265,666 B2
(45) Date of Patent: Apr. 1, 2025

(54) FACILITATING AMBIENT COMPUTING USING A RADAR SYSTEM

(71) Applicant: Google LLC, Mountain View, CA (US)

(72) Inventors: Eiji Hayashi, Cupertino, CA (US); Jaime Lien, Mountain View, CA (US); Nicholas Edward Gillian, Palo Alto, CA (US); Andrew C. Felch, Palo Alto, CA (US); Jin Yamanaka, Mountain View, CA (US); Blake Charles Jacquot, San Carlos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/554,337

(22) PCT Filed: Apr. 8, 2022

(86) PCT No.: PCT/US2022/071648
§ 371 (c)(1),
(2) Date: Oct. 6, 2023

(87) PCT Pub. No.: WO2022/217290
PCT Pub. Date: Oct. 13, 2022

(65) Prior Publication Data
US 2024/0231505 A1    Jul. 11, 2024

Related U.S. Application Data

(60) Provisional application No. 63/173,082, filed on Apr. 9, 2021.

(51) Int. Cl.
*G06F 3/01*    (2006.01)
*H04L 27/10*    (2006.01)

(52) U.S. Cl.
CPC ............ *G06F 3/017* (2013.01); *H04L 27/103* (2013.01)

(58) Field of Classification Search
CPC ....... G06F 3/017; H04L 27/103; G01S 7/417; G06N 20/00
See application file for complete search history.

(56) References Cited

U.S. PATENT DOCUMENTS 10,481,696 B2 *  11/2019  Molchanov ............. B60R 11/04
11,442,550 B2 *   9/2022  Qiu ......................... G01S 7/417
(Continued)

FOREIGN PATENT DOCUMENTS

| EP | 3651055 | 5/2020 |
|----|---------|--------|
| WO | 2022217288 | 10/2022 |

(Continued)

OTHER PUBLICATIONS

"International Search Report and Written Opinion", Application No. PCT/US2022/071646, Jul. 29, 2022, 10 pages.

(Continued)

*Primary Examiner* — Xuemei Zheng
(74) *Attorney, Agent, or Firm* — Colby Nipper PLLC

(57) ABSTRACT

Techniques and apparatuses are described that facilitate ambient computing using a radar system. Compared to other smart devices that rely on a physical user interface, a smart device with a radar system can support ambient computing by providing an eye-free interaction and less cognitively demanding gesture-based user interface. The radar system can be designed to address a variety of challenges associated with ambient computing, including power consumption, environmental variations, background noise, size, and user privacy. The radar system uses an ambient-computing machine-learned module to quickly recognize gestures performed by a user up to at least two meters away. The ambient-computing machine-learned module is trained to filter background noise and have a sufficiently low false positive rate to enhance the user experience.

20 Claims, 27 Drawing Sheets

(56) References Cited

U.S. PATENT DOCUMENTS

| | | | | |
|---|---|---|---|---|
| 2018/0329049 | A1* | 11/2018 | Amihood | G01S 13/88 |
| 2019/0383903 | A1* | 12/2019 | Chao | G01S 7/36 |
| 2020/0300970 | A1 | 9/2020 | Nguyen et al. | |
| 2020/0302210 | A1* | 9/2020 | Santra | G01S 13/878 |
| 2021/0026454 | A1 | 1/2021 | Hong et al. | |
| 2022/0196798 | A1* | 6/2022 | Chen | G01S 13/89 |
| 2022/0269926 | A1* | 8/2022 | Pavlov | G06N 3/044 |
| 2023/0067322 | A1* | 3/2023 | Ding | G01S 13/726 |
| 2023/0108140 | A1* | 4/2023 | Stadelmayer | G06V 40/28 |
| | | | | 342/104 |

FOREIGN PATENT DOCUMENTS

| | | |
|---|---|---|
| WO | 2022217289 | 10/2022 |
| WO | 2022217290 | 10/2022 |

OTHER PUBLICATIONS

"International Search Report and Written Opinion", Application No. PCT/US2022/071647, Aug. 4, 2022, 14 pages.

"International Search Report and Written Opinion", Application No. PCT/US2022/071648, Aug. 4, 2022, 14 pages.

Ehrnsperger, et al., "Real-Time Gesture Detection Based on Machine Learning Classification of Continuous Wave Radar Signals", Dec. 17, 2020, 13 pages.

Lien, et al., "Soli: Ubiquitous Gesture Sensing with Millimeter Wave Radar", ACM Trans. Graph., vol. 35, No. 4, Article 142, Jul. 1, 2016, 19 pages.

"International Preliminary Report on Patentability", Application No. PCT/US2022/071647, Oct. 10, 2023, 10 pages.

"International Preliminary Report on Patentability", Application No. PCT/US2022/071648, Oct. 10, 2023, 10 pages.

"International Preliminary Report on Patentability", Application No. PCT/US2022/071646, Oct. 10, 2023, 7 pages.

* cited by examiner

FACILITATING AMBIENT COMPUTING USING A RADAR SYSTEM

RELATED APPLICATION(S)

Background

This application is a national stage entry of International Application No. PCT/US2022/071648, filed Apr. 8, 2022, which claims the benefit of U.S. Provisional Application No. 63/173,082, filed Apr. 9, 2021, the disclosures of which are incorporated herein by reference in their entirety.

Background

As smart devices become more ubiquitous, users incorporate them into everyday life. A user, for example, may use one or more smart devices to get daily weather and traffic information, control a temperature of a home, answer a doorbell, turn on or off a light, and/or play background music. Interacting with some smart devices, however.

can be cumbersome and inefficient. A smart device, for instance, can have a physical user interface that may require a user to navigate through one or more prompts by physically touching the smart device. In this case, the user has to devote attention away from other primary tasks to interact with the smart device, which can be inconvenient and disruptive.

SUMMARY

Techniques and apparatuses are described that facilitate ambient computing using a radar system. Compared to other smart devices that rely on a physical user interface, a smart device with a radar system can support ambient computing by providing an eye-free interaction and less cognitively demanding gesture-based user interface. The radar system can be designed to address a variety of challenges associated with ambient computing, including power consumption, environmental variations, background noise, size, and user privacy. The radar system uses an ambient-computing machine-learned module to quickly recognize gestures performed by a user up to at least two meters away. The ambient-computing machine-learned module is trained to filter background noise and have a sufficiently low false positive rate to enhance the user experience.

Aspects described below include a method performed by a smart device with a radar system. The method includes transmitting a radar transmit signal comprising multiple frames. Each frame of the multiple frames comprises multiple chirps. The method also includes receiving a radar receive signal comprising a version of the radar transmit signal that is reflected by a user. The method additionally includes generating, based on the radar receive signal, complex radar data for each frame of the multiple frames. The method further includes providing the complex radar data to a machine-learned module. The method also includes generating, by a first stage of the machine-learned module and based on the complex radar data, a frame summary for each frame of the multiple frames. The method additionally includes concatenating, by a second stage of the machine-learned module, multiple frame summaries to form a concatenated set of frame summaries. The method further includes generating, by the second stage the machine-learned module and based on the concatenated set of frame summaries, probabilities associated with multiple gestures. The method also includes determining, based on the probabilities associated with the multiple gestures, that the user performed a gesture of the multiple gestures.

Aspects described below include a method performed by a smart device with a radar system. The method includes transmitting a radar transmit signal comprising at least one gesture frame. The gesture frame comprises multiple feature frames. Each feature frame of the multiple feature frames comprises multiple radar frames. Each radar frame of the multiple radar frames is associated with a chirp. Each chirp comprises a portion of the radar transmit signal that is modulated in frequency. The method also includes receiving, using multiple receive channels, a radar receive signal comprising a version of the radar transmit signal that is reflected by a user. The method additionally includes generating, based on the radar receive signal, complex radar data for each feature frame of the multiple feature frames. The complex radar data comprises complex numbers having magnitude and phase information. Each complex number of the complex numbers is associated with a range interval, a Doppler-frequency interval, and a receive channel of the multiple receive channels. The method further includes providing the complex radar data to a machine-learned module. The machine-learned module has a first stage associated with a frame model and a second stage associated with a temporal model. The method also includes generating, by the frame model of the machine-learned module, a frame summary for each feature frame of the multiple feature frames. The frame summary is a one-dimensional representation of the complex radar data associated with a corresponding feature frame. The method additionally includes concatenating, by the temporal model of the machine-learned module and for the at least one gesture frame, frame summaries of the multiple feature frames to form a concatenated set of frame summaries. The method further includes generating, by the temporal model of the machine-learned module and based on the concatenated set of frame summaries, probabilities respectively associated with multiple gestures. The method also includes determining, based on the probabilities associated with the multiple gestures, that the user performed a gesture of the multiple gestures.

Aspects described below also include a system comprising a radar system and a processor. The system is configured to perform any of the described methods.

Aspects described below include a computer-readable storage medium comprising computer-executable instructions that, responsive to execution by a processor, cause a system to perform any one of the described methods.

Aspects described below also include a smart device comprising a radar system and a processor. The smart device is configured to perform any of the described methods.

Aspects described below also include a system with means for performing ambient computing.

BRIEF DESCRIPTION OF DRAWINGS

Apparatuses for and techniques that facilitate ambient computing using a radar system are described with reference to the following drawings. The same numbers are used throughout the drawings to reference like features and components:

FIG. 1-2 illustrates example swipe gestures associated with ambient computing;

FIG. 1-3 illustrates an example tap gesture associated with ambient computing;

FIG. 2 illustrates an example implementation of a radar system as part of a smart device;

FIG. 3-1 illustrates operation of an example radar system;

FIG. 3-2 illustrates an example radar framing structure for ambient computing;

FIG. 6-1 illustrates an example hardware-abstraction module for ambient computing;

FIG. 6-2 illustrates example complex radar data generated by a hardware-abstraction module for ambient computing;

FIG. 7-1 illustrates examples of an ambient-computing machine-learned module and a gesture debouncer for ambient computing;

FIG. 7-2 illustrates an example graph of probabilities across multiple gesture frames for ambient computing;

FIG. 8-1 illustrates a first example frame model for ambient computing using a radar system;

FIG. 8-2 illustrates a first example temporal model for ambient computing using a radar system;

FIG. 9-1 illustrates a second example frame model for ambient computing using a radar system;

FIG. 9-2 illustrates example residual blocks for ambient computing using a radar system;

FIG. 9-3 illustrates a second example temporal model for ambient computing using a radar system;

FIG. 10-1 illustrates example environments in which data can be collected for training a radar system to perform ambient computing;

FIG. 10-2 illustrates an example flow diagram for collecting positive recordings for training a radar system to perform ambient computing;

FIG. 10-3 illustrates an example flow diagram for refining timings of gesture segments within positive recordings;

DETAILED DESCRIPTION

Figure 1:
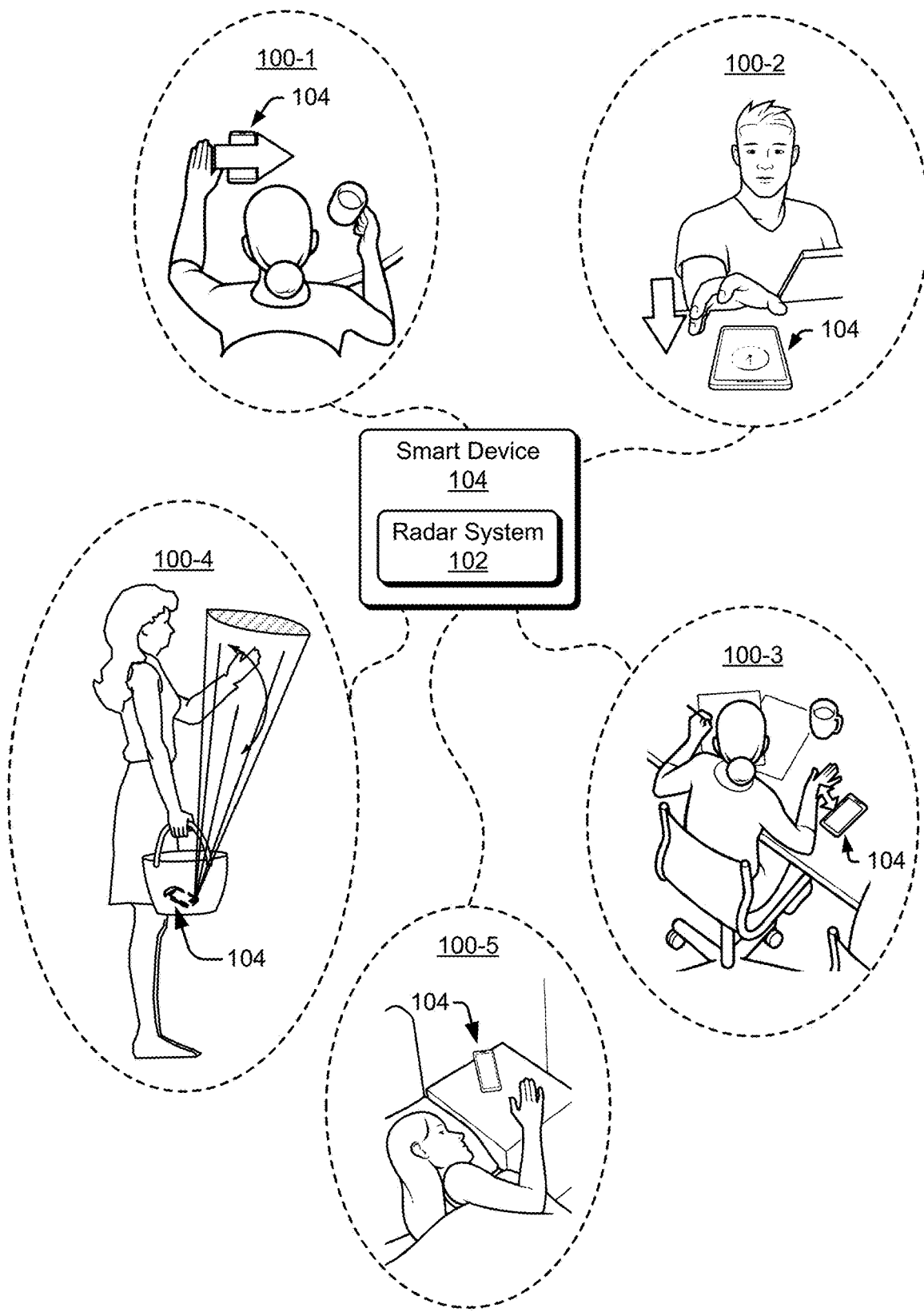
FIG. 1-1 illustrates example environments in which ambient computing using a radar system can be implemented.

As smart devices become more ubiquitous, users incorporate them into everyday life. A user, for example, may use one or more smart devices to get daily weather and traffic information, control a temperature of a home, answer a doorbell, turn on or off a light, and/or play background music. Interacting with some smart devices, however, can be cumbersome and inefficient. A smart device, for instance, can have a physical user interface that may require a user to navigate through one or more prompts by physically touching the smart device. In this case, the user has to devote attention away from other primary tasks to interact with the smart device, which can be inconvenient and disruptive.

To address this problem, some smart devices support ambient computing, which enables a user to interact with the smart device in a non-physical and less cognitively demanding way compared to other interfaces that require physical touch and/or the user's visual attention. With ambient computing, the smart device seamlessly exists in the surrounding environment and provides the user access to information and services while the user performs a primary task, such as cooking, cleaning, driving, talking with people, or reading a book.

There are several challenges, however, to incorporating ambient computing into a smart device. These challenges include power consumption, environmental variations, background noise, size, and user privacy. Power consumption becomes a challenge as one or more sensors of the smart device that support ambient computing have to be in a perpetual "on state" in order to detect an input from the user, which can occur at any time. For smart devices that rely on battery power, it can be desirable to use sensors that utilize relatively low amounts of power to ensure the smart device can operate for one or more days.

A second challenge is the various environments in which the smart device may perform ambient computing. In some cases, natural changes occur in a given environment based on the progression of time (e.g., from day to night, or from summer to winter). These natural changes can lead to temperature fluctuations and/or changes in lighting conditions. As such, it is desirable for the smart device to be able to perform ambient computing across such environmental variations.

A third challenge involves background noise. Smart devices that perform ambient computing can experience a larger quantity of background noise as they operate in the perpetual "on state" compared to other devices that enable user interactions in response to a touch-based input. For smart devices with a voice user interface, the background noise can include background conversations. For other smart devices with a gesture-based user interface, this can include other movements that are associated with everyday tasks. To avoid annoying a user, it is desirable for the smart device to filter out this background noise and reduce a probability of incorrectly recognizing background noise as a user input.

A fourth challenge is size. It is desirable for the smart device to have a relatively small footprint. This enables the smart device to be embedded within other objects or occupy less space on a counter or wall. A fifth challenge is user privacy. As smart devices may be used in personal spaces (e.g., including bedrooms, living rooms, or workplaces), it is desirable to incorporate ambient computing in a way that protects the user's privacy.

To address these challenge, techniques are described that facilitate ambient computing using a radar system. The radar system can be integrated within power-constrained and space-constrained smart devices. In an example implementation, the radar system consumes twenty milliwatts of power or less and has a footprint of four millimeters by six millimeters. The radar system can also be readily housed behind materials that do not substantially affect radio-frequency signal propagation, such as plastic, glass, or other non-metallic materials. Additionally, the radar system is less susceptible to temperature or lighting variations compared to an infrared sensor or a camera. Furthermore, the radar sensor does not produce a distinguishable representation of a user's spatial structure or voice. In this way, the radar sensor can provide better privacy protection compared to other image-based sensors.

To support ambient computing, the radar system uses an ambient-computing machine-learned module, which is designed to operate with limited power and limited computational resources. The ambient-computing machine-learned module enables the radar system to quickly recognize gestures performed by a user at distance of at least two meters away. This allows the user flexibility to interact with the smart device while performing other tasks at farther distances away from the smart device. Also, the ambient-computing machine-learned module is trained to filter background noise and have a sufficiently low false positive rate to enhance the user experience.

Operating Environment

FIG. 1-1 is an illustration of example environments 100-1 to 100-5 in which techniques using, and an apparatus including, ambient computing using a radar system may be embodied. In the depicted environments 100-1 to 1005, a smart device 104 includes a radar system 102 capable of performing ambient computing. Although the smart device 104 is shown to be a smartphone in environments 100-1 to 100-5, the smart device 104 can generally be implemented as any type of device or object, as further described with respect to FIG. 2.

In the environments 100-1 to 100-5, a user performs different types of gestures, which are detected by the radar system 102. In some cases, the user performs a gesture using an appendage or body part. Alternatively, the user can also perform a gesture using a stylus, a hand-held object, a ring, or any type of material that can reflect radar signals.

In environment 100-1, the user makes a scrolling gesture by moving a hand above the smart device 104 along a horizontal dimension (e.g., from a left side of the smart device 104 to a right side of the smart device 104). In the environment 100-2, the user makes a reaching gesture, which decreases a distance between the smart device 104 and the user's hand. The user in environment 100-3 makes a tap gesture by moving a hand towards and away from the smart device 104. In the environment 100-4, the smart device 104 is stored within a purse, and the radar system 102 provides occluded-gesture recognition by detecting gestures that are occluded by the purse. In the environment 100-5, the user makes a gesture to initiate a timer or silence an alarm.

The radar system 102 can also recognize other types of gestures or motions not shown in FIG. 1. Example types of gestures include a knob-turning gesture in which a user curls their fingers to grip an imaginary doorknob and rotate their fingers and hand in a clockwise or counter-clockwise fashion to mimic an action of turning the imaginary doorknob. Another example type of gesture includes a spindle-twisting gesture, which a user performs by rubbing a thumb and at least one other finger together. The gestures can be two-dimensional, such as those used with touch-sensitive displays (e.g., a two-finger pinch, a two-finger spread, or a tap). The gestures can also be three-dimensional, such as many sign-language gestures, e.g., those of American Sign Language (ASL) and other sign languages worldwide. Upon detecting each of these gestures, the smart device 104 can perform an action, such as display new content, play music, move a cursor, activate one or more sensors, open an application, and so forth. In this way, the radar system 102 provides touch-free control of the smart device 104.

Some gestures can be associated with a particular direction used for navigating visual or audible content presented by the smart device 104. These gestures may be performed along a horizontal plane that is substantially parallel to the smart device 104 (e.g., substantially parallel to a display of the smart device 104). For instance, a user can perform a first swipe gesture that travels from a left side of the smart device 104 to a right side of the smart device 104 (e.g., a right swipe) to play a next song in a queue or skip forwards within a song. Alternatively, the user can perform a second swipe gesture that travels from the right side of the smart device 104 to the left side of the smart device 104 (e.g., a left swipe) to play a previous song in the queue or skip backwards within a song. To scroll through visual content in different directions, the user can perform a third swipe gesture that travels from a bottom of the smart device 104 to a top of the smart device 104 (e.g., an up swipe) or perform a fourth swipe gesture that travels from the top of the smart device 104 to the bottom of the smart device 104 (e.g., a down swipe). In general, the gestures associated with navigation can be mapped to navigational inputs, such as changing a song, navigating a list of cards, and/or dismissing an item.

Other gestures can be associated with a selection. These gestures may be performed along a vertical plane that is substantially perpendicular to the smart device 104. For example, a user can use a tap gesture to select a particular option presented by the smart device 104. In some cases, the tap gesture can be equivalent to a click of a mouse or a tap on a touch screen. In general, the gestures associated with selection can be mapped to "take action" intents, such as initiating a timer, opening a notification card, playing a song, and/or pausing a song.

Some implementations of the radar system 102 are particularly advantageous as applied in the context of smart devices 104, for which there is a convergence of issues. This can include a need for limitations in a spacing and layout of the radar system 102 and low power. Exemplary overall lateral dimensions of the smart device 104 can be, for example, approximately eight centimeters by approximately fifteen centimeters. Exemplary footprints of the radar system 102 can be even more limited, such as approximately four millimeters by six millimeters with antennas included. Exemplary power consumption of the radar system 102 may be on the order of a few milliwatts to tens of milliwatts (e.g., between approximately two milliwatts and twenty milliwatts). The requirement of such a limited footprint and power consumption for the radar system 102 enables the smart device 104 to include other desirable features in a space-limited package (e.g., a camera sensor, a fingerprint sensor, a display, and so forth).

With the radar system 102 providing gesture recognition, the smart device can support ambient computing by providing shortcuts to everyday tasks. Example shortcuts include managing interruptions from alarm clocks, timers, or smoke detectors. Other shortcuts include accelerating interactions with a voice-controlled smart device. This type of shortcut can activate voice recognition in the smart device without using key words to wake-up the smart device. Sometimes a user may prefer to use gesture-based shortcuts instead of voice-activated shortcuts, particularly in situations in which they are engaged in conversation or in environments where it may be inappropriate to speak, such as in a classroom or in a quiet section of a library. While a user is driving, ambient computing using the radar system can enable the user to accept or decline a change in global navigation satellite system (GNSS) route.

Ambient computing also has applications in public spaces to control everyday objects. For example, the radar system 102 can recognize gestures that control features of a building. These gestures can enable people to open automatic doors, select a floor within an elevator, and raise or lower blinds in an office room. As another example, the radar system 102 can recognize gestures to operate faucets, flush a toilet, or a drinking fountain. In example implementations, the radar system 102 recognizes different types of swipe gestures, which are further described with respect to FIG. 1-2. Optionally, the radar system can also recognize a tap gesture, which is further described with respect to FIG. 1-3.

Figures 1, 2:
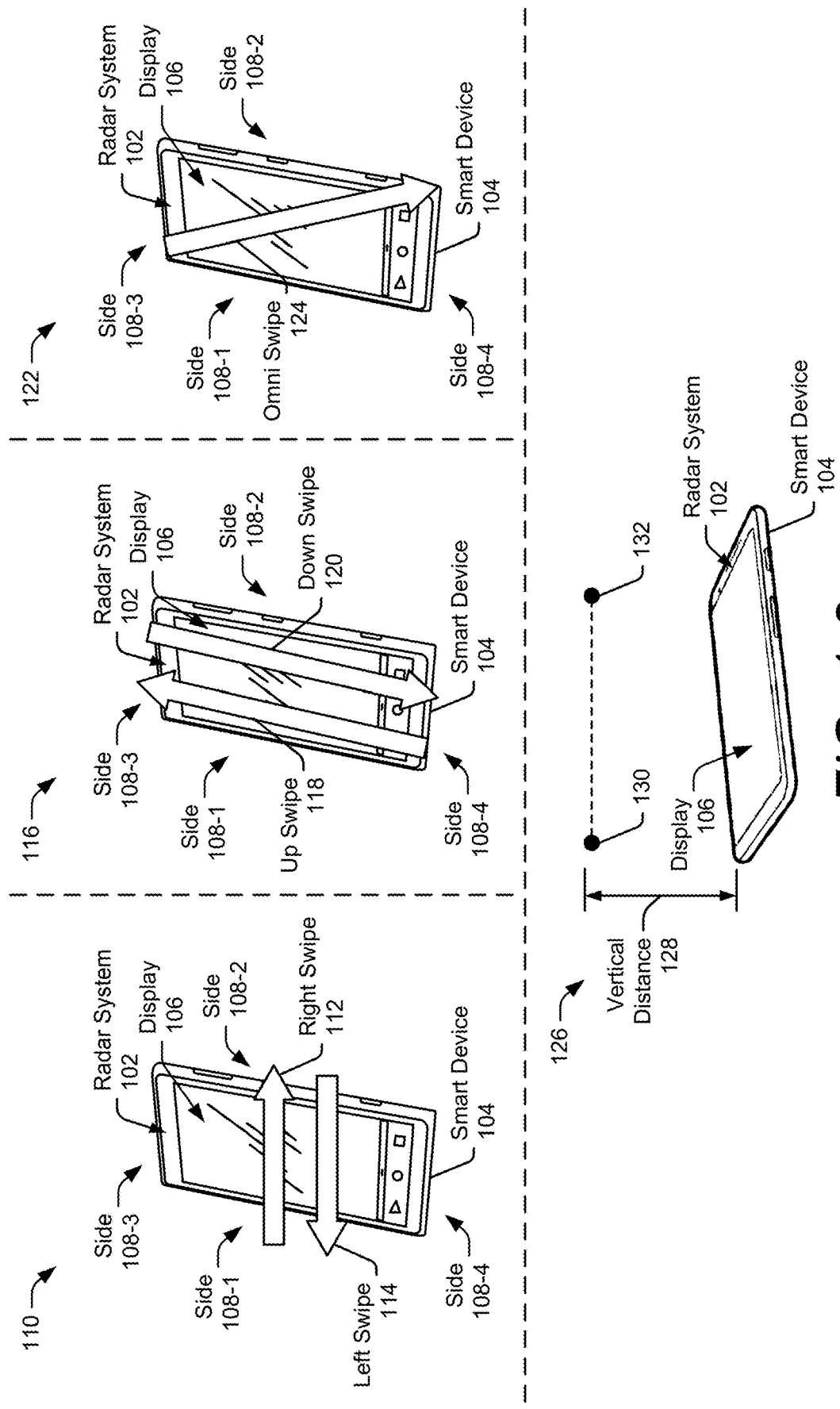

FIG. 1-2 illustrates example types of swipe gestures associated with ambient computing. In general, a swipe gesture represents a sweeping motion that traverses at least two sides of the smart device 104. In some cases, the swipe gesture can resemble a motion made to brush crumbs off a table. The user can perform the swipe gesture using a hand oriented with a palm facing towards the smart device 104 (e.g., with the hand positioned parallel to the smart device 104). Alternatively, the user can perform the swipe gesture using a hand with the palm facing towards or away from the direction of motion (e.g., with the hand positioned perpendicular to the smart device 104). In some cases, the swipe gesture may be associated with a timing requirement. For example, to be considered a swipe gesture, the user is to sweep an object across two opposite points on the smart device 104 within approximately 0.5 seconds.

In the depicted configuration, the smart device 104 is shown to have a display 106. The display 106 is considered to be on a front side of the smart device 104. The smart device 104 also includes sides 108-1 to 108-4. The radar system 102 is positioned proximate to the side 108-3. Consider the smart device 104 positioned in a portrait orientation such that the display 106 faces the user and the side 108-3 with the radar system 102 is positioned away from ground. In this case, a first side 108-1 of the smart device 104 corresponds to a left side of the smart device 104, and a second side 108-2 of the smart device 104 corresponds to a right side of the smart device 104. Also, the third side 108-3 of the smart device 104 corresponds to a top side of the smart device 104, and a fourth side 108-4 of the smart device 104 corresponds to a bottom of the smart device 104 (e.g., a side positioned proximate to the ground).

At 110, arrows depict a direction of a right swipe 112 (e.g., a right-swipe gesture) and a direction of a left swipe 114 (e.g., a left-swipe gesture) relative to the smart device 104. To perform the right swipe 112, the user moves an object (e.g., an appendage or a stylus) from the first side 108-1 of the smart device 104 to the second side 108-2 of the smart device 104. To perform the left swipe 114, the user moves an object from the second side 108-2 of the smart device 104 to the first side 108-1 of the smart device 104. In this case, the right swipe 112 and the left swipe 114 traverse a path that is substantially parallel to the third and fourth sides 108-3 and 108-4 and substantially perpendicular to the first and second sides 108-1 and 108-2.

At 116, arrows depict a direction of an up swipe 118 (e.g., an up-swipe gesture) and a direction of a down swipe 120 (e.g., a down-swipe gesture) relative to the smart device 104. To perform the up swipe 118, the user moves an object from the fourth side 108-4 to the third side 108-3. To perform the down swipe 120, the user moves an object from the third side 108-3 to the fourth side 108-4. In this case, the up swipe 118 and the down swipe 120 traverse a path that is substantially parallel to the first and second sides 108-1 and 108-2 and substantially perpendicular to the third and fourth sides 108-3 and 108-4.

At 122, an arrow depicts a direction of an example omni swipe (e.g., an omni-swipe gesture) relative to the smart device 104 using an arrow. The omni swipe 124 represents a swipe that is not necessarily parallel or perpendicular to a given side. Explained another way, the omni swipe 124 represents any type of swipe motion, including the directional swipes mentioned above (e.g., the right swipe 112, the left swipe 114, the up swipe 118, and the down swipe 120). In the example shown in FIG. 1-2, the omni swipe 124 is a diagonal swipe that traverses from a point where the sides 108-1 and 108-3 touch to another point where the sides 108-2 and 108-4 touch. Other types of diagonal motions are also possible, such as a diagonal swipe from a point where the sides 108-1 and 108-4 touch to another point where the sides 108-2 and 108-3 touch.

The various swipe gestures can be defined from a device-centric perspective. In other words, a right swipe 112 generally travels from a left side of the smart device 104 to a right side of the smart device 104, regardless of the smart device 104's orientation. Consider an example in which the smart device 104 is positioned in a landscape orientation with the display 106 facing the user and the third side 108-3 with the radar system 102 positioned on a right side of the smart device 104. In this case, the first side 108-1 represents the top side of the smart device 104, and the second side 108-2 represents the bottom side of the smart device 104. The third side 108-3 represents a right side of the smart device 104, and the fourth side 108-4 represents a left side of the smart device 104. As such, the user performs the right swipe 112 or the left swipe 114 by moving an object across the third side 108-3 and the fourth side 108-4. To perform the up swipe 118 or the down swipe 120, the user moves an object across the first side 108-1 and the second side 108-2.

At 126, a vertical distance 128 between the object performing any of the swipe gestures 112, 114, 118, 120, and 124 and the front surface of the smart device 104 (e.g., a surface of the display 106) is shown to remain relatively unchanged throughout the gesture. For example, a start position 130 of a swipe gesture can be at approximately a same vertical distance 128 from the smart device 104 as an end position 132 of the swipe gesture. The term "approximately" can mean that the distance of the start position 130 can be within +/−10% of the distance of the end position 132 or less (e.g., within +/−5%, +/−3%, or +/−2% of the end position 132). Explained another way, the swipe gesture involves a motion that traverses a path that is substantially parallel to a surface of the smart device 104 (e.g., substantially parallel to the surface of the display 106).

In some cases, the swipe gesture may be associated with a particular range of vertical distances 128 from the smart device 104. For example, a gesture can be considered a swipe gesture if the gesture is performed at a vertical distance 128 that is between approximately 3 and 20 centimeters from the smart device 104. The term "approximately" can mean that the distance of can be within +/−10% of a specified value or less (e.g., within +/−5%, +/−3%, or +/−2% of a specified value). Although the start position 130 and the end position 132 are shown to be above the smart device 104 in FIG. 1-2, the start position 130 and the end position 132 of other swipe gestures can be positioned further away from the smart device 104, especially in situations in which the user performs the swipe gestures at a horizontal distance from the smart device 104. As an example, the user can perform the swipe gesture more than 0.3 meters away from the smart device 104.

Figures 1, 2, 3:
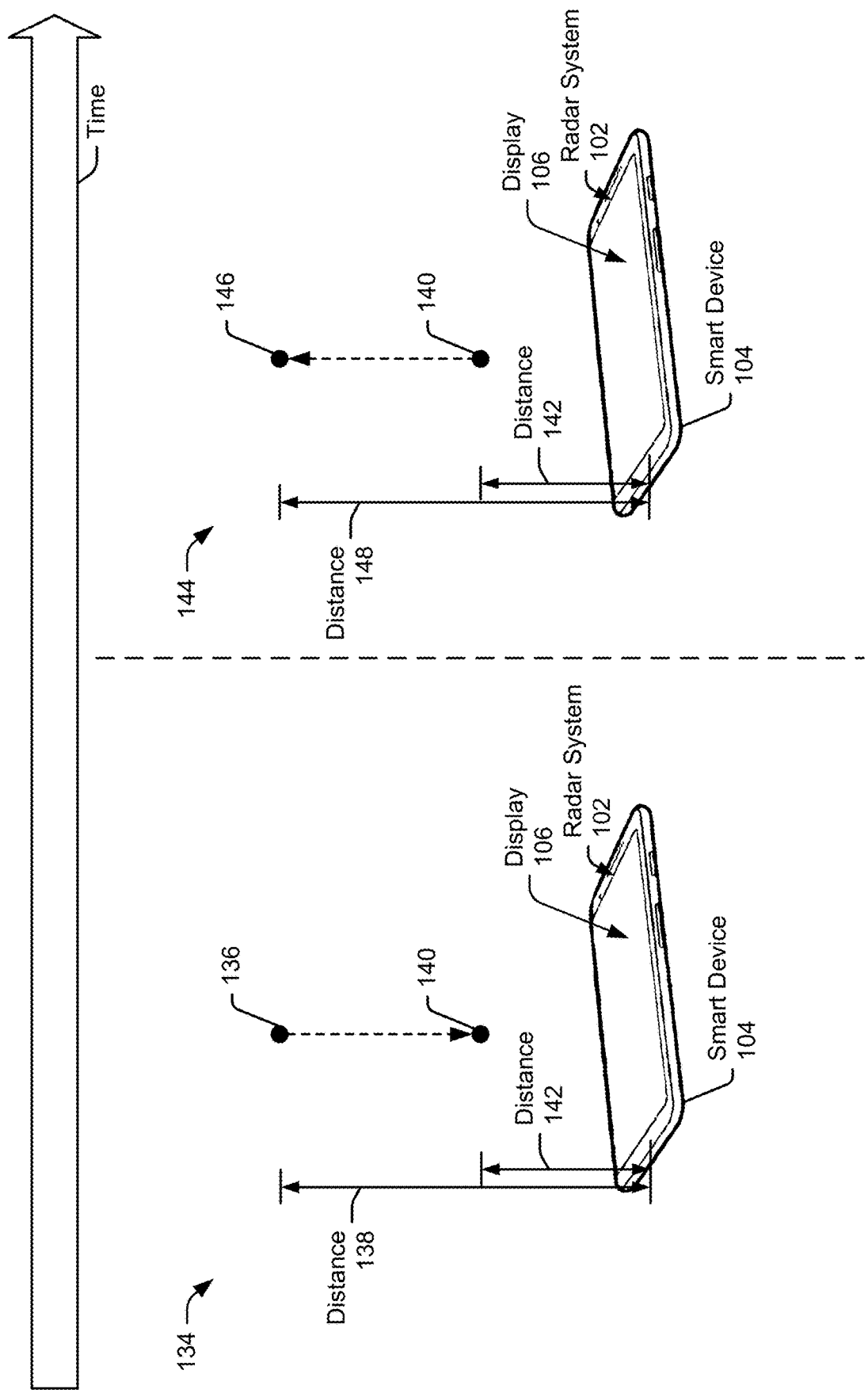
Figure 2:
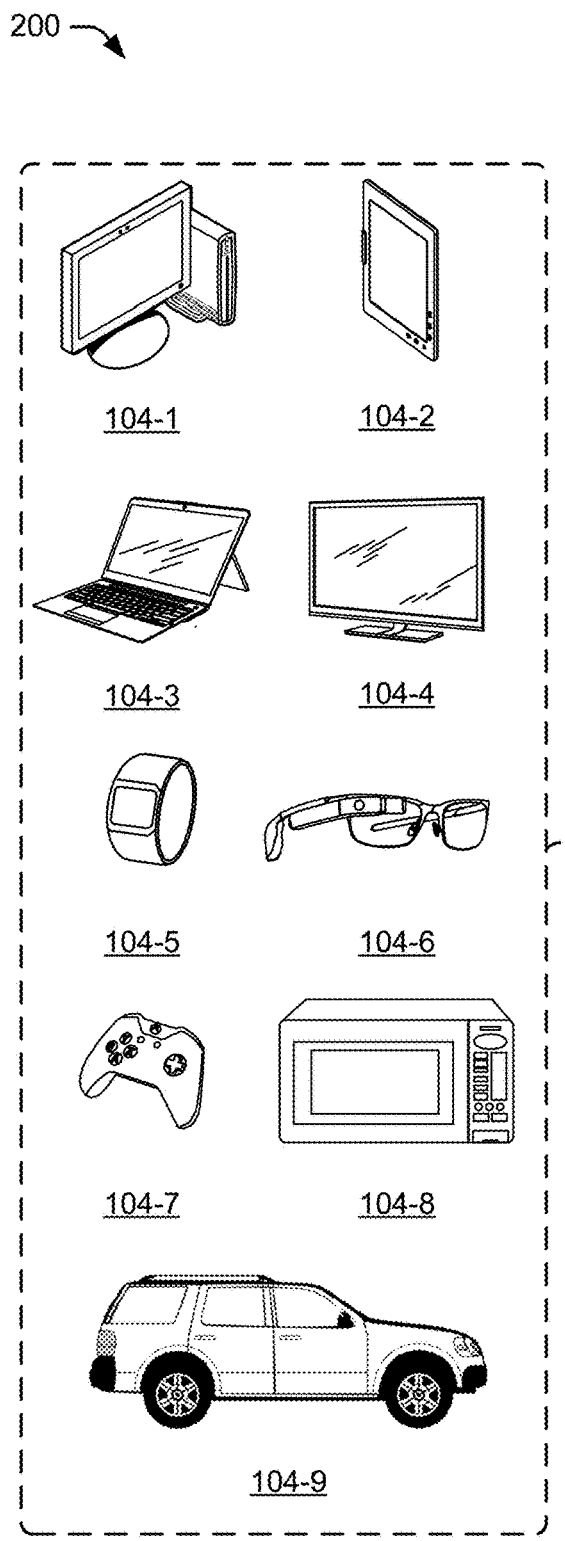
Figure 2:
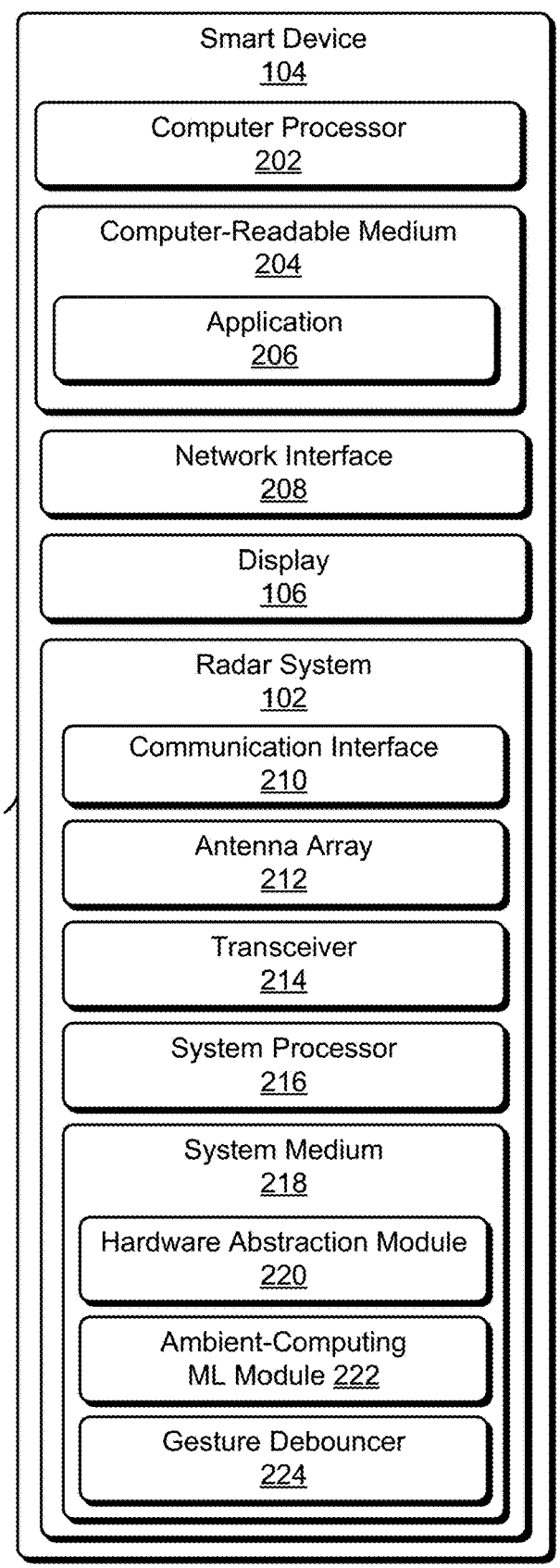
Figures 1, 3:
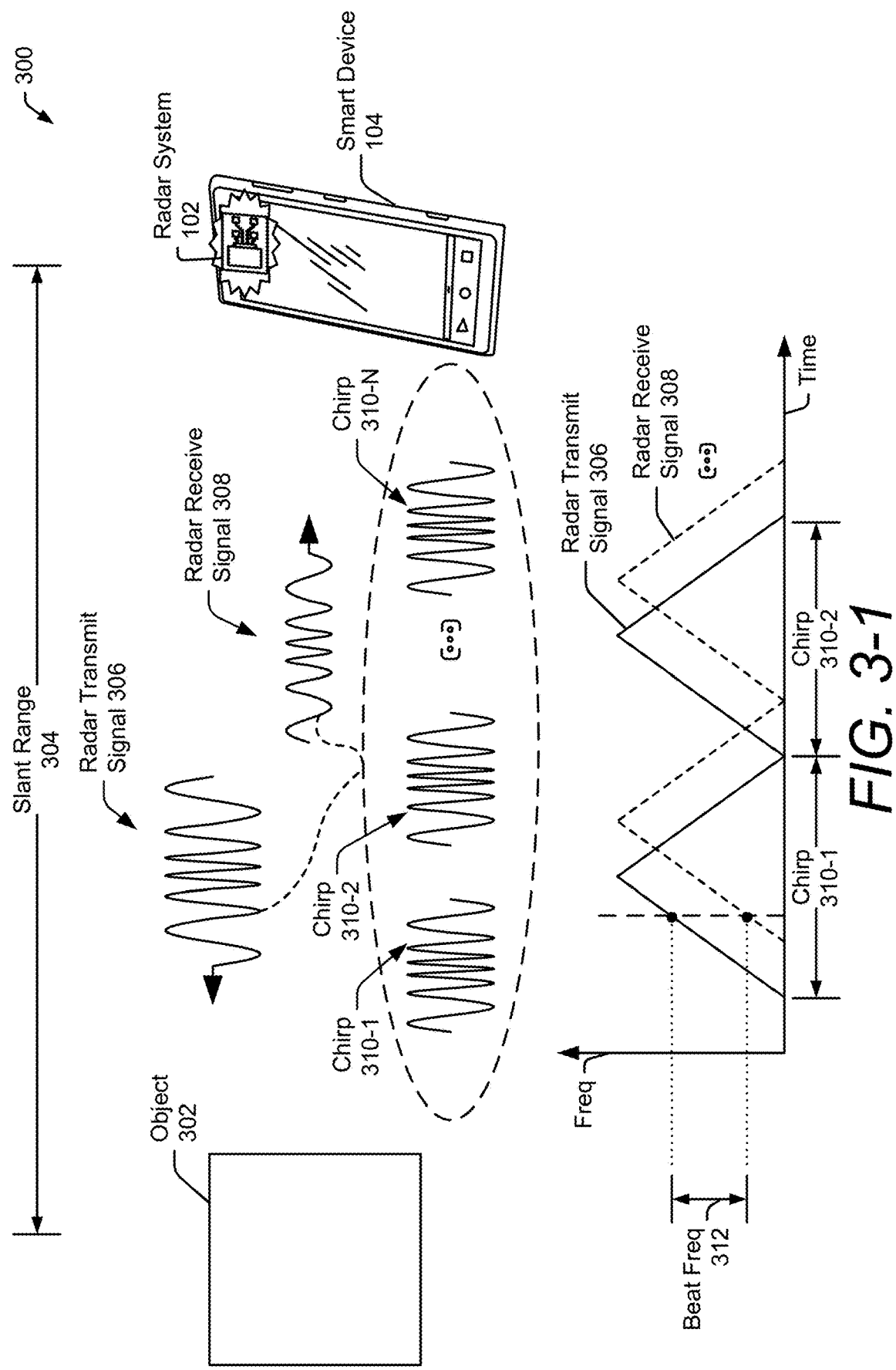
Figures 2, 3:
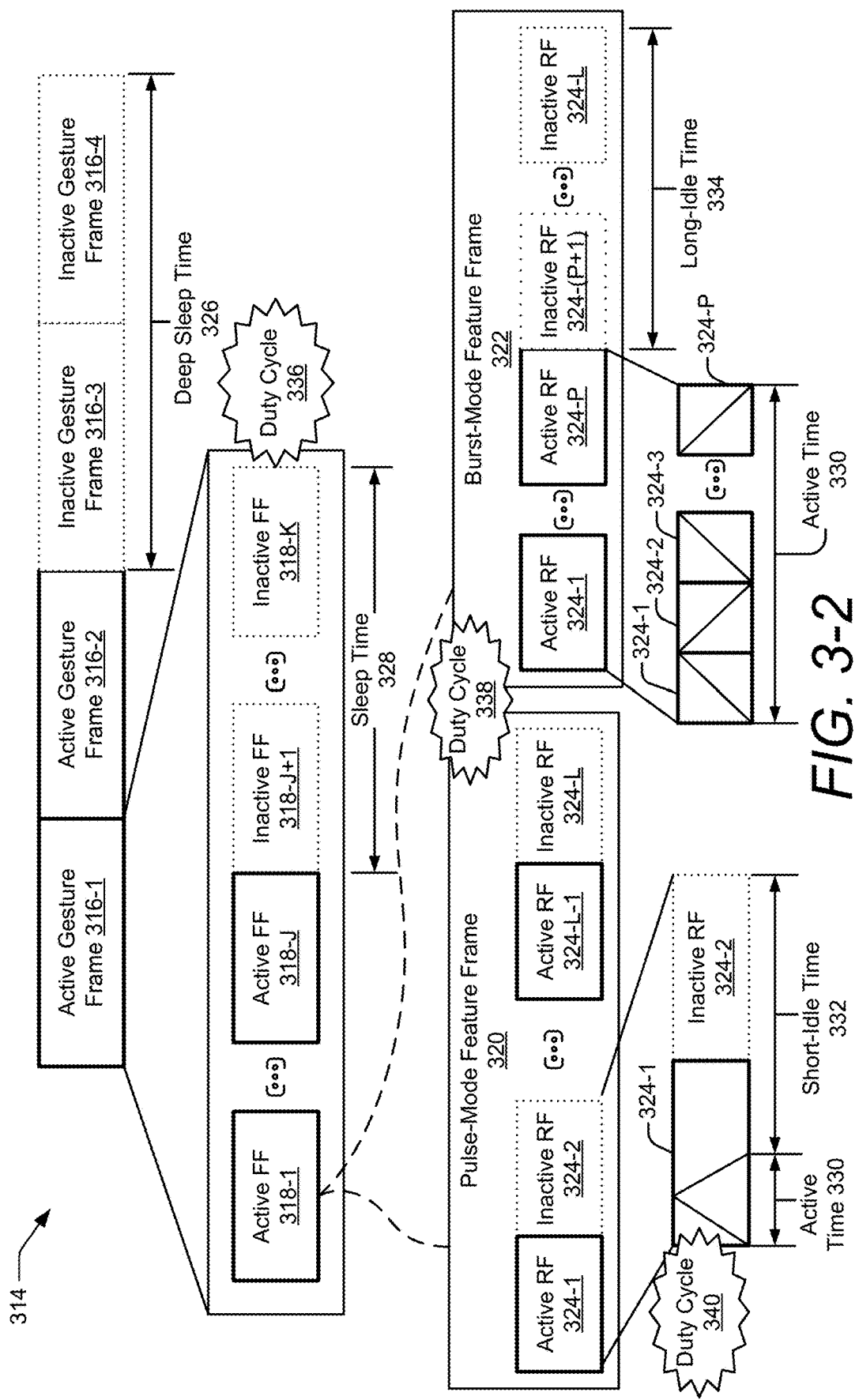

FIG. 1-3 illustrates an example tap gesture associated with ambient computing. In general, a tap gesture is a "bounce-like" motion that first moves towards the smart device 104 and then moves away from the smart device 104. This motion is substantially perpendicular to a surface of the smart device 104 (e.g., substantially perpendicular to a surface of the display 106). In some cases, the user can perform the tap gesture using a hand with a palm that faces towards the smart device 104 (e.g., with the hand positioned parallel to the smart device 104).

FIG. 1-3 depicts a motion of the tap gesture over time, with time progressing from left to right. At 134, the user positions an object (e.g., an appendage or a stylus) at a start position 136, which is at a first distance 138 from the smart device 104. The user moves the object from the start position 136 to a middle position 140. The middle position 140 is at a second distance 142 from the smart device 104. The second distance 142 is less than the first distance 138. At 144, the user moves the object from the middle position 140 to the end position 146, which is at a third distance 148 from the smart device 104. The third distance 148 is greater than the second distance 142. The third distance 148 can be similar to or different than the first distance 138. The smart device 104 and the radar system 102 are further described with respect to FIG. 2.

FIG. 2 illustrates the radar system 102 as part of the smart device 104. The smart device 104 is illustrated with various non-limiting example devices including a desktop computer 104-1, a tablet 104-2, a laptop 104 3, a television 104-4, a computing watch 104-5, computing glasses 104-6, a gaming system 104-7, a microwave 104-8, and a vehicle 104-9. Other devices may also be used, such as a home service device, a smart speaker, a smart thermostat, a security camera, a baby monitor, a Wi-Fi™ router, a drone, a trackpad, a drawing pad, a netbook, an e-reader, a home automation and control system, a wall display, and another home appliance. Note that the smart device 104 can be wearable, non-wearable but mobile, or relatively immobile (e.g., desktops and appliances). The radar system 102 can be used as a stand-alone radar system or used with, or embedded within, many different smart devices 104 or peripherals, such as in control panels that control home appliances and systems, in automobiles to control internal functions (e.g., volume, cruise control, or even driving of the car), or as an attachment to a laptop computer to control computing applications on the laptop.

The smart device 104 includes one or more computer processors 202 and at least one computer-readable medium 204, which includes memory media and storage media. Applications and/or an operating system (not shown) embodied as computer-readable instructions on the computer-readable medium 204 can be executed by the computer processor 202 to provide some of the functionalities described herein. The computer-readable medium 204 also includes an application 206, which uses an ambient computing event (e.g., a gesture input) detected by the radar system 102 to perform an action associated with gesture-based touch-free control. In some cases, the radar system 102 can also provide radar data to support presence-based touch-free control, collision avoidance for autonomous driving, health monitoring, fitness tracking, spatial mapping, human activity recognition, and so forth.

The smart device 104 can also include a network interface 208 for communicating data over wired, wireless, or optical networks. For example, the network interface 208 may communicate data over a local-area-network (LAN), a wireless local-area-network (WLAN), a personal-area-network (PAN), a wire-area-network (WAN), an intranet, the Internet, a peer-to-peer network, point-to-point network, a mesh network, and the like. The smart device 104 may also include the display 106.

The radar system 102 includes a communication interface 210 to transmit radar data to a remote device, though this need not be used when the radar system 102 is integrated within the smart device 104. The radar data can include the ambient computing event and can optionally include other types of data, such as data associated with presence detection, collision avoidance, health monitoring, fitness tracking, spatial mapping, or human activity recognition. In general, the radar data provided by the communication interface 210 is in a format usable by the application 206.

The radar system 102 also includes at least one antenna array 212 and at least one transceiver 214 to transmit and receive radar signals. The antenna array 212 includes at least one transmit antenna element and at least two receive antenna elements. In some situations, the antenna array 212 includes multiple transmit antenna elements and/or multiple receive antenna elements. With multiple transmit antenna elements and multiple receive antenna elements, the radar system 102 can implement a multiple-input multiple-output (MIMO) radar capable of transmitting multiple distinct waveforms at a given time (e.g., a different waveform per transmit antenna element). The antenna elements can be circularly polarized, horizontally polarized, vertically polarized, or a combination thereof.

The multiple receive antenna elements of the antenna array 212 can be positioned in a one-dimensional shape (e.g., a line) or a two-dimensional shape (e.g., a rectangular arrangement, a triangular arrangement, or an "L" shape arrangement) for implementations that include three or more receive antenna elements. The one-dimensional shape enables the radar system 102 to measure one angular dimension (e.g., an azimuth or an elevation) while the two-dimensional shape enables the radar system 102 to measure two angular dimensions (e.g., to determine both an azimuth angle and an elevation angle of the object). An element spacing associated with the receive antenna elements can be less than, greater than, or equal to half a center wavelength of the radar signal.

The transceiver 214 includes circuitry and logic for transmitting and receiving radar signals via the antenna array 212. Components of the transceiver 214 can include amplifiers, phase shifters, mixers, switches, analog-to-digital converters, or filters for conditioning the radar signals. The transceiver 214 also includes logic to perform in phase/quadrature (I/Q) operations, such as modulation or demodulation. A variety of modulations can be used, including linear frequency modulations, triangular frequency modulations, stepped frequency modulations, or phase modulations. Alternatively, the transceiver 214 can produce radar signals having a relatively constant frequency or a single tone. The transceiver 214 can be configured to support continuous-wave or pulsed radar operations.

A frequency spectrum (e.g., range of frequencies) that the transceiver 214 uses to generate the radar signals can encompass frequencies between 1 and 400 gigahertz (GHz), between 4 and 100 GHz, between 1 and 24 GHZ, between 24 GHZ and 70 GHZ, between 2 and 4 GHZ, between 57 and 64 GHz, or at approximately 2.4 GHZ. In some cases, the frequency spectrum can be divided into multiple sub-spectrums that have similar or different bandwidths. The bandwidths can be on the order of 500 megahertz (MHz), 1 GHZ, 2 GHZ, 4 GHZ, 6 GHZ, and so forth. In some cases, the bandwidths are approximately 20% or more of a center frequency to implement an ultrawideband (UWB) radar.

Different frequency sub-spectrums may include, for example, frequencies between approximately 57 and 59 GHZ, 59 and 61 GHZ, or 61 and 63 GHZ. Although the example frequency sub-spectrums described above are contiguous, other frequency sub-spectrums may not be contiguous. To achieve coherence, multiple frequency sub-spectrums (contiguous or not) that have a same bandwidth may be used by the transceiver 214 to generate multiple radar signals, which are transmitted simultaneously or separated in time. In some situations, multiple contiguous frequency sub-spectrums may be used to transmit a single radar signal, thereby enabling the radar signal to have a wide bandwidth.

The radar system 102 also includes one or more system processors 216 and at least one system medium 218 (e.g., one or more computer-readable storage media). In the depicted configuration, the system medium 218 optionally includes a hardware abstraction module 220. Instead of relying on techniques that directly track a position of a user's hand over time to detect a gesture, the radar system 102's system medium 218 includes an ambient-computing machine-learned module 222 and a gesture debouncer 224. The hardware abstraction module 220, the ambient-computing machine-learned module 222, and the gesture debouncer 224 can be implemented using hardware, software, firmware, or a combination thereof. In this example, the system processor 216 implements the hardware-abstraction module 220, the ambient-computing machine-learned module 222, and the gesture debouncer 224. The hardware-abstraction module 220, the ambient-computing machine-learned module 222, and the gesture debouncer enable the system processor 216 to process responses from the receive antenna elements in the antenna array 212 to recognize a gesture performed by the user in the context of ambient computing.

In an alternative implementation (not shown), the hardware-abstraction module 220, the ambient-computing machine-learned module 222, and/or the gesture debouncer 224 are included within the computer-readable medium 204 and implemented by the computer processor 202. This enables the radar system 102 to provide the smart device 104 raw data via the communication interface 210 such that the computer processor 202 can process the raw data for the application 206.

The hardware-abstraction module 220 transforms raw data provided by the transceiver 214 into hardware-agnostic data, which can be processed by the ambient-computing machine-learned module 222. In particular, the hardware-abstraction module 220 conforms complex data from a variety of different types of radar signals to an expected input of the ambient-computing machine-learned module 222. This enables the ambient-computing machine-learned module 222 to process different types of radar signals received by the radar system 102, including those that utilize different modulations schemes for frequency-modulated continuous-wave radar, phase-modulated spread spectrum radar, or impulse radar. The hardware-abstraction module 220 can also normalize complex data from radar signals with different center frequencies, bandwidths, transmit power levels, or pulsewidths.

Additionally, the hardware-abstraction module 220 conforms complex data generated using different hardware architectures. Different hardware architectures can include different antenna arrays 212 positioned on different surfaces of the smart device 104 or different sets of antenna elements within an antenna array 212. By using the hardware-abstraction module 220, the ambient-computing machine-learned module 222 can process complex data generated by different sets of antenna elements with different gains, different sets of antenna elements of various quantities, or different sets of antenna elements with different antenna element spacings.

By using the hardware-abstraction module 220, the ambient-computing machine-learned module 222 can operate in radar systems 102 with different limitations that affect the available radar modulation schemes, transmission parameters, or types of hardware architectures. The hardware-abstraction module 220 is further described with respect to FIGS. 6-1 and 6-2.

The ambient-computing machine-learned module 222 analyzes the hardware-agnostic data and determines a likelihood that various gestures occurred (e.g., were performed by the user). Although described with respect to ambient computing, the ambient-computing machine-learned module 222 can also be trained to recognize gestures in the context of a non-ambient-computing environment. The ambient-computing machine-learned module 222 is implemented using a multi-stage architecture, which is further described with respect to FIGS. 7-1 and 9-3.

Some types of machine-learned modules are designed and trained to recognize gestures within a particular or segmented time interval, such as a time interval initiated by a touch event or a time interval corresponding to a display being in an active state. To support aspects of ambient computing, however, the ambient-computing machine-learned module is designed and trained to recognize gestures across time in a continuous and unsegmented manner.

The gesture debouncer 224 determines whether or not the user performed a gesture based on the likelihoods (or probabilities) provided by the ambient-computing machine-learned module 222. The gesture debouncer 224 is further described with respect to FIGS. 7-1 and 7-2. The radar system 102 is further described with respect to FIG. 3-1.

FIG. 3-1 illustrates an example operation of the radar system 102. In the depicted configuration, the radar system 102 is implemented as a frequency-modulated continuous-wave radar. However, other types of radar architectures can be implemented, as described above with respect to FIG. 2. In environment 300, an object 302 is located at a particular slant range 304 from the radar system 102 and is manipulated by a user to perform a gesture. The object 302 can be an appendage of the user (e.g., a hand, a finger, or an arm), an item that is worn by the user, or an item that is held by the user (e.g., a stylus).

To detect the object 302, the radar system 102 transmits a radar transmit signal 306. In some cases, the radar system 102 can transmit the radar transmit signal 306 using a substantially broad radiation pattern. For example, a main lobe of the radiation pattern can have a beamwidth that is approximately 90 degrees or greater (e.g., approximately 110, 130, or 150 degrees). This broad radiation pattern enables the user more flexibility in where they perform a gesture for ambient computing. In an example implementation, a center frequency of the radar transmit signal 306 can be approximately 60 GHZ, and a bandwidth of the radar transmit signal 306 can be between approximately 4 and 6 GHZ (e.g., approximately 4.5 or 5.5 GHZ). The term "approximately" can mean that the bandwidths of can be within +/−10% of a specified value or less (e.g., within +/−5%, +/−3%, or +/−2% of a specified value).

At least a portion of the radar transmit signal 306 is reflected by the object 302. This reflected portion represents a radar receive signal 308. The radar system 102 receives the radar receive signal 308 and processes the radar receive signal 308 to extract data for gesture recognition. As depicted, an amplitude of the radar receive signal 308 is smaller than an amplitude of the radar transmit signal 306 due to losses incurred during propagation and reflection.

The radar transmit signal 306 includes a sequence of chirps 310-1 to 310-N, where N represents a positive integer greater than one. The radar system 102 can transmit the chirps 310-1 to 310-N in a continuous burst or transmit the chirps 310-1 to 310-N as time-separated pulses, as further described with respect to FIG. 3-2. A duration of each chirp 310-1 to 310-N can be on the order of tens or thousands of microseconds (e.g., between approximately 30 microseconds (μs) and 5 milliseconds (ms)), for instance. An example pulse repetition frequency (PRF) of the radar system 102 can be greater than 1500 Hz, such as approximately 2000 Hz or 3000 Hz. The term "approximately" can mean that the pulse repetition frequencies of can be within +/−10% of a specified value or less (e.g., within +/−5%, +/−3%, or +/−2% of a specified value).

Individual frequencies of the chirps 310-1 to 310-N can increase or decrease over time. In the depicted example, the radar system 102 employs a two-slope cycle (e.g., triangular frequency modulation) to linearly increase and linearly decrease the frequencies of the chirps 310-1 to 310-N over time. The two-slope cycle enables the radar system 102 to measure the Doppler frequency shift caused by motion of the object 302. In general, transmission characteristics of the chirps 310-1 to 310-N (e.g., bandwidth, center frequency, duration, and transmit power) can be tailored to achieve a particular detection range, range resolution, or Doppler sensitivity for detecting one or more characteristics the object 302. The term "chirp" generally refers to a segment or portion of the radar signal. For pulse-Doppler radar, the "chirp" represents individual pulses of a pulsed radar signal. For continuous-wave radar, the "chirp" represents segments of a continuous-wave radar signal.

At the radar system 102, the radar receive signal 308 represents a delayed version of the radar transmit signal 306. The amount of delay is proportional to the slant range 304 (e.g., distance) from the antenna array 212 of the radar system 102 to the object 302. In particular, this delay represents a summation of a time it takes for the radar transmit signal 306 to propagate from the radar system 102 to the object 302 and a time it takes for the radar receive signal 308 to propagate from the object 302 to the radar system 102. If the object 302 is moving, the radar receive signal 308 is shifted in frequency relative to the radar transmit signal 306 due to the Doppler effect. A difference in frequency between the radar transmit signal 306 and the radar receive signal 308 can be referred to as a beat frequency 312. A value of the beat frequency is based on the slant range 304 and the Doppler frequency. Similar to the radar transmit signal 306, the radar receive signal 308 is composed of one or more of the chirps 310-1 to 310-N. The multiple chirps 310-1 to 310-N enable the radar system 102 to make multiple observations of the object 302 over a predetermined time period. A radar framing structure determines a timing of the chirps 310-1 to 310-N, as further described with respect to FIG. 3-2.

FIG. 3-2 illustrates an example radar framing structure 314 for ambient computing. In the depicted configuration, the radar framing structure 314 includes three different types of frames. At a top level, the radar framing structure 314 includes a sequence of gesture frames 316 (or main frames), which can be in an active state or an inactive state. Generally speaking, the active state consumes a larger amount of power relative to the inactive state. At an intermediate level, the radar framing structure 314 includes a sequence of feature frames 318, which can similarly be in the active state or the inactive state. Different types of feature frames 318 include a pulse-mode feature frame 320 (shown at the bottom-left of FIG. 3-2) and a burst-mode feature frame 322 (shown at the bottom-right of FIG. 3-2). At a low level, the radar framing structure 314 includes a sequence of radar frames (RF) 324, which can also be in the active state or the inactive state.

The radar system 102 transmits and receives a radar signal during an active radar frame 324. In some situations, the radar frames 324 are individually analyzed for basic radar operations, such as search and track, clutter map generation, user location determination, and so forth. Radar data collected during each active radar frame 324 can be saved to a buffer after completion of the radar frame 324 or provided directly to the system processor 216 of FIG. 2.

The radar system 102 analyzes the radar data across multiple radar frames 324 (e.g., across a group of radar frames 324 associated with an active feature frame 318) to identify a particular feature. Example types of features include one or more stationary objects within the external environment, material characteristics of these one or more objects (e.g., reflective properties), physical characteristics (e.g., size) of these one or more objects. To perform gesture recognition during an active gesture frame 316, the radar system 102 analyzes the radar data associated with multiple active feature frames 318.

A duration of the gesture frame 316 may be on the order of milliseconds or seconds (e.g., between approximately 10 milliseconds (ms) and 10 seconds (s)). After active gesture frames 316-1 and 316-2 occur, the radar system 102 is inactive, as shown by inactive gesture frames 316-3 and 316-4. A duration of the inactive gesture frames 316-3 and 316-4 is characterized by a deep sleep time 326, which may be on the order of tens of milliseconds or more (e.g., greater than 50 ms). In an example implementation, the radar system 102 turns off all of the active components (e.g., an amplifier, an active filter, a voltage-controlled oscillator (VCO), a voltage-controlled buffer, a multiplexer, an analog-to-digital converter, a phase-lock loop (PLL) or a crystal oscillator) within the transceiver 214 to conserve power during the deep sleep time 326.

For ambient computing, the deep sleep time 326 can be appropriately set to enable sufficient reaction and responsiveness while conserving power. In other words, the deep sleep time 326 can be sufficiently short to enable the radar system 102 to satisfy the "always on" aspect of ambient computing while also enabling power to be conserved whenever possible. In some cases, the deep sleep time 326 can be dynamically adjusted based on an amount of activity detected by the radar system 102 or based on whether the radar system 102 determines that the user is present. If the activity level is relatively high or the user is close enough to the radar system 102 to perform a gesture, the radar system 102 can reduce the deep sleep time 326 to increase responsiveness. Alternatively, if the activity level is relatively low or the user is sufficiently far from the radar system 102 so as not to be able to perform gestures within a designated distance interval, the radar system 102 can increase the deep sleep time 326.

In the depicted radar framing structure 314, each gesture frame 316 includes K feature frames 318, where K is a positive integer. If the gesture frame 316 is in the inactive state, all of the feature frames 318 associated with that gesture frame 316 are also in the inactive state. In contrast, an active gesture frame 316 includes J active feature frames 318 and K-J inactive feature frames 318, where J is a positive integer that is less than or equal to K. A quantity of feature frames 318 can be adjusted based on a complexity of the environment or a complexity of a gesture. For example, a gesture frame 316 can include a few to a hundred feature frames 316 or more (e.g., K may equal 2, 10, 30, 60, or 100).

A duration of each feature frame 318 may be on the order of milliseconds (e.g., between approximately 1 ms and 50 ms). In example implementations, the duration of each feature frame 318 is between approximately 30 ms and 50 ms.

To conserve power, the active feature frames 318-1 to 318-J occur prior to the inactive feature frames 318-(J+1) to 318-K. A duration of the inactive feature frames 318-(J+1) to 318-K is characterized by a sleep time 328. In this way, the inactive feature frames 318-(J+1) to 318-K are consecutively executed such that the radar system 102 can be in a powered-down state for a longer duration relative to other techniques that may interleave the inactive feature frames 318-(J+1) to 318-K with the active feature frames 318-1 to 318-J. Generally speaking. increasing a duration of the sleep time 328 enables the radar system 102 to turn off components within the transceiver 214 that require longer start-up times.

Each feature frame 318 includes L radar frames 324, where L is a positive integer that may or may not be equal to J or K. In some implementations, a quantity of radar frames 324 may vary across different feature frames 318 and may comprise a few frames or hundreds of frames (e.g., L may equal 5, 15, 30, 100, or 500). A duration of a radar frame 324 may be on the order of tens or thousands of microseconds (e.g., between approximately 30 μs and 5 ms). The radar frames 324 within a particular feature frame 318 can be customized for a predetermined detection range, range resolution, or doppler sensitivity, which facilitates detection of a particular feature or gesture. For example, the radar frames 324 may utilize a particular type of modulation, bandwidth, frequency, transmit power, or timing. If the feature frame 318 is in the inactive state, all of the radar frames 324 associated with that feature frame 318 are also in the inactive state.

The pulse-mode feature frame 320 and the burst-mode feature frame 322 include different sequences of radar frames 324. Generally speaking, the radar frames 324 within an active pulse-mode feature frame 320 transmit pulses that are separated in time by a predetermined amount. This disperses observations over time, which can make it easier for the radar system 102 to recognize a gesture due to larger changes in the observed chirps 310-1 to 310-N within the pulse-mode feature frame 320 relative to the burst-mode feature frame 322. In contrast, the radar frames 324 within an active burst-mode feature frame 322 transmit pulses continuously across a portion of the burst-mode feature frame 322 (e.g., the pulses are not separated by a predetermined amount of time). This enables an active-burst-mode feature frame 322 to consume less power than the pulse-mode feature frame 320 by turning off a larger quantity of components, including those with longer start-up times, as further described below.

Within each active pulse-mode feature frame 320, the sequence of radar frames 324 alternates between the active state and the inactive state. Each active radar frame 324 transmits a chirp 310 (e.g., a pulse), which is illustrated by a triangle. A duration of the chirp 310 is characterized by an active time 330. During the active time 330, components within the transceiver 214 are powered-on. During a short-idle time 332, which includes the remaining time within the active radar frame 324 and a duration of the following inactive radar frame 324, the radar system 102 conserves power by turning off one or more active components within the transceiver 214 that have a start-up time within a duration of the short-idle time 332.

An active burst-mode feature frame 322 includes P active radar frames 324 and L-P inactive radar frames 324, where P is a positive integer that is less than or equal to L. To conserve power, the active radar frames 324-1 to 324-P occur prior to the inactive radar frames 324-(P+1) to 324-L. A duration of the inactive radar frames 324-(P+1) to 324-L is characterized by a long-idle time 334. By grouping the inactive radar frames 324-(P+1) to 324-L together, the radar system 102 can be in a powered-down state for a longer duration relative to the short-idle time 332 that occurs during the pulse-mode feature frame 320. Additionally, the radar system 102 can turn off additional components within the transceiver 214 that have start-up times that are longer than the short-idle time 332 and shorter than the long-idle time 334.

Each active radar frame 324 within an active burst-mode feature frame 322 transmits a portion of the chirp 310. In this example, the active radar frames 324-1 to 324-P alternate between transmitting a portion of the chirp 310 that increases in frequency and a portion of the chirp 310 that decreases in frequency.

The radar framing structure 314 enables power to be conserved through adjustable duty cycles within each frame type. A first duty cycle 336 is based on a quantity of active feature frames 318 (J) relative to a total quantity of feature frames 318 (K). A second duty cycle 338 is based on a quantity of active radar frames 324 (e.g., L/2 or P) relative to a total quantity of radar frames 324 (L). A third duty cycle 340 is based on a duration of the chirp 310 relative to a duration of a radar frame 324.

Consider an example radar framing structure 314 for a power state that consumes approximately 2 milliwatts (mW) of power and has a main-frame update rate between approximately 1 and 4 hertz (Hz). In this example, the radar framing structure 314 includes a gesture frame 316 with a duration between approximately 250 ms and 1 second. The gesture frame 316 includes thirty-one pulse-mode feature frames 320 (e.g., K is equal to 31). One of the thirty-one pulse-mode feature frames 320 is in the active state. This results in the duty cycle 336 being approximately equal to 3.2%. A duration of each pulse-mode feature frame 320 is between approximately 8 and 32 ms. Each pulse-mode feature frame 320 is composed of eight radar frames 324 (e.g., L is equal to 8). Within the active pulse-mode feature frame 320, all eight radar frames 324 are in the active state. This results in the duty cycle 338 being equal to 100%. A duration of each radar frame 324 is between approximately 1 and 4 ms. An active time 330 within each of the active radar frames 324 is between approximately 32 and 128 μs. As such, the resulting duty cycle 340 is approximately 3.2%. This example radar framing structure 314 has been found to yield good performance results while also yielding good power efficiency results in the application context of a handheld smartphone in a low-power state. Furthermore, this performance enables the radar system 102 to satisfy power consumption and size constraints associated with ambient computing while maintaining responsiveness. The power savings can enable the radar system 102 to continuous transmit and receive radar signals for ambient computing over a time period of at least an hour in power-constrained devices. In some cases, the radar system 102 can operate over a period of time on the order of tens of hours or multiple days.

Although two-slope cycle signals (e.g., triangular frequency modulated signals) are explicitly shown in FIGS. 3-1 and 3-2, these techniques can be applied to other types of signals, including those mentioned with respect to FIG. 2. Generation of the radar transmit signal 306 (of FIG. 3-1) and the processing of the radar receive signal 308 (of FIG. 3-1) are further described with respect to FIG. 4.

Figure 4:
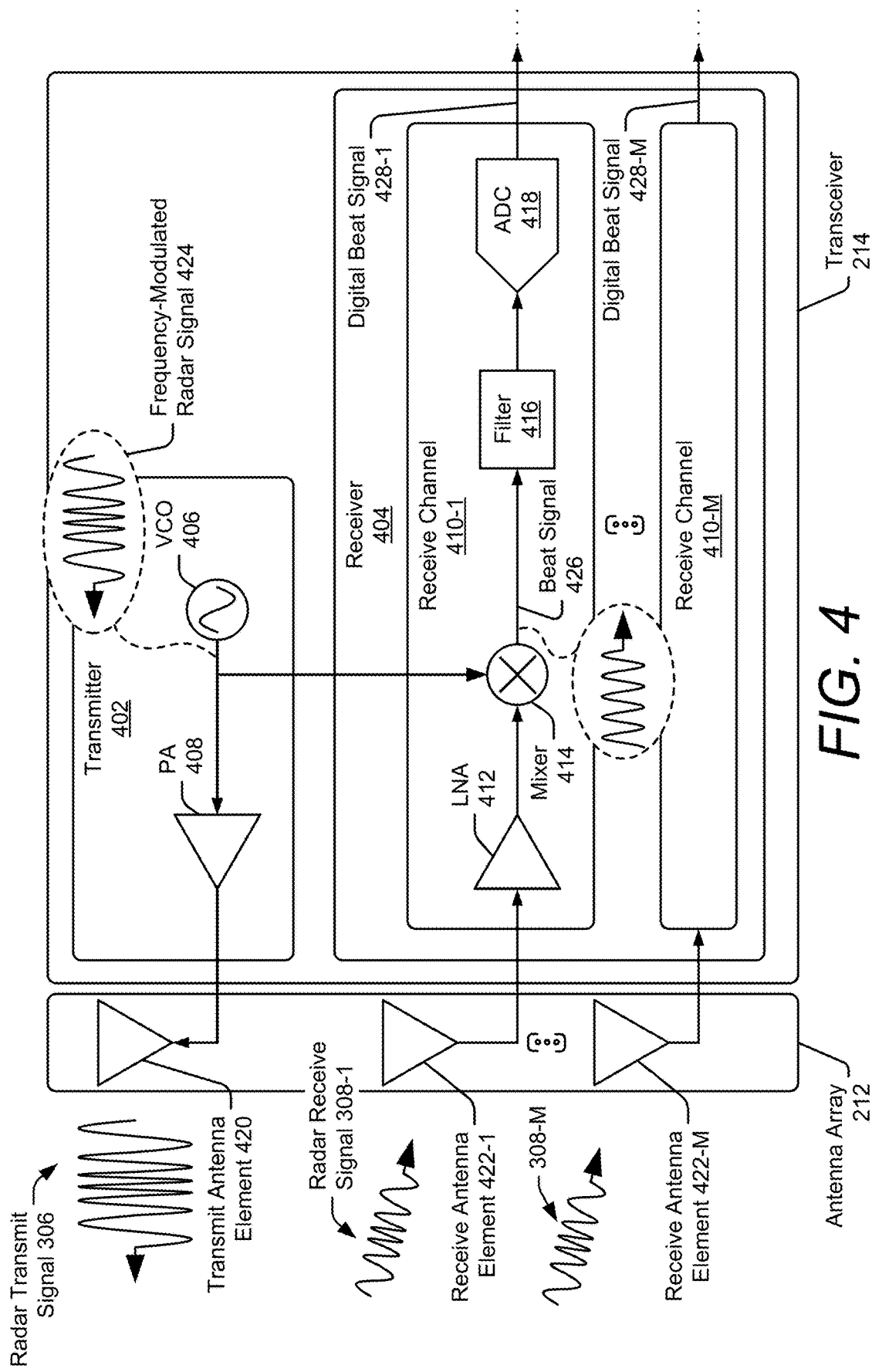
FIG. 4 illustrates an example antenna array and an example transceiver of a radar system for ambient computing.

FIG. 4 illustrates an example antenna array 212 and an example transceiver 214 of the radar system 102. In the depicted configuration, the transceiver 214 includes a transmitter 402 and a receiver 404. The transmitter 402 includes at least one voltage-controlled oscillator 406 and at least one power amplifier 408. The receiver 404 includes at least two receive channels 410-1 to 410-M, where M is a positive integer greater than one. Each receive channel 410-1 to 410-M includes at least one low-noise amplifier 412, at least one mixer 414, at least one filter 416, and at least one analog-to-digital converter 418. The antenna array 212 includes at least one transmit antenna element 420 and at least two receive antenna elements 422-1 to 422-M. The transmit antenna element 420 is coupled to the transmitter 402. The receive antenna elements 422-1 to 422-M are respectively coupled to the receive channels 410-1 to 410-M.

During transmission, the voltage-controlled oscillator 406 generates a frequency-modulated radar signal 424 at radio frequencies. The power amplifier 408 amplifies the frequency-modulated radar signal 424 for transmission via the transmit antenna element 420. The transmitted frequency-modulated radar signal 424 is represented by the radar transmit signal 306, which can include multiple chirps 310-1 to 310-N based on the radar framing structure 314 of FIG. 3-2. As an example, the radar transmit signal 306 is generated according to the burst-mode feature frame 322 of FIG. 3-2 and includes 16 chirps 310 (e.g., N equals 16).

During reception, each receive antenna element 422-1 to 422-M receives a version of the radar receive signal 308-1 to 308-M. In general, relative phase differences between these versions of the radar receive signals 308-1 to 308-M are due to differences in locations of the receive antenna elements 422-1 to 422-M. Within each receive channel 410-1 to 410-M, the low-noise amplifier 412 amplifies the radar receive signal 308, and the mixer 414 mixes the amplified radar receive signal 308 with the frequency-modulated radar signal 424. In particular, the mixer performs a beating operation, which downconverts and demodulates the radar receive signal 308 to generate a beat signal 426.

A frequency of the beat signal 426 (e.g., the beat frequency 312) represents a frequency difference between the frequency-modulated radar signal 424 and the radar receive signal 308, which is proportional to the slant range 304 of FIG. 3-1. Although not shown, the beat signal 426 can include multiple frequencies, which represents reflections from different objects or portions of an object within the external environment. In some cases, these different objects move at different speeds, move in different directions, or are positioned at different slant ranges relative to the radar system 102.

The filter 416 filters the beat signal 426, and the analog-to-digital converter 418 digitizes the filtered beat signal 426. The receive channels 410-1 to 410-M respectively generate digital beat signals 428-1 to 428-M, which are provided to the system processor 216 for processing. The receive channels 410-1 to 410-M of the transceiver 214 are coupled to the system processor 216, as shown in FIG. 5.

Figure 5:
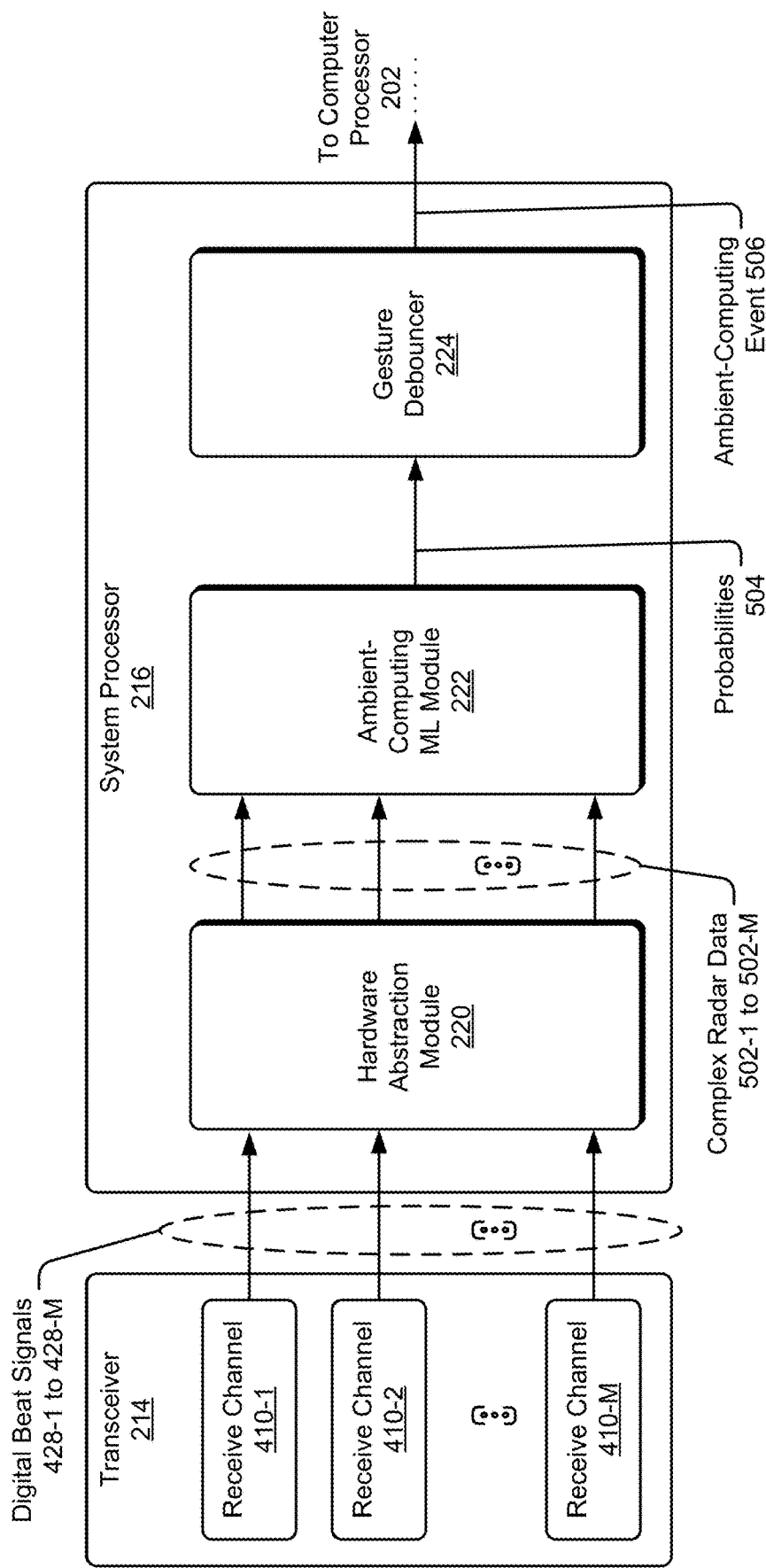
FIG. 5 illustrates an example scheme implemented by a radar system for ambient computing.

FIG. 5 illustrates an example scheme implemented by the radar system 102 for performing ambient computing. In the depicted configuration, the system processor 216 implements the hardware-abstraction module 220, the ambient-computing machine-learned module 222, and the gesture debouncer 224. The system processor 216 is connected to the receive channels 410-1 to 410-M and can also communicate with the computer processor 202 (of FIG. 2). Although not shown, the hardware-abstraction module 220, the ambient-computing machine-learned module 222, and/or the gesture debouncer 224 can alternatively be implemented by the computer processor 202.

In this example, the hardware-abstraction module 220 accepts the digital beat signals 428-1 to 428-M from the receive channels 410-1 to 410-M. The digital beat signals 428-1 to 428-M represent raw or unprocessed complex data. The hardware-abstraction module 220) performs one or more operations to generate complex radar data 502-1 to 502-M based on digital beat signals 428-1 to 428-M. The hardware-abstraction module 220 transforms the complex data provided by the digital beat signals 428-1 to 428-M into a form that is expected by the ambient-computing machine-learned module 222. In some cases, the hardware-abstraction module 220 normalizes amplitudes associated with different transmit power levels or transforms the complex data into a frequency-domain representation.

The complex radar data 502-1 to 502-M includes magnitude and phase information (e.g., in-phase and quadrature components or real and imaginary numbers). In some implementations, the complex radar data 502-1 to 502-M represents a range-Doppler map for each receive channel 410-1 to 410-M and for each active feature frame 318, as further described with respect to FIG. 6-2. The range-Doppler maps include implicit instead of explicit angular information. In other implementations the complex radar data 502-1 to 502-M includes explicit angular information. For example, the hardware abstraction module 220 can perform digital beamforming to explicitly provide the angular information, such as in the form of a four-dimensional range-Doppler-azimuth-elevation map.

Other forms of the complex radar data 502-1 to 502-M are also possible. For example, the complex radar data 502-1 to 502-M can include complex interferometry data for each receive channel 410-1 to 410-M. The complex interferometry data is an orthogonal representation of the range-Doppler map. In yet another example, the complex radar data 502-1 to 502-M includes frequency-domain representations of the digital beat signals 428-1 to 428-M for an active feature frame 318. Although not shown, other implementations of the radar system 102 can provide the digital beat signals 428-1 to 428-M directly to the ambient-computing machine-learned module 222. In general, the complex radar data 502-1 to 502-M includes at least Doppler information as well as spatial information for one or more dimensions (e.g., range, azimuth, or elevation).

Sometimes the complex radar data 502 can include a combination of any of the above examples. For instance, the complex radar data 502 can include magnitude information associated with the range-Doppler maps and complex interferometry data. In general, the gesture-recognition performance of the radar system 102 can improve if the complex radar data 502-1 to 502-M includes implicit or explicit information regarding an angular position of the object 302. This implicit or explicit can include phase information within the range-Doppler maps, angular information determined using beamforming techniques, and/or complex interferometry data.

The ambient-computing machine-learned module 222 can perform classification in which the ambient-computing machine-learned module 222 provides, for each of one or more classes, a numerical value descriptive of a degree to which it is believed that the input data should be classified into the corresponding class. In some instances, the numerical values provided by the ambient-computing machine-learned module 222 can be referred to as "confidence scores" that are indicative of a respective confidence associated with classification of the input into the respective class. In some implementations, the confidence scores can be compared to one or more thresholds to render a discrete categorical prediction. In some implementations, only a certain number of classes (e.g., one) with the relatively largest confidence scores can be selected to render a discrete categorical prediction.

In example implementations, the ambient-computing machine-learned module 222 can provide a probabilistic classification. For example, the ambient-computing machine-learned module 222 can be able to predict, given a sample input, a probability distribution over a set of classes. Thus, rather than outputting only the most likely class to which the sample input should belong, the ambient-computing machine-learned module 222 can output, for each class, a probability that the sample input belongs to such class. In some implementations, the probability distribution over all possible classes can sum to one.

The ambient-computing machine-learned module 222 can be trained using supervised learning techniques. For example, the machine-learned model can be trained on a training dataset that includes training examples labeled as belonging (or not belonging) to one or more classes. Further details regarding supervised training techniques are provided with respect to FIGS. 10-1 to 12.

As shown in FIG. 5, the ambient-computing machine-learned module 222 analyzes the complex radar data 502-1 to 502-M and generates probabilities 504. Some of the probabilities 504 are associated with various gestures that the radar system 102 can recognize. Another one of the probabilities 504 can be associated with a background task (e.g., background noise or gestures that are not recognized by the radar system 102). The gesture debouncer 224 analyzes the probabilities 504 to determine whether or not a user performed a gesture. If the gesture debouncer 224 determines that a gesture occurred, the gesture debouncer 224 informs the computer processor 202 of an ambient computing event 506. The ambient computing event 506 includes a signal that identifies an input associated with ambient computing. In this example, the signal identifies the recognized gesture and/or passes a gesture-control input to an application 206. Based on the ambient computing event 506, the computer processor 202 or the application 206 performs an action associated with the detected gesture or gesture-control input. Although described with respect to gestures, the ambient computing event 506 can be expanded to indicate other events, such as whether or not the user is present within a given distance. An example implementation of the hardware-abstraction module 220 is further described with respect to FIGS. 6-1 to 6-2.

Figures 1, 6:
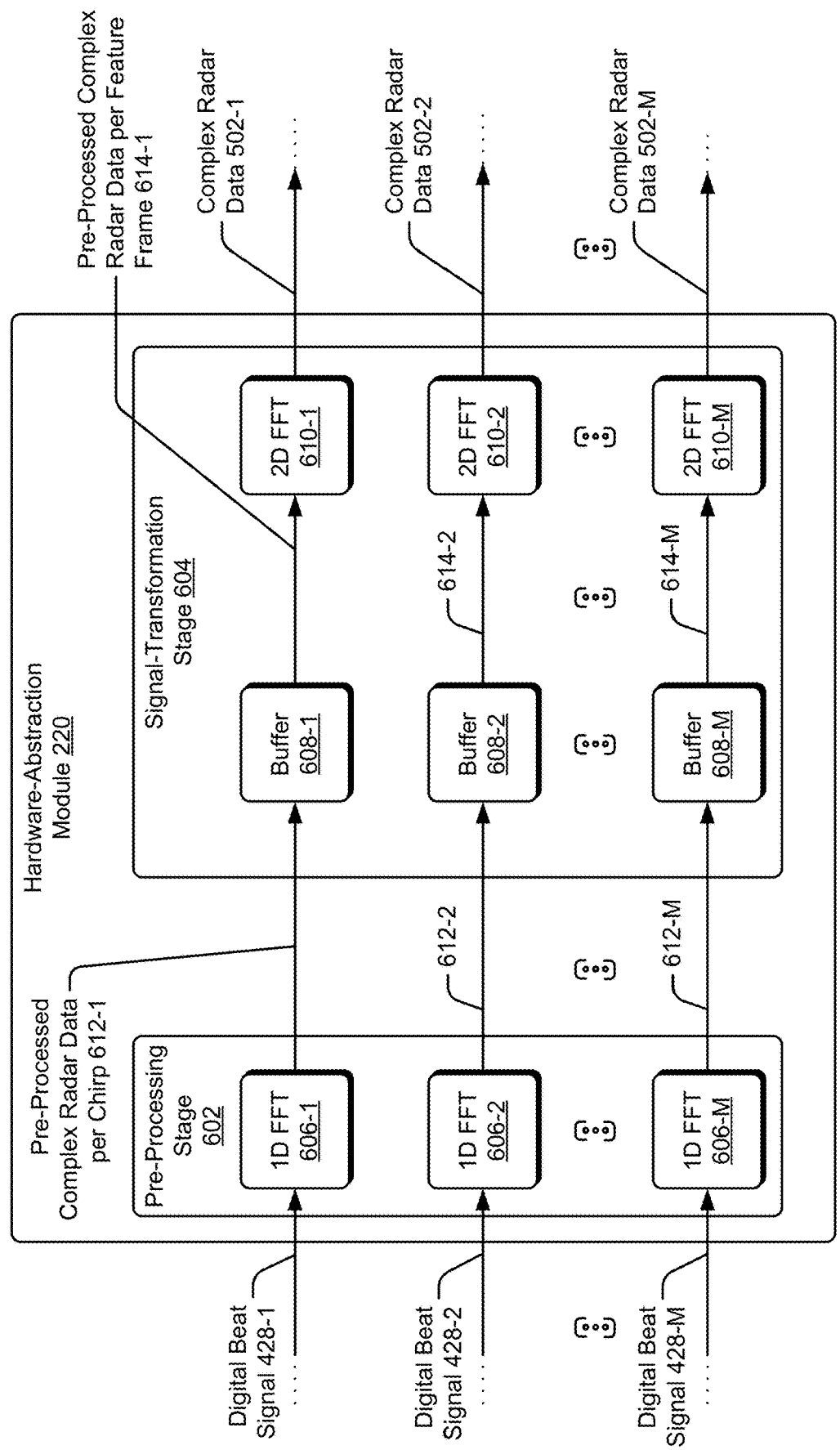
Figures 2, 6:
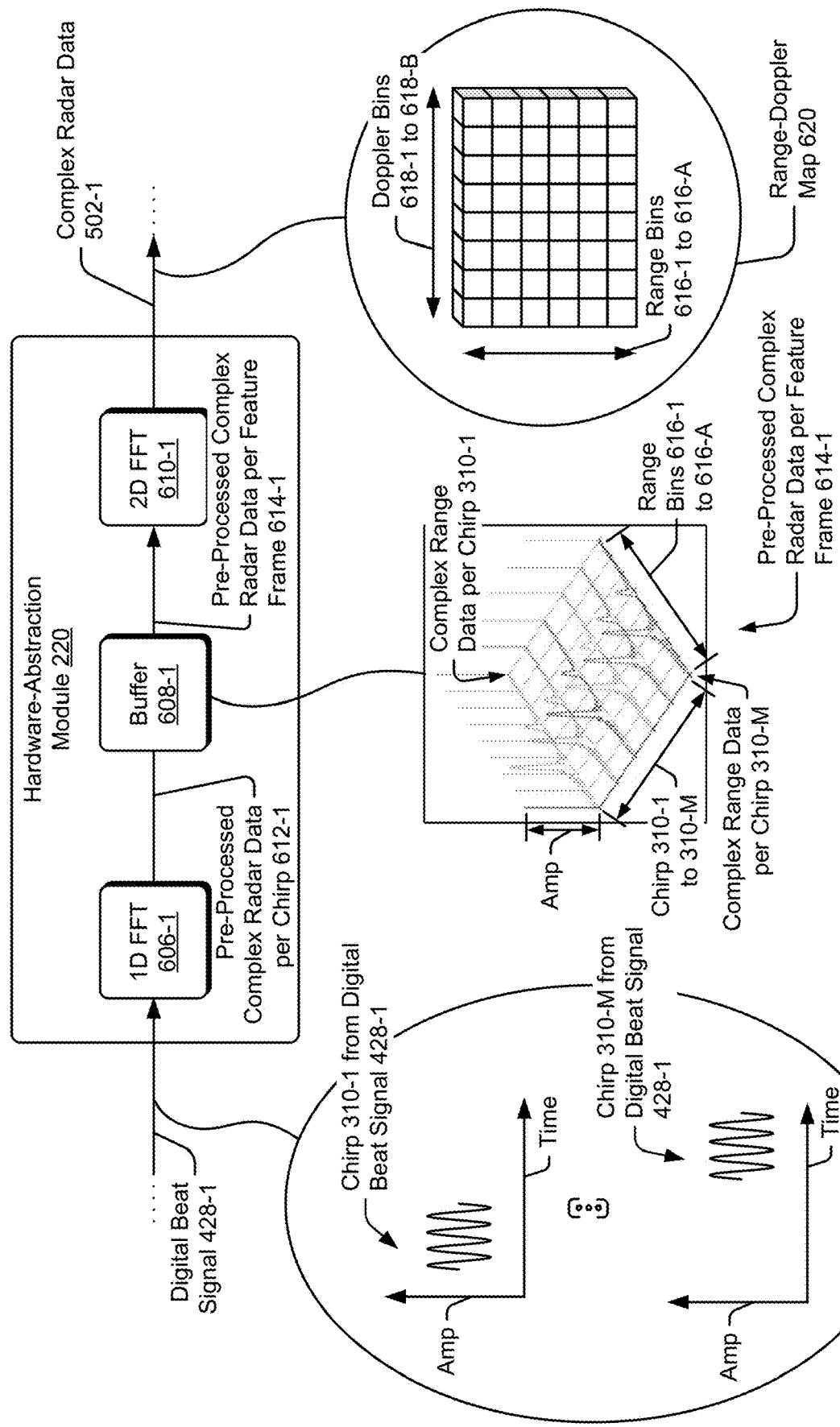

FIG. 6-1 illustrates an example hardware-abstraction module 220 for ambient computing. In the depicted configuration, the hardware-abstraction module 220 includes a pre-processing stage 602 and a signal-transformation stage 604. The pre-processing stage 602 operates on each chirp 310-1 to 310-N within the digital beat signals 428-1 to 428-M. In other words, the pre-processing stage 602 performs an operation for each active radar frame 324. In this example, the pre-processing stage 602 includes one-dimensional (1D) Fast-Fourier Transform (FFT) modules 606-1 to 606-M, which respectively process the digital beat signals 428-1 to 428-M. Other types of modules that perform similar operations are also possible, such as a Fourier Transform module.

The signal-transformation stage 604 operates on the sequence of chirps 310-1 to 310-M within each of the digital beat signals 428-1 to 428-M. In other words, the signal-transformation stage 604 performs an operation for each active feature frame 318. In this example, the signal-transformation stage 604 includes buffers 608-1 to 608-M and two-dimensional (2D) FFT modules 610-1 to 610-M.

During reception, the one-dimensional FFT modules 606-1 to 606-M perform individual FFT operations on the chirps 310-1 to 310-M within the digital beat signals 428-1 to 428-M. Assuming the radar receive signals 308-1 to 308-M include 16 chirps 310-1 to 310-N (e.g., N equals 16), each one-dimensional FFT module 606-1 to 606 M performs 16 FFT operations to generate pre-processed complex radar data per chirp 612-1 to 612-M. As the individual operations are performed, the buffers 608-1 to 608-M store the results. Once all of the chirps 310-1 to 310-M associated with an active feature frame 318 have been processed by the pre-processing stage 602. the information stored by the buffers 608-1 to 608-M represents pre-processed complex radar data per feature frame 614-1 to 614-M for the corresponding receive channels 410-1 to 410-M.

Two-dimensional FFT modules 610-1 to 610-M respectively process the pre-processed complex radar data per feature frame 614-1 to 614-M to generate the complex radar data 502-1 to 502-M. In this case, the complex radar data 502-1 to 502-M represents range-Doppler maps, as further described with respect to FIG. 6-2.

FIG. 6-2 illustrates example complex radar data 502-1 generated by the hardware-abstraction module 220 for ambient computing. The hardware-abstraction module 220 is shown to process a digital beat signal 428-1 associated with the receive channel 410-1. The digital beat signal 428-1 includes the chirps 310-1 to 310-M, which are time-domain signals. The chirps 310-1 to 310-M are passed to the one-dimensional FFT module 606-1 in an order in which they are received and processed by the transceiver 214.

As described above, the one-dimensional FFT module 606-1 performs an FFT operation on a first chirp 310-1 of the digital beat signal 428-1 at a first time. The buffer 608-1 stores a first portion of the pre-processed complex radar data 612-1, which is associated with the first chirp 310-1. The one-dimensional FFT module 606-1 continues to process subsequent chirps 310-2 to 310-N, and the buffer 608-1 continues to store the corresponding portions of the pre-processed complex radar data 612-1. This process continues until the buffer 608-1 stores a last portion of the pre-processed complex radar data 612-M, which is associated with the chirp 310-M.

At this point, the buffer 608-1 stores pre-processed complex radar data associated with a particular feature frame 614-1. The pre-processed complex radar data per feature frame 614-1 represents magnitude information (as shown) and phase information (not shown) across different chirps 310-1 to 310-N and across different range bins 616-1 to 616-A (or range intervals), where A represents a positive integer.

The two-dimensional FFT 610-1 accepts the pre-processed complex radar data per feature frame 614-1 and performs a two-dimensional FFT operation to form the complex radar data 502-1, which represents a range-Doppler map 620. The range-Doppler map 620 includes complex data for the range bins 616-1 to 616-A and Doppler bins 618-1 to 618-B (or Doppler-frequency intervals), where B represents a positive integer. In other words, each range bin 616-1 to 616-A and Doppler bin 618-1 to 618-B includes a complex number with real and/or imaginary parts that represent magnitude and phase information. The quantity of range bins 616-1 to 616-A can be on the order of tens or hundreds, such as 32, 64, or 128 (e.g., A equals 32, 64, or 128). The quantity of Doppler bins can be on the order of tens or hundreds, such as 16, 32, 64, or 124 (e.g., B equals 16, 32, 64, or 124). In a first example implementation, the quantity of range bins is 64 and the quantity of Doppler bins is 16. In a second example implementation, the quantity of range bins is 128 and the quantity of Doppler bins is 16. The quantity of range bins can reduced based on an expected slant range 304 of the gestures. The complex radar data 502-1, along with the complex radar data 502-2 to 502-M (of FIG. 6-1), are provided to the ambient-computing machine-learned module 222, as shown in FIG. 7-1.

Figures 1, 7:
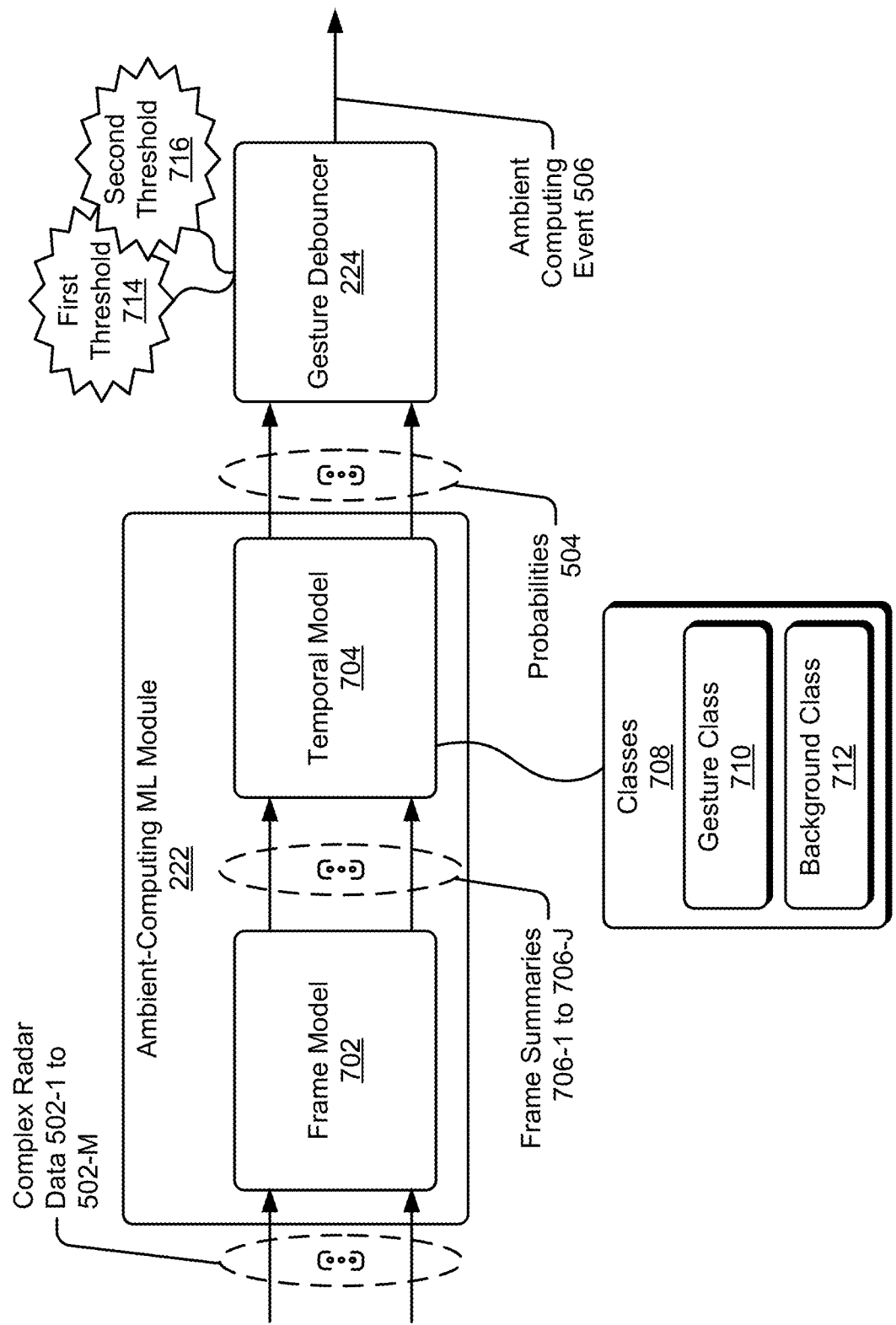
Figures 2, 7:
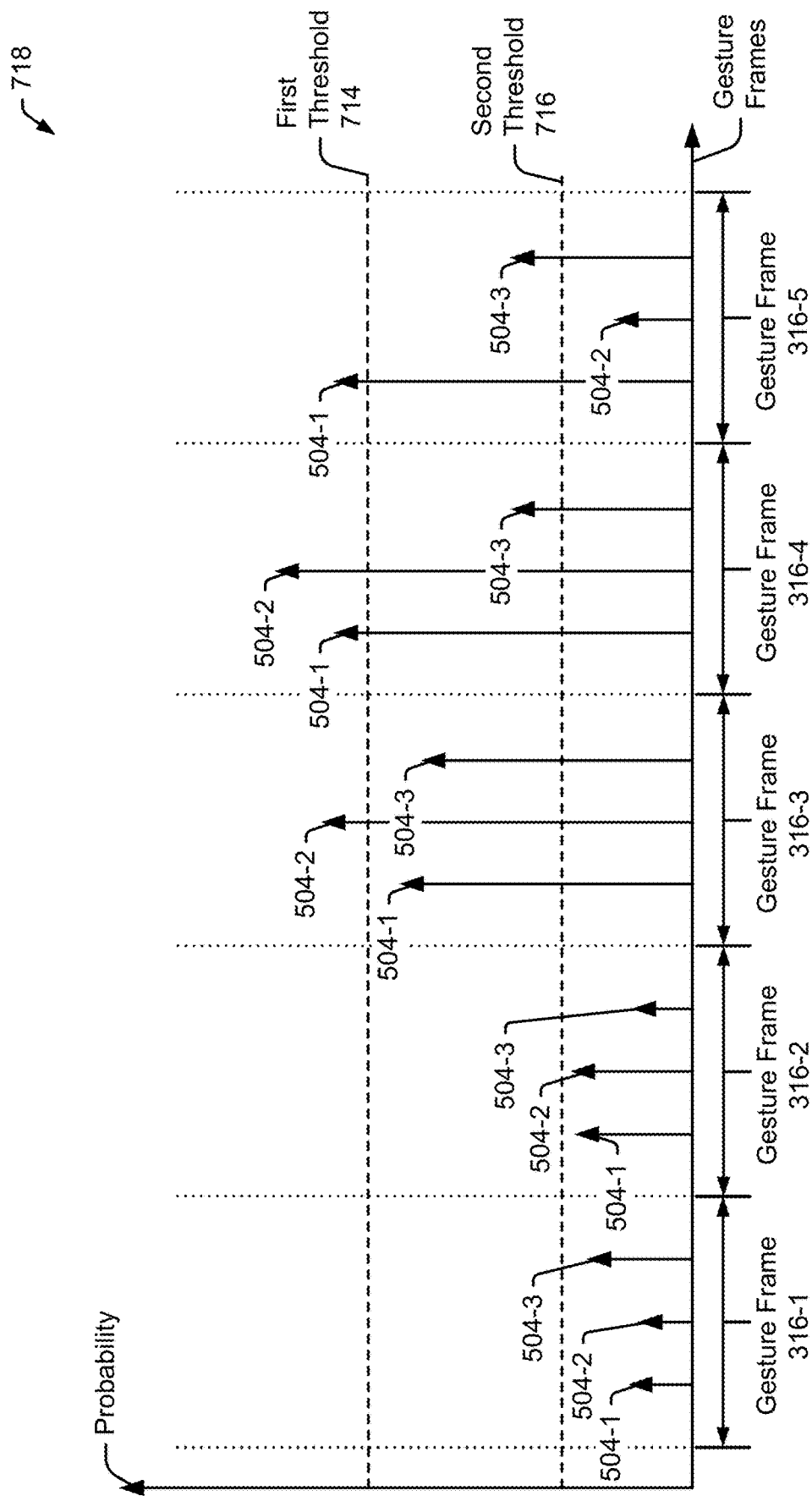

FIG. 7-1 illustrates examples of the ambient-computing machine-learned module 222 and the gesture debouncer 224. The ambient-computing machine-learned module 222 has a multi-stage architecture, which includes a first stage and a second stage. In the first stage, the ambient-computing machine-learned module 222 processes complex radar data 502 across a spatial domain, which involves processing the complex radar data 502 on a feature-frame-by-feature-frame basis. The first stage is represented by a frame model 702. Example implementations of the frame model 702 are further described with respect to FIGS. 8-1, 8-2, 9-1, and 9-2.

In the second stage, the ambient-computing machine-learned module 222 concatenates summaries of multiple feature frames 318. These multiple feature frames 318 can be associated with a gesture frame 316. By concatenating the summaries, the second stage processes the complex radar data 502 across a temporal domain on a gesture-frame-by-gesture-frame basis. In some implementations, the gesture frames 316 overlap in time such that consecutive gesture frames 316 may share at least one feature frame 318. In other implementations, the gesture frames 316 are distinct and do not overlap in time. In this case, each gesture frame 316 includes a unique set of feature frames 318. In example aspects, the gesture frames 316 have a same size or duration. Explained another way, the gesture frames 316 can be associated with a same quantity of feature frames 318. The second stage is represented by a temporal model 704.

With the multi-stage architecture, an overall size and inference time of the ambient-computing machine-learned module 222 can be significantly less compared to other types of machine-learned modules. This can enable the ambient-computing machine-learned module 222 to run on smart devices 104 with limited computational resources.

During operation, the frame model 702 accepts complex radar data 502-1 to 502-M from the hardware-abstraction module 220. As an example, the complex radar data 502-1 to 502-M can include a set of complex numbers for a feature frame 318. Assuming the complex radar data 502-1 to 502-M represents a range-Doppler map 620, each complex number can be associated with a particular range bin 616 (e.g., range interval or slant range interval), Doppler bin 618 (or Doppler-frequency interval), and receive channel 410.

In some implementations, the complex radar data 502 is filtered prior to providing the complex radar data 502 to the frame model 702. For example, the complex radar data 502 can be filtered to remove reflections associated with stationary objects (e.g., objects within one or more "center" or "slow" Doppler bins 618). Additionally or alternatively, the complex radar data 502 can be filtered based on a distance threshold. For instance, if the radar system 102 is designed to recognize gestures in the context of ambient computing up to certain distances (e.g., up to approximately 1.5 meters), the distance threshold can be set to exclude range bins 616 associated with distances that are greater than the distance threshold. This effectively reduces a size of the complex radar data 502 and increases a computational speed of the ambient-computing machine-learned module 222. In a first example implementation, a filter reduces the quantity of range bins from 64 range bins to 24 range bins. In a second example implementation, the filter reduces the quantity of range bins from 128 range bins to 64 range bins.

Also, the complex radar data 502 can be reshaped prior to providing the complex radar data 502 to the frame model 702. For example, the complex radar data 502 can be reshaped into an input tensor having a first dimension associated with a quantity of range bins 616, a second dimension associated with a quantity of Doppler bins 618, and a third dimension associated with a quantity of receive channels 410 multiplied by two. Multiplying the quantity of receive channels 410 by two accounts for real and imaginary values of the complex radar data 502. In example implementations, the input tensor can have dimensions of 24×16×6 or 64×16×6.

The frame model 702 analyzes the complex radar data 502 and generates frame summaries 706-1 to 706-J (e.g., one frame summary 706 for each feature frame 318). The frame summaries 706-1 to 706-J are one dimensional representations of the multi-dimensional complex radar data 502 for multiple feature frames 318. The temporal model 704 accepts the frame summaries 706-1 to 706-J associated with a gesture frame 316. The temporal model 704 analyzes the frame summaries 706-1 to 706-J and generates the probabilities 504 associated with one or more classes 708.

Example classes 708 include at least one gesture class 710 and at least one background class 712. The gesture classes 710 represent various gestures that the ambient-computing machine-learned module 222 is trained to recognize. These gestures can include the right swipe 112, the left swipe 114, the up swipe 118, the down swipe 120, the omni swipe 124, the tap, or some combination thereof. The background class 712 can encompass background noise or any other type motion that is not associated with the gesture classes 710, including gestures that the ambient-computing machine-learned module 222 is not trained to recognize.

In a first implementation, the ambient-computing machine-learned module 222 groups the classes 708 according to three predictions. The three predictions can include a portrait prediction, a landscape prediction, or an omni prediction. Each prediction includes two or three classes 708. For example, the portrait prediction includes the background class 712 and gesture classes 710 associated with the right swipe 112 and the left swipe 114. The landscape prediction includes the background class 712 and gesture classes 710 associated with the up swipe 118 and the down swipe 120. The omni prediction includes the background class 712 and a gesture class 710 associated with the omni swipe 124. In this case, the classes 708 are mutually exclusive within each prediction, however the classes 708 between two predictions may not be mutually exclusive. For example, the right swipe 112 of the portrait prediction can correspond to the down swipe 120 of the landscape prediction. Also, the left swipe 114 of the portrait prediction can correspond to the up swipe 118 of the landscape prediction. Additionally, the gesture class 710 associated with the omni swipe 124 can correspond to any directional swipe in the other predictions. Within each prediction, the probabilities 504 of the classes 708 sum up to one.

In a second implementation, the ambient-computing machine-learned module 222 does not group the classes 708 into various predictions. As such, the classes 708 are mutually exclusive and the probabilities 504 sum up to one. In this example, the classes 708 include the background class 712 and gesture classes 710 associated with the right swipe 112, the left swipe 114, the up swipe 118, the down swipe 120, and the tap.

The gesture debouncer 224 detects an ambient computing event 506 by evaluating the probabilities 504. The gesture debouncer 224 enables the radar system 102 to recognize gestures from a continuous data stream while keeping the false positive rate below a false-positive-rate threshold. In some cases, the gesture debouncer 224 can utilize a first threshold 714 and/or a second threshold 716. A value of the first threshold 714 is determined so as to ensure that the radar system 102 can quickly and accurately recognize different gestures performed by different users. The value of the first threshold 714 can be determined experimentally to balance the radar system 102's responsiveness and false positive rate. In general, the gesture debouncer 224 can determine that a gesture is performed if a probability 504 associated with a corresponding gesture class 710 is higher than the first threshold 714. In some implementations, the probability 504 for the gesture has to be higher than the first threshold 714 for multiple consecutive feature frames 318, such as two, three, or four consecutive feature frames 318.

The gesture debouncer 224 can also use the second threshold 716 to keep the false positive rate below the false-positive-rate threshold. In particular, after the gesture is detected, the gesture debouncer 224 prevents another gesture from being detected until the probabilities 504 associated with the gesture classes 710 are less than the second threshold 716. In some implementations, the probabilities 504 of the gesture classes 710 have to be less than the second threshold 716 for multiple consecutive feature frames 318, such as two, three, or four consecutive feature frames 318. As an example, the second threshold 716 can be set to approximately 0.3%. An example operation of the gesture debouncer 224 is further described with respect to FIG. 7-2.

FIG. 7-2 illustrates an example graph 718 of probabilities 504 across multiple gesture frames 316. For simplicity, three probabilities 504-1, 504-2, and 504-3 are shown in the graph 718. These probabilities 504-1 to 504-3 are associated with different gesture classes 710. Although only three probabilities 504-1 to 504-3 are shown, the operations described below can apply to other implementations with other quantities of gesture classes 710 and probabilities 504. In the graph 718, the probability 504 associated with the background class 712 is not explicitly shown for simplicity.

As seen in the graph 718, the probabilities 504-1 to 504-3 are below the first threshold 714 and the second threshold 716 for gesture frames 316-1 and 316-2. For the gesture frame 316-3, the probability 504-2 is greater than the first threshold 714. Also, the probabilities 504-1 and 504-3 are between the first threshold 714 and the second threshold 716 for the gesture frame 316-3. For the gesture frame 316-4, the probabilities 504-1 and 504-2 are above the first threshold 714 and the probability 504-3 is between the first threshold 714 and the second threshold 716. For the gesture frame 316-5, the probability 504-1 is greater than the first threshold 714, the probability 504-2 is below the second threshold 716, and the probability 504-3 is between the first threshold 714 and the second threshold 716.

During operation, the gesture debouncer 224 can detect an ambient computing event 506 responsive to one of the probabilities 504-1 to 504-3 being greater than the first threshold 714. In particular, the gesture debouncer 224 identifies a highest probability of the probabilities 504. If the highest probability is associated with one of the gesture classes 710 and not the background class 712, the gesture debouncer 224 detects the ambient computing event 506 associated with the gesture class 710 with the highest probability. In the case of the gesture frame 316-3, the gesture debouncer 224 can detect an ambient computing event 506 associated with the gesture class 710 that corresponds to the probability 504-2, which is greater than the first threshold 714. If more than one probability 504 is greater than the first threshold 714, such as in the gesture frame 316-4, the gesture debouncer 224 can detect an ambient computing event 506 associated with the gesture class 710 that corresponds to the highest probability 504, which is the probability 504-2 in this example.

To reduce false positives, the gesture debouncer 224 can detect an ambient computing event 506 responsive to a probability 504 being greater than the first threshold 714 for multiple consecutive gesture frames 316, such as two consecutive gesture frames 316. In this case, the gesture debouncer 224 does not detect an ambient computing event 506 at the gesture frame 316-3 because the probability 504-2 is below the first threshold 714 for the previous gesture frame 316-2. However, the gesture debouncer 224 detects the ambient computing event 506 at the gesture frame 316-4 because the probability 504-2 is greater than the first threshold 714 for the consecutive gesture frames 316-3 and 316-4. With this logic, the gesture debouncer 224 can also detect another ambient computing event 506 as occurring during the gesture frame 316-5 based on the probability 504-1 being greater than the first threshold 714 for the consecutive gesture frames 316-4 and 316-5.

After a user performs a gesture, the user may make other motions that can cause the probabilities 504 of the gesture classes 710 to be higher than expected. To reduce a likelihood that these other motions cause the gesture debouncer 224 to incorrectly detect a subsequent ambient computing event 506, the gesture debouncer 224 can apply additional logic that references the second threshold 716. In particular, the gesture debouncer 224 can prevent a subsequent ambient computing event 506 from being detected until the probabilities 504 associated with the gesture classes 710 are less than the second threshold 716 for one or more gesture frames 316.

With this logic, the gesture debouncer 224 can detect the ambient computing event 506 at the gesture frame 316-4 because the probabilities 504-1 to 504-3 were less than the second threshold 716 one or more gesture frames prior to the gesture frame 316-4 (e.g., at gesture frames 316-1 and 316-2). However, because the gesture debouncer 224 detects the ambient computing event 506 at the gesture frame 316-4, the gesture debouncer 224 does not detect another ambient computing event 506 at the gesture frame 316-5, even though the probability 504-1 is greater than the first threshold 714. This is because the probabilities 504-1 to 504-3 did not have a chance to decrease below the second threshold 716 for one or more gesture frames 316 after the ambient computing event 506 was detected at the gesture frame 316-4.

Figures 1, 8:
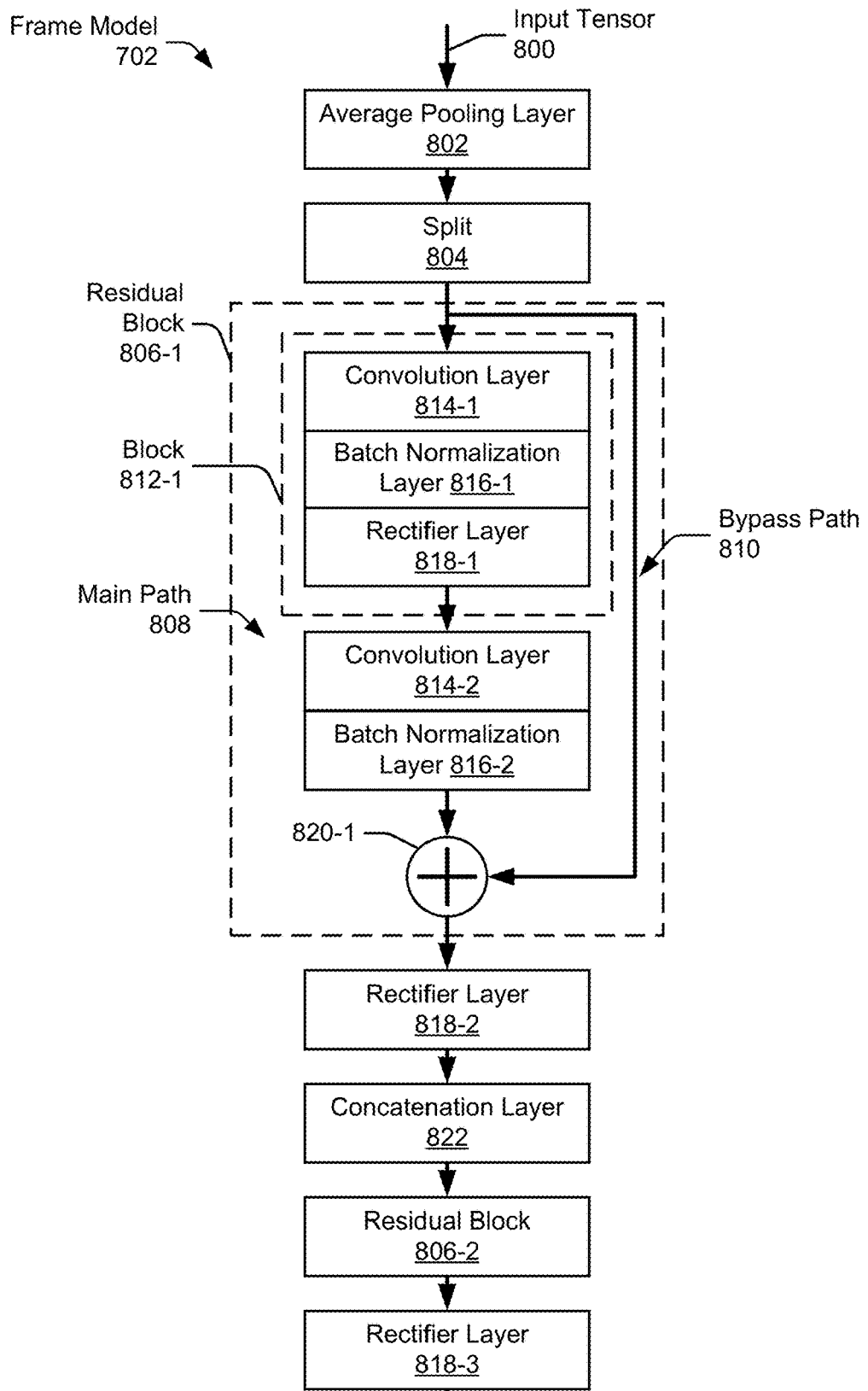
Figures 2, 8:
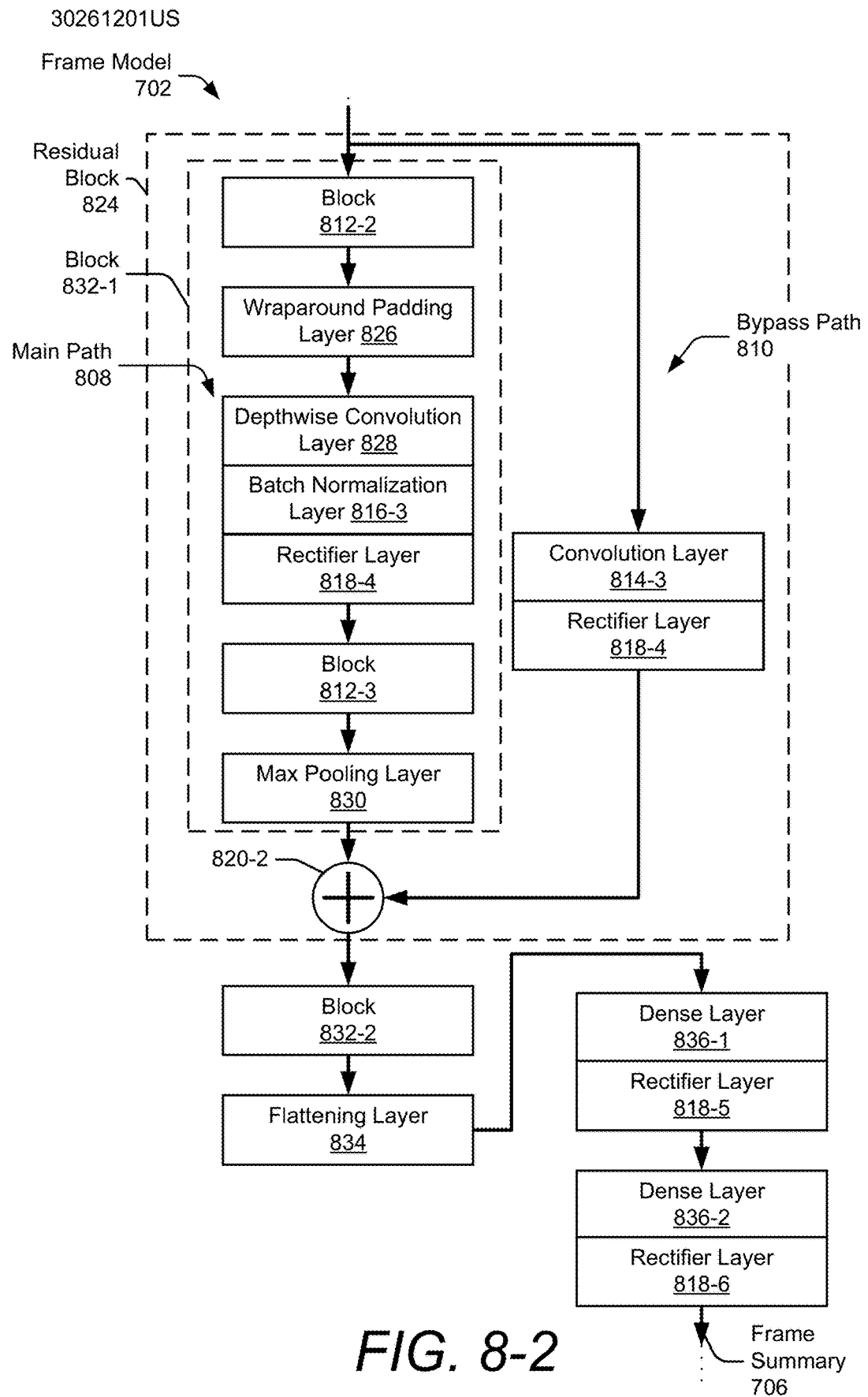
Figures 3, 8:
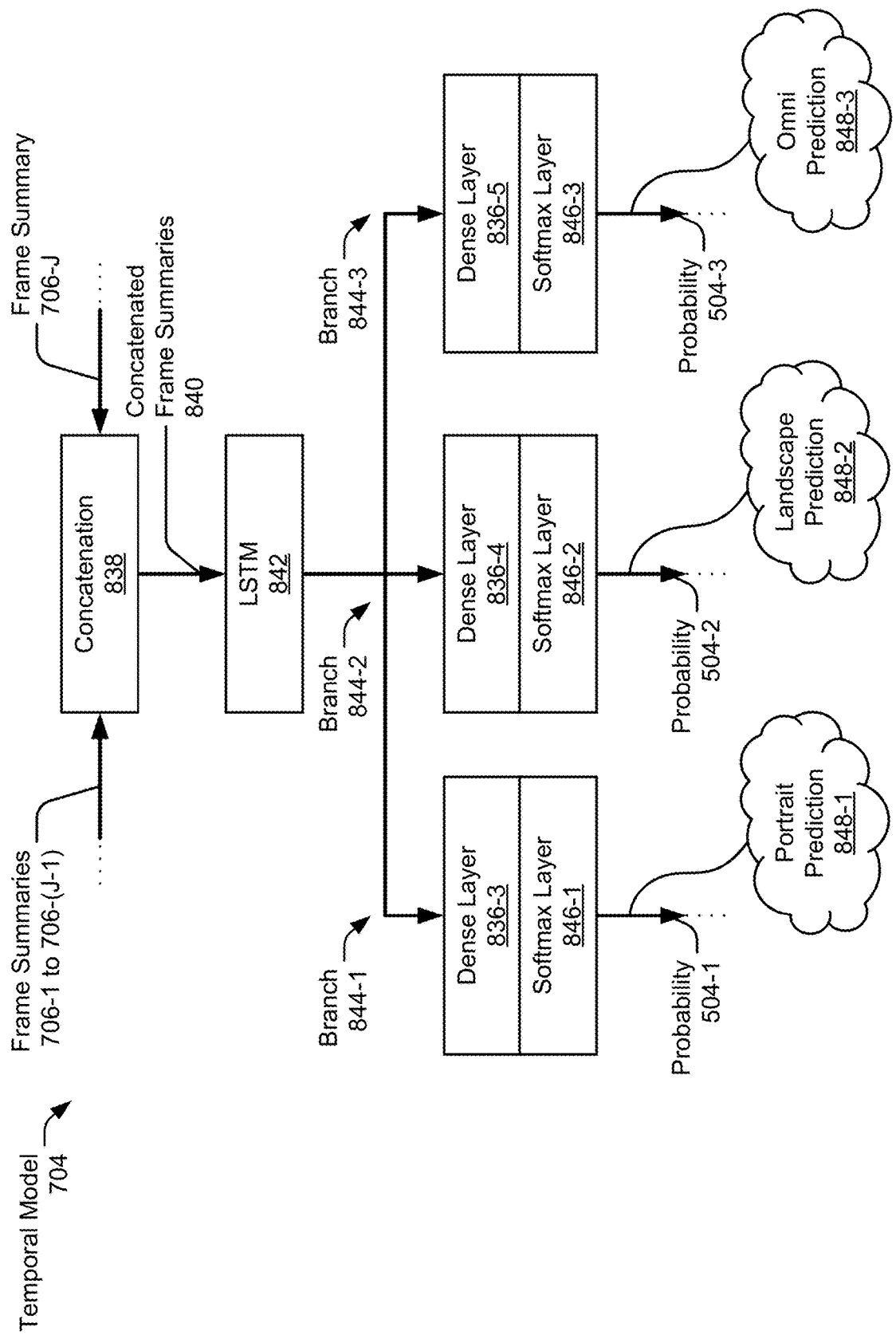

A first example implementation of the ambient-computing machine-learned module 222 is described with respect to FIGS. 8-1 to 8-3. This ambient-computing machine-learned module 222 is designed to recognize directional swipes and the omni swipe 124 of FIG. 1-2. A second example implementation of the ambient-computing machine-learned module 222 is described with respect to FIGS. 9-1 to 9-3. This ambient-computing machine-learned module 222 is designed to recognize directional swipes and the tap gesture. Additionally, the ambient-computing machine-learned module 222 of FIGS. 9-1 to 9-3 enable recognition of gestures at farther distances compared to the ambient-computing machine-learned module 222 of FIGS. 8-1 to 8-3.

FIGS. 8-1 and 8-2 illustrate an example frame model 702 for ambient computing. In general, the frame model 702 includes convolution, pooling, and activation layers utilizing residual blocks. In the depicted configuration shown in FIG. 8-1, the frame model 702 includes an average pooling layer 802, a split 804, and a first residual block 806-1. The average pooling layer 802 accepts an input tensor 800, which includes the complex radar data 502. As an example, the input tensor 800 can have dimensions of 24×16×6. The average pooling layer 802 performs downsampling, which reduces a size of the input tensor 800. By reducing the size of the input tensor 800, the average pooling layer 802 can reduce a computational cost of the ambient-computing machine-learned module 222. The split 804 splits the input tensor along the range dimension.

The first residual block 806-1 performs calculations similar to interferometry. In an example implementation, the first residual block 806-1 can be implemented as a 1×1 residual block. The first residual block 806-1 includes a main path 808 and a bypass path 810. The main path 808 includes a first block 812-1, which includes a first convolution layer 814-1, a first batch normalization layer 816-1, and a first rectifier layer 818-1 (e.g., a rectified linear unit (ReLU)). The first convolution layer 814-1 can be implemented as a 1×1 convolution layer. In general, batch normalization layers is a generalization technique that can help reduce overfitting of the ambient-computing machine-learned module 222 to the training data. In this example, the bypass path 810 does not include another layer.

The main path 808 also includes a second convolution layer 814-2 and a second batch normalization layer 816-2. The second convolution layer 814-2 can be similar to the first convolution layer 814-1 (e.g., can be a 1×1 convolution layer). The main path 808 additionally includes a first summation layer 820-1, which combines outputs from the main path 808 and the bypass path 810 together using summation. After the first residual block 806-1, the frame model 702 includes a second rectifier layer 818-2, a concatenation layer 822, a second residual block 806-2, and a third rectifier layer 818-3. The second residual block 806-2 can have a same structure as the first residual block 806-1, which is described above. A structure of the frame model 702 is further described with respect to FIG. 8-2.

In the depicted configuration shown in FIG. 8-2, the frame model 702 also includes a residual block 824. The residual block 824 is different than the first and second residual blocks 806-1 and 806-2. The residual block 824, for instance, can be implemented as a 3×3 residual block. Along the main path 808, the residual block 824 includes a second block 812-2, which has a same structure as the first block 812-1. The main path 808 also includes a wraparound padding layer 826, a depthwise convolution layer 828, a third batch normalization layer 816-3, a fourth rectifier layer 818-4, a third block 812-3, and a max pooling layer 830. The depthwise convolution layer 828 can be implemented as a 3×3 depthwise convolution layer. The third block 812-3 has a same structure as the first and second blocks 812-1 and 812-2. The second block 812-2, the wraparound padding layer 826, the depthwise convolution layer 828, the third batch normalization layer 816-3, the fourth rectifier layer 818-4, the third block 812-3, and the max pooling layer 830 represent a first block 832-1.

Along the bypass path 810, the residual block 822 includes a third convolution layer 814-3 and a rectifier layer 818-4. The third convolution layer 814-3 can be implemented as a 1×1 convolution layer. The residual block 822 also includes a second summation layer 820-2, which combines outputs of the main path 808 and the bypass path 810 together using summation.

After the residual block 824, the frame model 702 includes a second block 832-2, which has a similar structure as the first block 832-1. The frame model 702 also includes a flattening layer 834, a first dense layer 836-1, a fifth rectifier layer 818-5, a second dense layer 836-2, and a sixth rectifier layer 818-6. The frame model 702 outputs a frame summary 706 (e.g., one of the frame summaries 706-1 to 706-J), which is associated with a current feature frame 318. In an example implementation, the frame summary 706 has a single dimension with 32 values. The frame summary 706 can be stored in memory, such as within the system medium 218 or the computer-readable medium 204. Over time, multiple frame summaries 706 are stored in the memory. The temporal model 704 processes the multiple frame summaries 706, as further described with respect to FIG. 8-3.

FIG. 8-3 illustrates an example temporal model 704 for ambient computing. The temporal model 704 accesses previous frame summaries 706-1 to 706-(J−1) from a memory and concatenates the previous frame summaries 706-1 to 706-(J−1) with a current frame summary 706-J, as represented by concatenation 838. This set of concatenated frame summaries 840 (e.g., the concatenated frame summaries 706-1 to 706-J) can be associated with a current gesture frame 316. In an example implementation, the quantity of frame summaries 706 is 12 (e.g., J equals 12).

The temporal model 704 includes a long short-term memory (LSTM) layer 842 and three branches 844-1, 844-2, and 844-3. The branches 844-1 to 844-3 include respective dense layers 836-3, 836-4, and 836-5 and respective softmax layers 846-1, 846-2, and 846-3. The softmax layers 846-1 to 846-3 can be used to squash a set of real values respectively associated with the possible classes 708 to a set of real values in the range of zero to one that sum to one. Each branch 844 generates probabilities 504 for classes 708 associated with a particular prediction 848. For example, a first branch 844-1 generates probabilities 504 associated with a portrait prediction 848-1. A second branch 844-2 generates probabilities 504 associated with a landscape prediction 848-2. A third branch 844-3 generates probabilities 504 associated with an omni prediction 848-3. In general, the temporal model 704 can be implemented with any quantity of branches 844, including one branch, two branches, or eight branches.

The convolution layers 814 described in FIGS. 8-1 and 8-2 can use circular padding in the Doppler dimension to compensate for Doppler aliasing. The convolution layers 814 of FIGS. 8-1 and 8-2 can also use zero padding in the range dimension. Another implementation of the ambient-computing machine-learned module 222 is further described with respect to FIGS. 9-1 to 9-3.

Figures 1, 9:
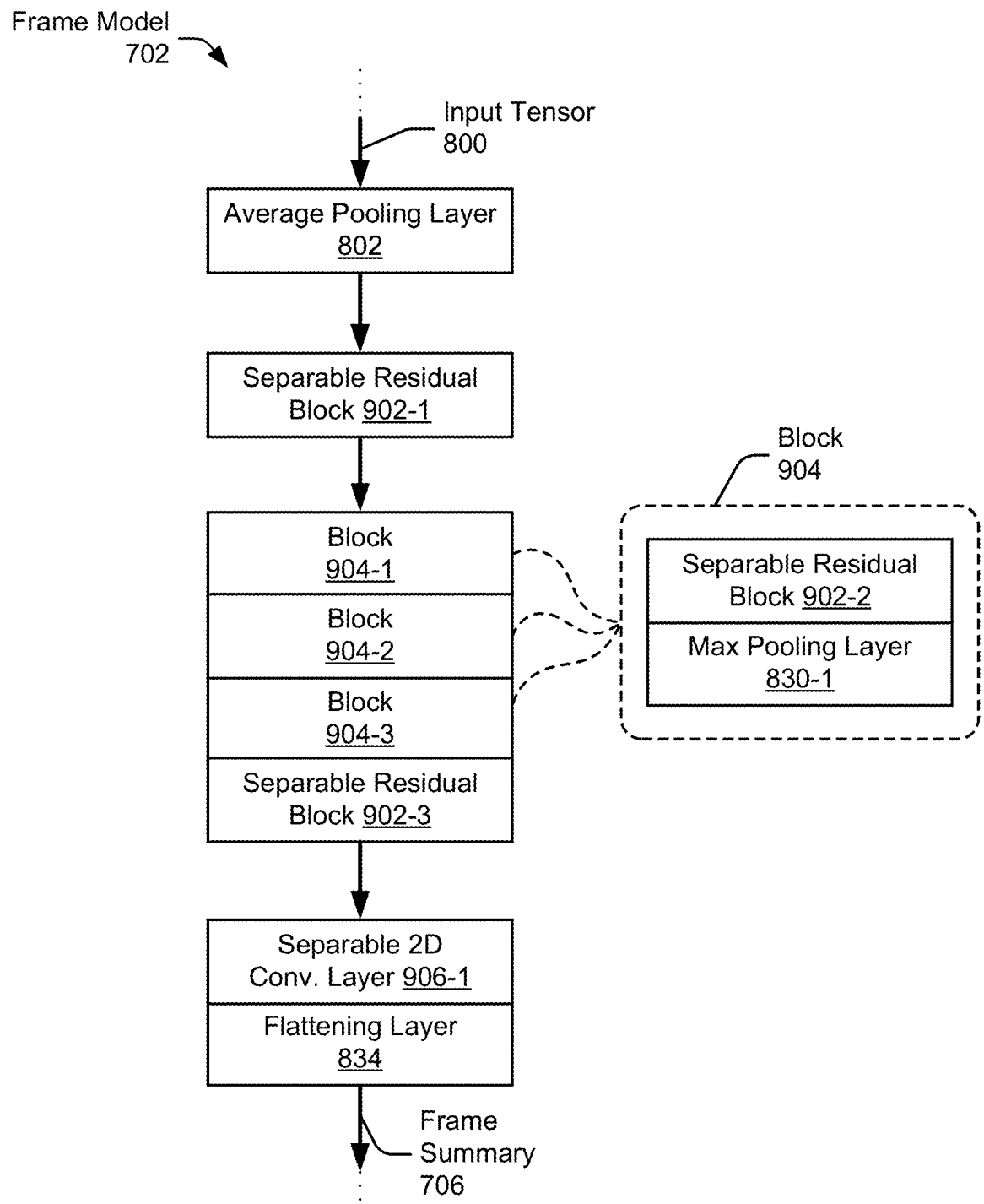
Figures 2, 9:
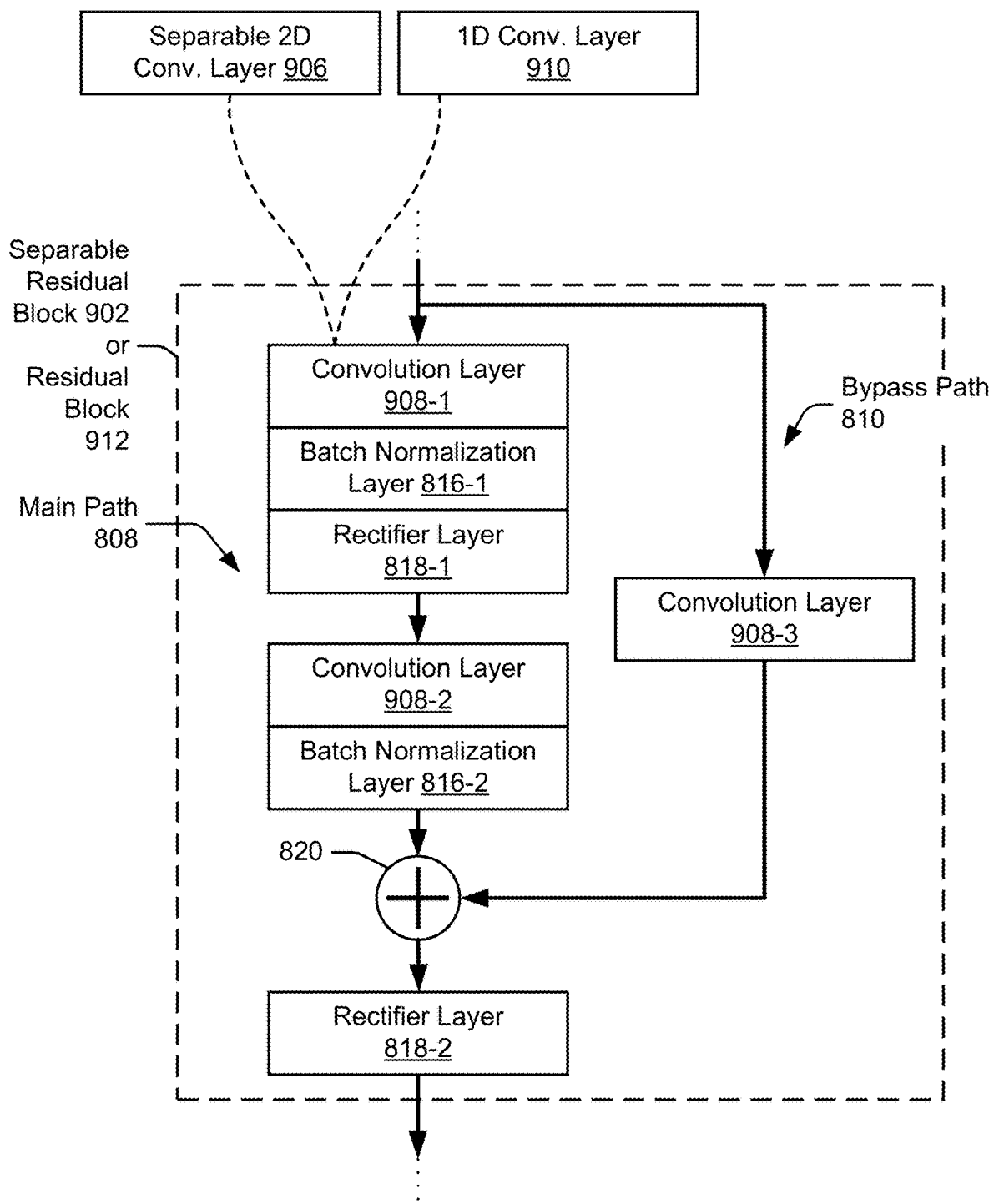
Figures 3, 9:
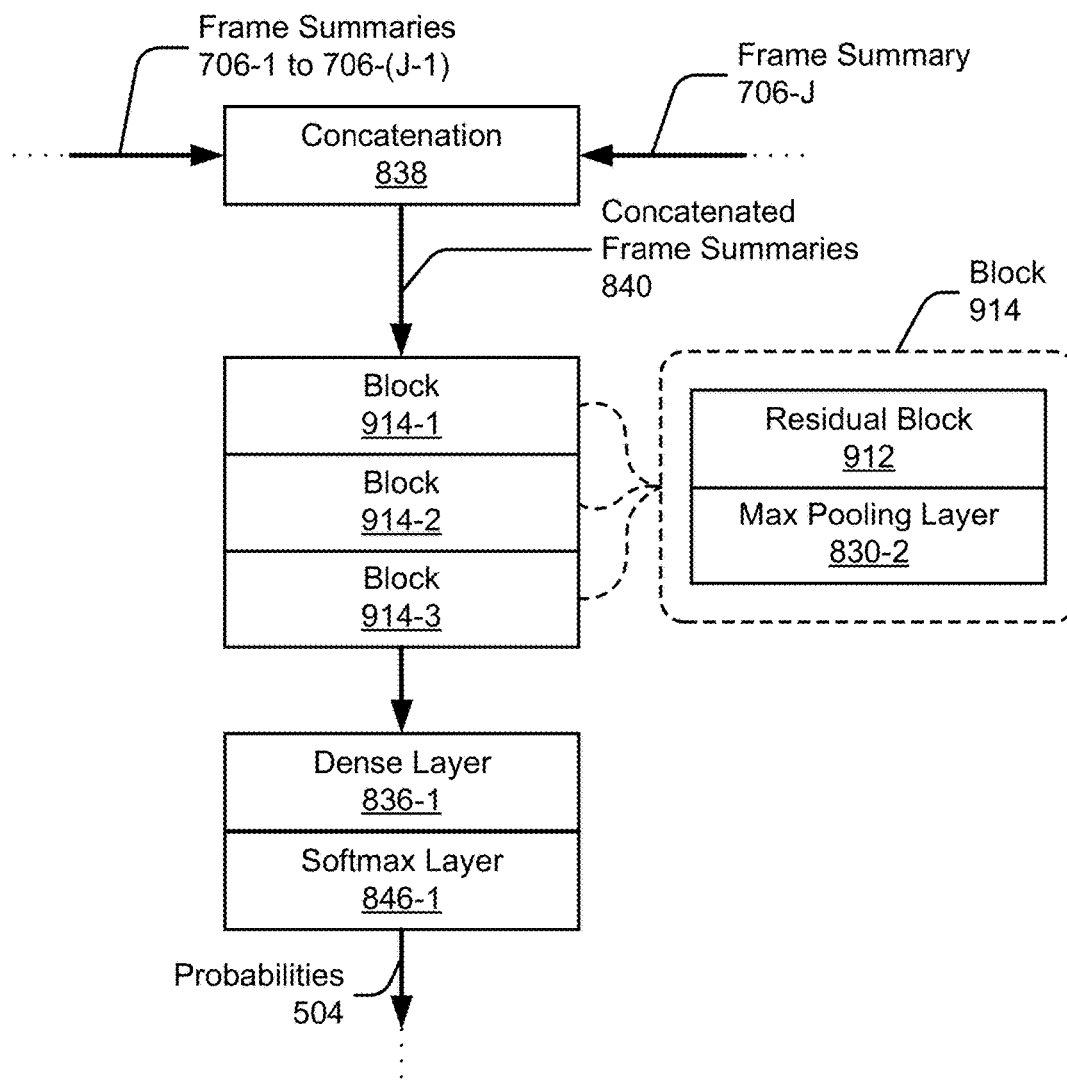

FIG. 9-1 illustrates another example frame model 702 for ambient computing. In contrast to the frame model 702 of FIGS. 8-1 and 8-2, the frame model 702 of FIG. 9-1 employs separable residual blocks 902. In particular, the frame model 702 of FIG. 9-1 processes an input tensor using a series of separable residual blocks 902 and max pooling layers 830 to generate a frame summary 706.

As shown in FIG. 9-1, the frame model 702 includes the average pooling layer 802 and a separable residual block

902-1, which operates across multiple dimensions. The average pooling layer 802 of FIG. 9-1 can operate in a similar manner as the average pooling layer 802 of FIG. 8-1. For example, the average pooling layer 802 accepts an input tensor 800, which includes the complex radar data 502. As an example, the input tensor 800 can have dimensions of 64×16×6. The average pooling layer 802 performs downsampling, which reduces a size of the input tensor 800. By reducing the size of the input tensor, the average pooling layer 802 can reduce a computational cost of the ambient-computing machine-learned module 222. The separable residual block 902-1 can include layers that operate with a 1×1 filter. The separable residual block 902-1 is further described with respect to FIG. 9-2.

FIG. 9-2 illustrates an example separable residual block 902 for ambient computing. The separable residual block 902 includes the main path 808 and the bypass path 810. Along the main path 808, the separable residual block 902 includes a first convolution layer 908-1, a first batch normalization layer 816-1, a first rectifier layer 818-1, a second convolution layer 908-2, and a second batch normalization layer 816-2. The convolution layers 908-1 and 908-2 are implemented as separable two-dimensional convolution layers 906 (or more generally separable multi-dimensional convolution layers). By using separable convolution layers 906 instead of standard convolution layers in the separable residual block 902, the computational cost of the separable residual block 902 can be significantly reduced at the cost of a relatively small decrease in accuracy performance.

The separable residual block 902 also includes a third convolution layer 908-3 along the bypass path 810, which can be implemented as a standard two-dimensional convolution layer. A summation layer 820 of the separable residual block 902 combines outputs of the main path 808 and the bypass path 810 together using summation. The separable residual block 902 also includes a second rectifier layer 818-2.

Returning to FIG. 9-1, the frame model 702 includes a series of blocks 904, which are implemented using a second separable residual block 902-2 and a first max pooling layer 830-1. The second separable residual block 902-2 can have a similar structure as the first separable residual block 902-1 and use layers that operate with a 3×3 filter. The first max pooling layer 830-1 can perform operations with a 2×2 filter. In this example, the frame model 702 includes three blocks 904-1, 904-2, and 904-3, which are positioned in series. The frame model 702 also includes a third separable residual block 902-3, which can have layers that operate with a 3×3 filter.

Additionally, the frame model 702 includes a first separable two-dimensional convolution layer 906-1, which can operate with a 2×4 filter. The first separable two-dimensional convolution layer 906-1 compresses the complex radar data 502 across the multiple receive channels 410. The frame model 702 also includes a flattening layer 846.

An output of the frame model 702 is a frame summary 706. In an example implementation, the frame summary 706 has a single dimension with 36 values. The frame summary 706 can be stored in memory, such as within the system medium 218 or the computer-readable medium 204. Over time, multiple frame summaries 706 are stored in the memory. The temporal model 704 processes multiple frame summaries 706, as further described with respect to FIG. 9-3.

FIG. 9-3 illustrates an example temporal model 704 for ambient computing. The temporal model 704 accesses previous frame summaries 706-1 to 706-(J−1) from the memory and concatenates the previous frame summaries 706-1 to 706-(J−1) with a current frame summary 706-J, as represented by concatenation 838. This set of concatenated frame summaries 840 (e.g., the concatenated frame summaries 706-1 to 706-J) can be associated with a current gesture frame 316. In an example implementation, the quantity of frame summaries 706 is 30 (e.g., J equals 30).

The temporal model 704 includes a series of blocks 914, which include a residual block 912 and a second max pooling layer 830-2. The residual block 912 can be implemented as a one-dimensional residual block, and the second max pooling layer 830-2 can be implemented as a one-dimensional max pooling layer. In this example, the temporal model 704 includes blocks 914-1, 914-2, and 914-3. The residual block 912 is further described with respect to FIG. 9-2.

As seen in FIG. 9-2, the residual block 912 can have a similar structure as the separable residual block 902. There are some differences, however, between the separable residual block 902 and the residual block 912. For instance, the separable residual block 902 uses multi-dimensional convolution layers and some of the convolution layers are separable convolution layers. In contrast, the residual block 912 uses one-dimensional convolution layers and the convolution layers are standard convolution layers, instead of separable convolution layers. In the context of the residual block 912, the first, second, and third convolution layers 908-1 to 908-3 are implemented as one-dimensional convolution layers 910. In an alternative implementation, the blocks 914-1 to 914-3 are replaced with a long short-term memory layer. The long short-term memory layer can improve performance at the expense of increasing computational cost.

Returning to FIG. 9-3, the temporal model 704 also includes a first dense layer 828-1 and a softmax layer 846-1. The temporal model 704 outputs the probabilities 504 associated with the classes 708.

Figures 1, 10:
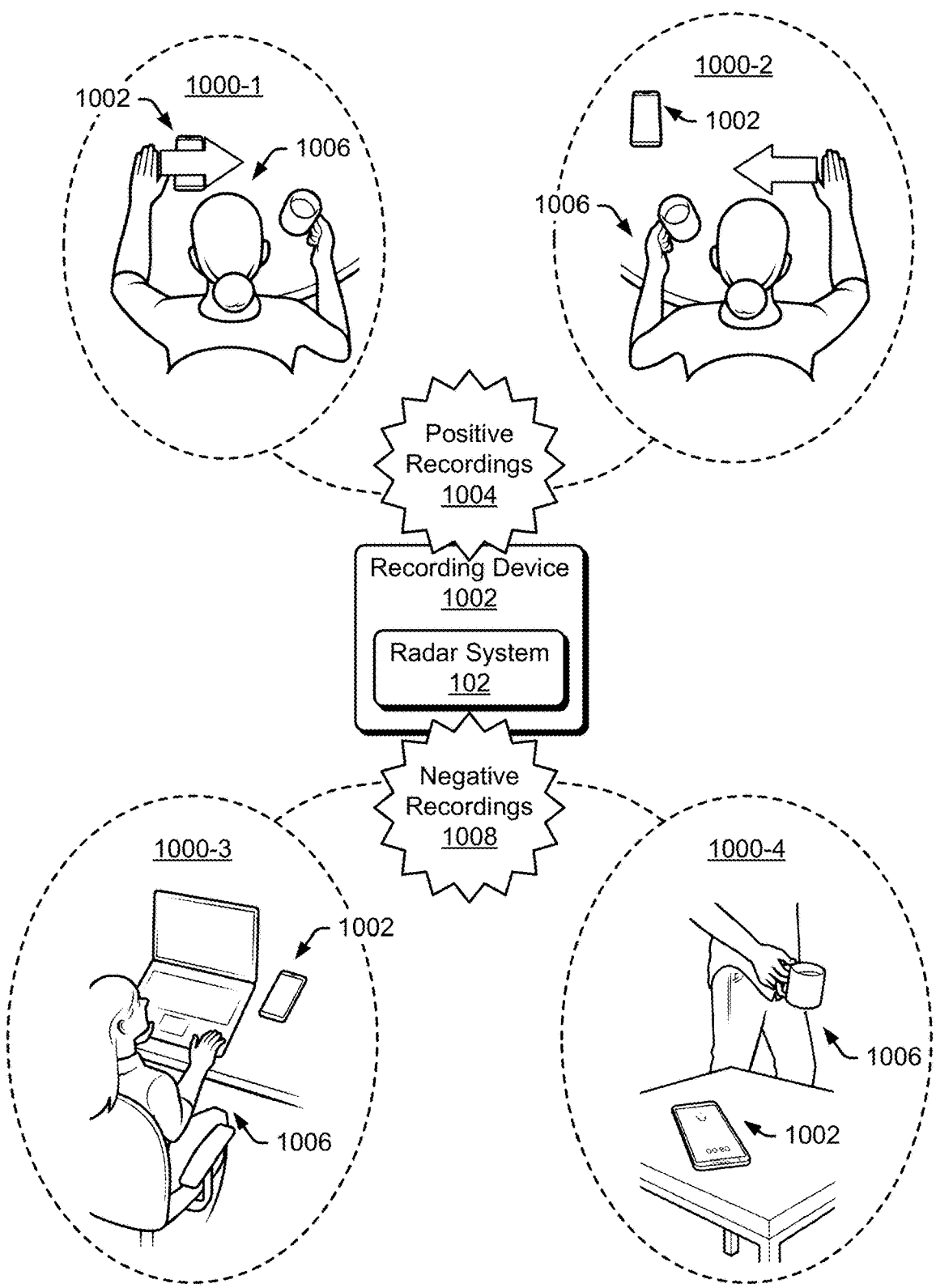
Figures 2, 10:
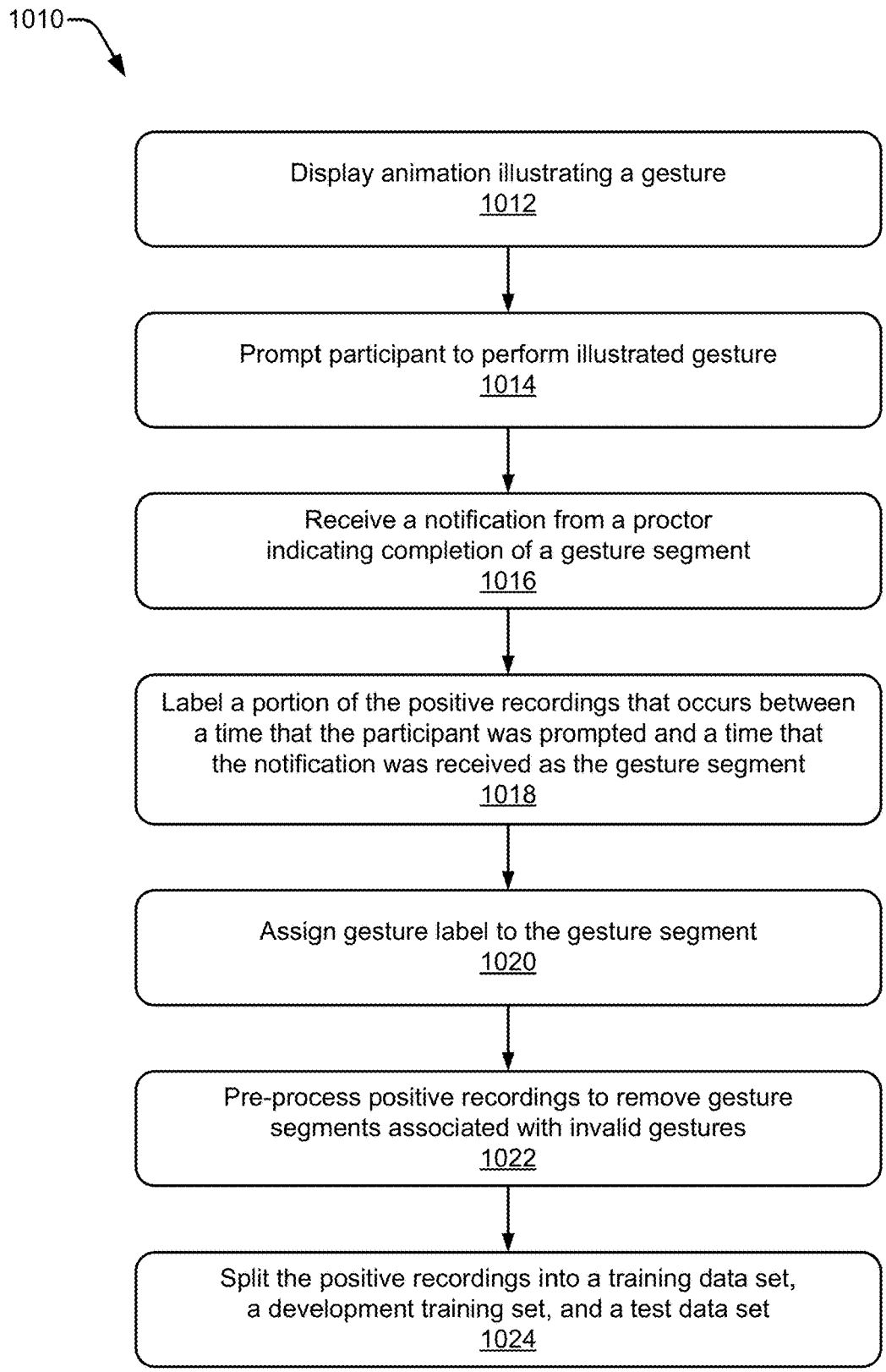
Figures 3, 10:
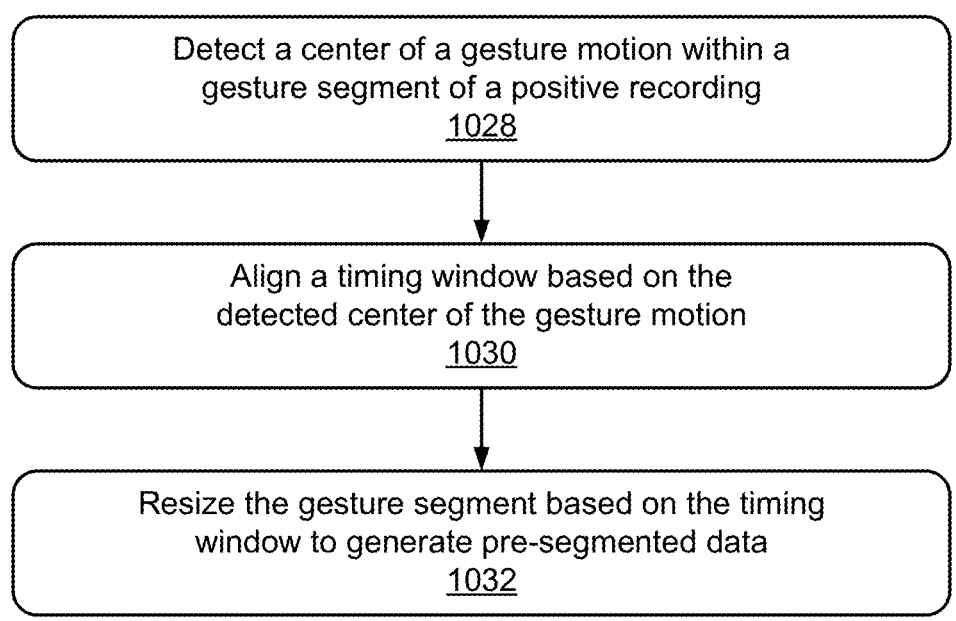

Training Machine-Learned Modules for
Radar-Based Gesture Detection in an Ambient
Compute Environment FIG. 10-1 illustrates example environments 1000-1 to 1000-4 in which data can be collected for training machine-learned module for radar-based gesture detection in an ambient compute environment. In the depicted environments 1000-1 to 1000-4, a recording device 1002 includes the radar system 102. The recording device 1002 and/or the radar system 102 are capable of recording data. In some cases, the recording device 1002 is implemented as the smart device 104.

In the environments 1000-1 and 1000-2, the radar system 102 collects positive recordings 1004 as a participant 1006 performs gestures. In the environment 1000-1, the participant 1006 performs a right swipe 112 using a left hand. In the environment 1000-2, the participant 1006 performs a left swipe 114 using a right hand. In general, the positive recordings 1004 represent complex radar data 502 that is recorded by the radar system 102 or the recording device 1002 during time periods in which participants 1006 perform gestures associated with the gesture classes 710.

The positive recordings 1004 can be collected using participants 1006 with various heights and handedness (e.g., right-handed, left-handed, or ambidextrous). Also, the positive recordings 1004 can be collected with the participant 1006 located at various positions relative to the radar system 102. For example, the participant 1006 can perform gestures at various angles relative to the radar system 102, including angles between approximately −45 and 45 degrees. As another example, the participant 1006 can perform gestures at various distances from the radar system 102, including distances between approximately 0.3 and 2 meters. Additionally, the positive recordings 1004 can be collected with the participant 1006 using various postures (e.g., sitting, standing, or lying down), with different recording device 1002 placements (e.g., on a desk or in the participant 1006's hand), and with various orientations of the recording device 1002 (e.g., a portrait orientation, a landscape orientation with the side 108-3 at the participant's right, or a landscape orientation with the side 108-3 at the participant's left).

In the environments 1000-3 and 1000-4, the radar system 102 collects negative recordings 1008 as a participant 1006 performs background tasks. In the environment 1000-3, the participant 1006 operates a computer. In the environment 1000-4, the participant 1006 moves around the recording device 1002 with a cup. In general, the negative recordings 1008 represent complex radar data 502 that is recorded by the radar system 102 during time periods in which participants 1006 perform background tasks associated with the background class 712 (or tasks not associated with the gesture class 710).

In the environments 1000-3 and 1000-4, the participants 1006 may perform background motions that resemble gestures associated with one or more of the gesture classes 710. For example, the participant 1006 in the environment 1000-3 can move their hand between the computer and a mouse, which may resemble a directional swipe gesture. As another example, the participant 1006 in the environment 1000-4 may place the cup down on a table next to the recording device 1002 and pick the cup back up, which may resemble a tap gesture. By capturing these gesture-like background motions in the negative recordings 1008, the radar system 102 can be trained to distinguish between background tasks with gesture-like motions and intentional gestures meant to control the smart device 104.

The negative recordings 1008 can be collected in various environments, including a kitchen, a bedroom, or a living room. In general, the negative recordings 1008 capture natural behaviors around the recording device 1002, which can include the participant 1006 reaching to pick up the recording device 1002, dancing nearby, walking, cleaning a table with the recording device 1002 on the table, or turning a car's steering wheel while the recording device 1002 is in a holder. The negative recordings 1008 can also capture repetitions of hand movements similar to swipe gestures, such as moving an object from one side of the recording device 1002 to the other side. For training purposes, the negative recordings 1008 are assigned a background label, which distinguishes it from the positive recordings 1004. To further improve performance of the ambient-computing machine-learned module 222, the negative recordings 1008 can optionally be filtered to extract samples associated with motions with velocities higher than a predefined threshold.

The positive recordings 1004 and the negative recordings 1008 are split or divided to form a training data set, a development data set, and a test data set. A ratio of positive recordings 1004 to negative recordings 1008 in each of the data sets can be determined to maximize performance. In example training procedures, the ratio is 1:6 or 1:8. The training and evaluation of the ambient-computing machine-learned module 222 is further described with respect to FIG. 12. The capturing of the positive recordings 1004 is further described with respect to FIG. 10-2.

FIG. 10-2 illustrates an example flow diagram 1010 for collecting positive recordings 1004 for training machine-learned modules to perform radar-based gesture detection in an ambient compute environment. At 1012, the recording device 1002 displays an animation, which illustrates a gesture (e.g., one of the gestures associated with the gesture classes 710). For example, the recording device 1002 can show the participant 1006 an animation of a particular swipe gesture or tap gesture.

At 1014, the recording device 1002 prompts the participant 1006 to perform the illustrated gesture. In some cases, the recording device 1002 displays a notification to the participant 1006 or plays an audible tone to prompt the participant 1006. The participant 1006 performs the gesture after receiving the prompt. Also, the radar system 102 records the complex radar data 502 to generate the positive recordings 1004.

At 1016, the recording device 1002 receives a notification from a proctor who is monitoring the data collection effort. The notification indicates completion of a gesture segment. At 1008, the recording device 1002 labels a portion of the positive recordings 1004 that occurs between a time that the participant was prompted at 1004 and a time that the notification was received at 1006 as the gesture segment. At 1020, the recording device 1002 assigns a gesture label to the gesture segment. The gesture label indicates the gesture class 710 associated with the animation displayed at 1012.

At 1022, the recording device 1002 (or another device) pre-processes the positive recordings 1004 to remove gesture segments associated with invalid gestures. Some gesture segments can be removed if their durations were longer or shorter than expected. This might occur if the participant 1006 was too slow in performing the gesture. At 1024, the recording device 1002 (or the other device) splits the positive recordings 1004 into the training data set, the development data set, and the test data set.

The positive recordings 1004 may include delays between when the recording device 1002 prompting the participants 1006 at 1014 and when the participants 1006 started performing the gesture. Additionally, the positive recordings 1004 may include delays between when the participants 1006 completed performing the gesture and the recording device 1002 received the notification at 1016. To refine the timings of the gesture segments within the positive recordings 1004, additional operations can be performed, as further described with respect to FIG. 10-3.

FIG. 10-3 illustrates an example flow diagram 1026 for refining timings of the gesture segments within the positive recordings 1004. At 1028, the recording device 1002 detects a center of a gesture motion within a gesture segment of a positive recording 1004. As an example, the recording device 1002 detects, within a given gesture segment, a zero-Doppler crossing. The zero-Doppler crossing can refer to an instance in time in which the motion of the gesture changes between a positive and a negative Doppler bin 618. Explained another way, the zero-Doppler crossing can refer to an instance in time in which a Doppler-determined range rate changes between a positive value and a negative value. This indicates a time in which a direction of the gesture motion become substantially perpendicular to the radar system 102, such as during a swipe gesture. It can also indicate a time in which a direction of the gesture motion reverses and the gesture motion became substantially stationary, such as at the middle position 140 of the tap gesture, as shown in FIG. 1-3. Other indicators can be used to detect a center point of other types of gestures.

At 1030, the recording device 1002 aligns a timing window based on the detected center of the gesture motion. The timing window can have a particular duration. This duration can be associated with a particular quantity of feature frames 318, such as 12 or 30 feature frames 318. In general, the quantity of feature frames 318 is sufficient to capture the gestures associated with the gesture classes 710. In some cases, an additional offset is included within the timing window. The offset can be associated with a duration of one or more feature frames 318. A center of the timing window can be aligned with the detected center of the gesture motion.

At 1032, the recording device 1002 resizes the gesture segment based on the timing window to generate pre-segmented data. For example, the size of the gesture segment is reduced to include samples associated with the aligned timing window. The pre-segmented data can be provided as the training data set, the development data set, and a portion of the test data set. The positive recordings 1004 and/or the negative recordings 1008 can be augmented to further enhance training of the ambient-computing machine-learned module 222, as further described with respect to FIG. 11.

Figure 11:
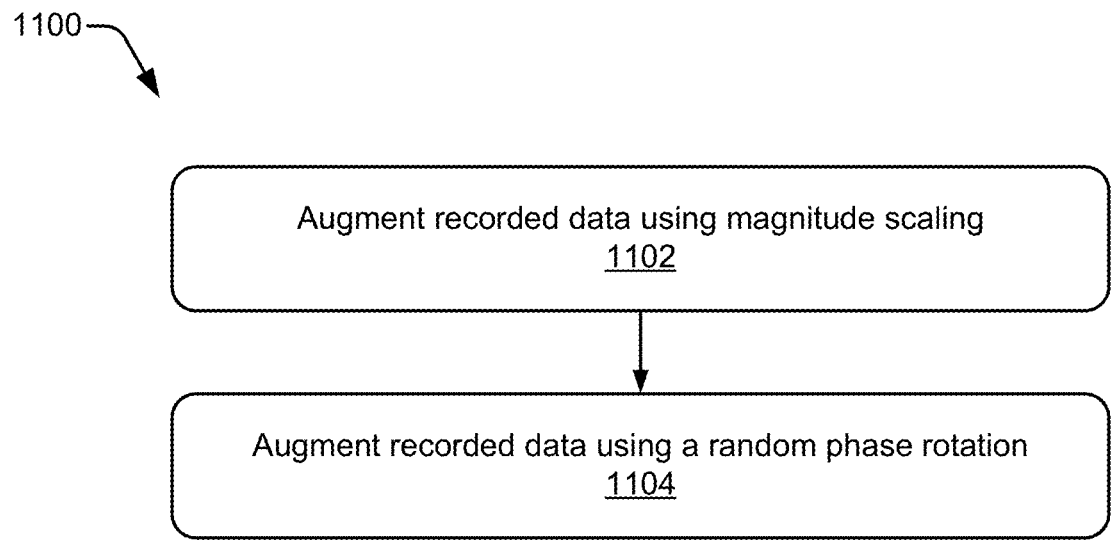
FIG. 11 illustrates an example flow diagram for augmenting positive and/or negative recordings.

FIG. 11 illustrates an example flow diagram 1100 for augmenting the positive recordings 1004 and/or the negative recordings 1008. With data augmentation, the training of the ambient-computing machine-learned module 222 can be more generalized. In particular, it can lessen the impact of potential biases within the positive recordings 1004 and the negative recordings 1008 that are specific to the recording device 1002 or the radar system 102 associated with the recording device 1002. In this manner, data augmentation enables the ambient-computing machine-learned module 222 to ignore certain kinds of noise inherent within the recorded data.

An example bias can be present within the magnitude information of the complex radar data 502. The magnitude information, for instance, can be dependent upon process variations in manufacturing the antenna array 212 of the radar system 102. Also, the magnitude information can be biased by the signal reflectivity of scattering surfaces and the orientations of these surfaces.

Another example bias can be present within the phase information of the complex radar data 502. There are two types of phase information associated with the complex radar data 502. A first type of phase information is an absolute phase. The absolute phases of the complex radar data 502 can be dependent upon surface positions, phase noise, and errors in sampling timings. A second type of phase information includes relative phases across different receive channels 410 of the complex radar data 502. The relative phases can correspond to an angle of scattering surfaces around the radar system 102. In general, it is desirable to train the ambient-computing machine-learned module 222 to learn to evaluate the relative phase instead of the absolute phase. However, this can be challenging as the absolute phases can have biases, which the ambient-computing machine-learned module 222 may recognize and rely upon to make a correct prediction.

To improve the positive recordings 1004 or negative recordings 1008 in a manner that reduces the impact of these biases on the training of the ambient-computing machine-learned module 222, additional training data is generated by augmenting the recorded data. At 1102, for example, recorded data is augmented using magnitude scaling. In particular, magnitudes of the positive recordings 1004 and/or the negative recordings 1008 are scaled with a scaling factor chosen from a normal distribution. In an example aspect, the normal distribution has a mean of 1 and a standard deviation of 0.025.

At 1104, the recorded data is additionally or alternatively augmented using a random phase rotation. In particular, a random phase rotation is applied to the complex radar data 502 within the positive recordings 1004 and/or the negative recordings 1008. The random phase values can be chosen from a uniform distribution between −180 and 180 degrees. In general, the data augmentation enables the recorded data to be varied artificially in a cost-effective way that doesn't require additional data to be collected.

Figure 12:
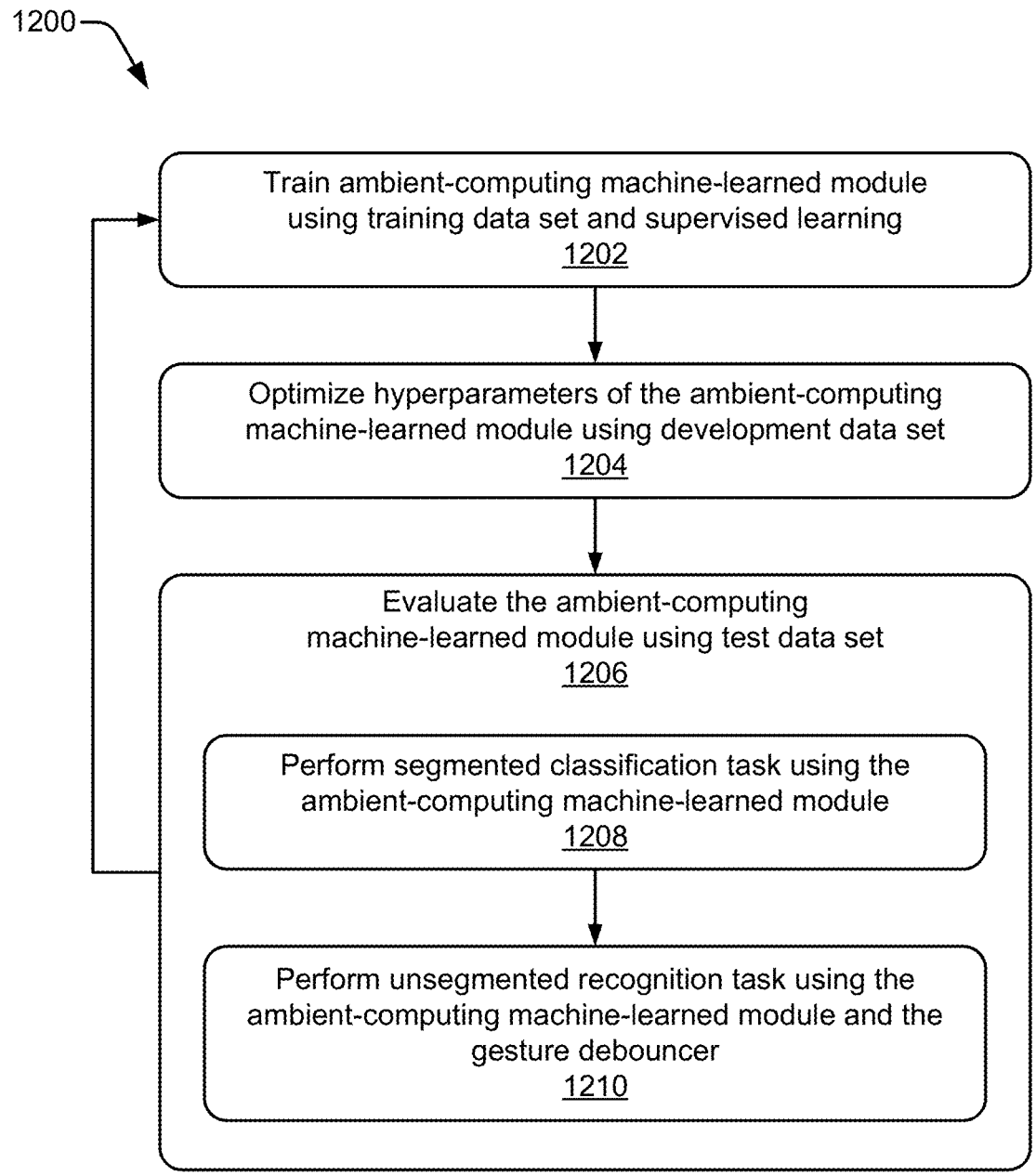
FIG. 12 illustrates an example flow diagram for training a radar system to perform ambient computing.

FIG. 12 illustrates an example flow diagram 1200 for training machine-learned modules to perform radar-based gesture detection in an ambient compute environment. At 1202, the ambient-computing machine-learned module 222 is trained using the training data set and supervised learning. As described above, the training data set can include pre-segmented data generated at 1032. This training enables optimization of internal parameters of the ambient-computing machine-learned module 222, including weights and biases.

At 1204, hyperparameters of the ambient-computing machine-learned module 222 are optimized using the development data set. As described above, the development data set can include pre-segmented data generated at 1032. In general, hyperparameters represent external parameters that are unchanged during the training at 1202. A first type of hyperparameter includes parameters associated with an architecture of the ambient-computing machine-learned module 222, such as a quantity of layers or a quantity of nodes in each layer. A second type of hyperparameter includes parameters associated with the processing the training data, such as a learning rate or a number of epochs. The hyperparameters can be hand selected or can be automatically selected using techniques, such as a grid search, a black box optimization technique. a gradient-based optimization, and so forth.

At 1206, the ambient-computing machine-learned module 222 is evaluated using the test data set. In particular, a two-phase evaluation process is performed. A first phase described at 1208, includes performing a segmented classification task using the ambient-computing machine-learned module 222 and pre-segmented data within the test data set. Instead of using the gesture debouncer 224 to determine the ambient computing event 506, the ambient computing event 506 is determined based on the highest probability provided by the temporal model 704. By performing the segmented classification task, an accuracy, precision, and recall of the ambient-computing machine-learned module 222 can be evaluated.

A second phase described at 1210 includes performing an unsegmented recognition task using the ambient-computing machine-learned module and the gesture debouncer 224. Instead of using the pre-segmented data within the test data set, the unsegmented recognition task is performed using continuous time-series data (or a continuous data stream). By performing the unsegmented recognition task, a detection rate and/or a false positive rate of the ambient-computing machine-learned module 222 can be evaluated. In particular, the unsegmented recognition task can be performed using the positive recordings 1004 to evaluate the detection rate, and the unsegmented recognition task can be performed using the negative recordings 1006 to evaluate the false positive rate. The unsegmented recognition task utilizes the gesture debouncer 224, which enables further tuning of the first threshold 714 and the second threshold 716 to achieve a desired detection rate and a desired false positive rate.

If the results of the segmented classification task and/or the unsegmented recognition task are not satisfactory, one or more elements of the ambient-computing machine-learned module 222 can be adjusted. These elements can include an overall architecture of the ambient-computing machine-learned module 222, adjustments to the training data, and/or adjustments to the hyperparameters. With these adjustments, the training of the ambient-computing machine-learned module 222 can repeat at 1202.

Example Methods

Figure 13:
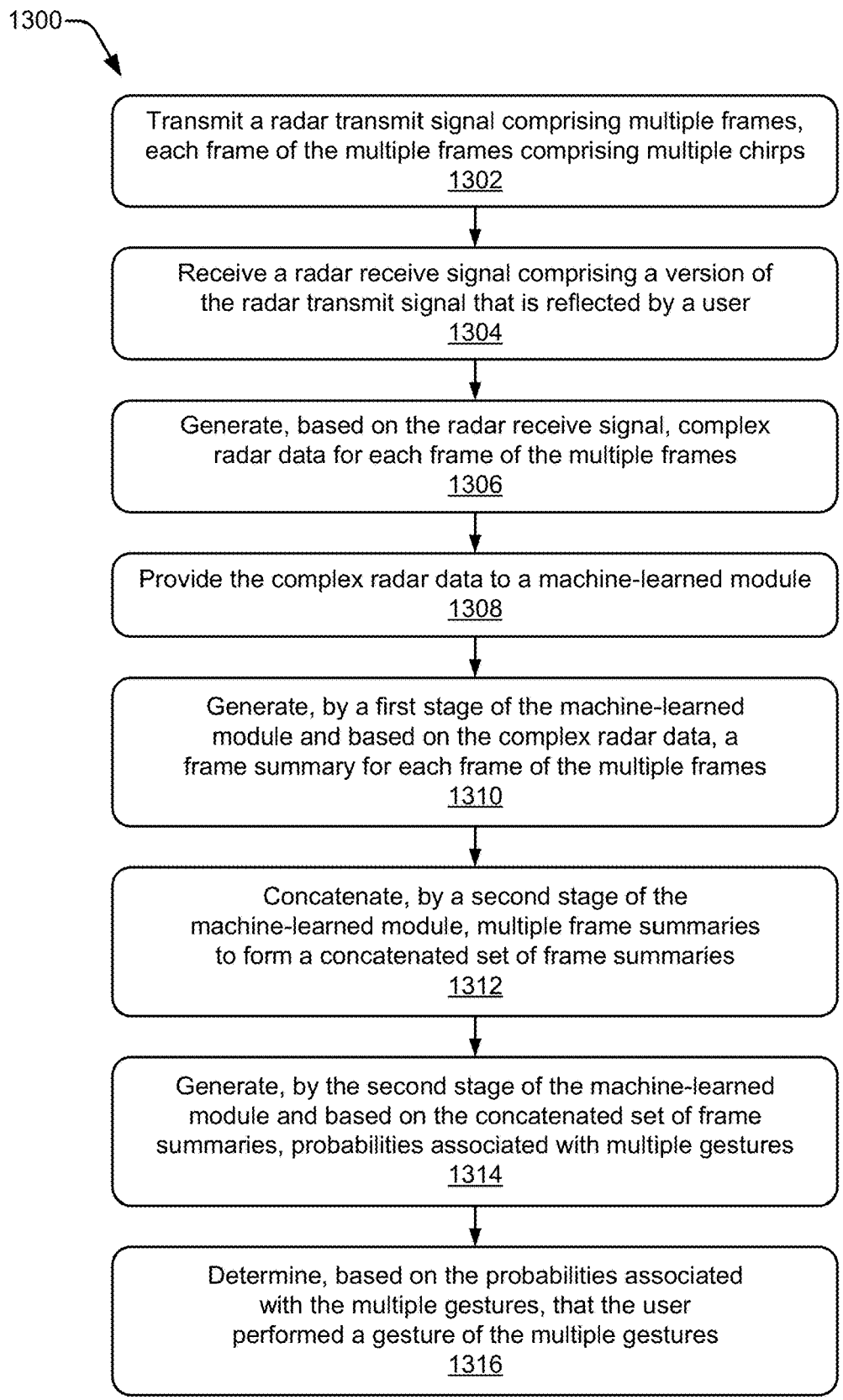
FIG. 13 illustrates an example method for facilitating ambient computing using a radar system.
Figure 14:
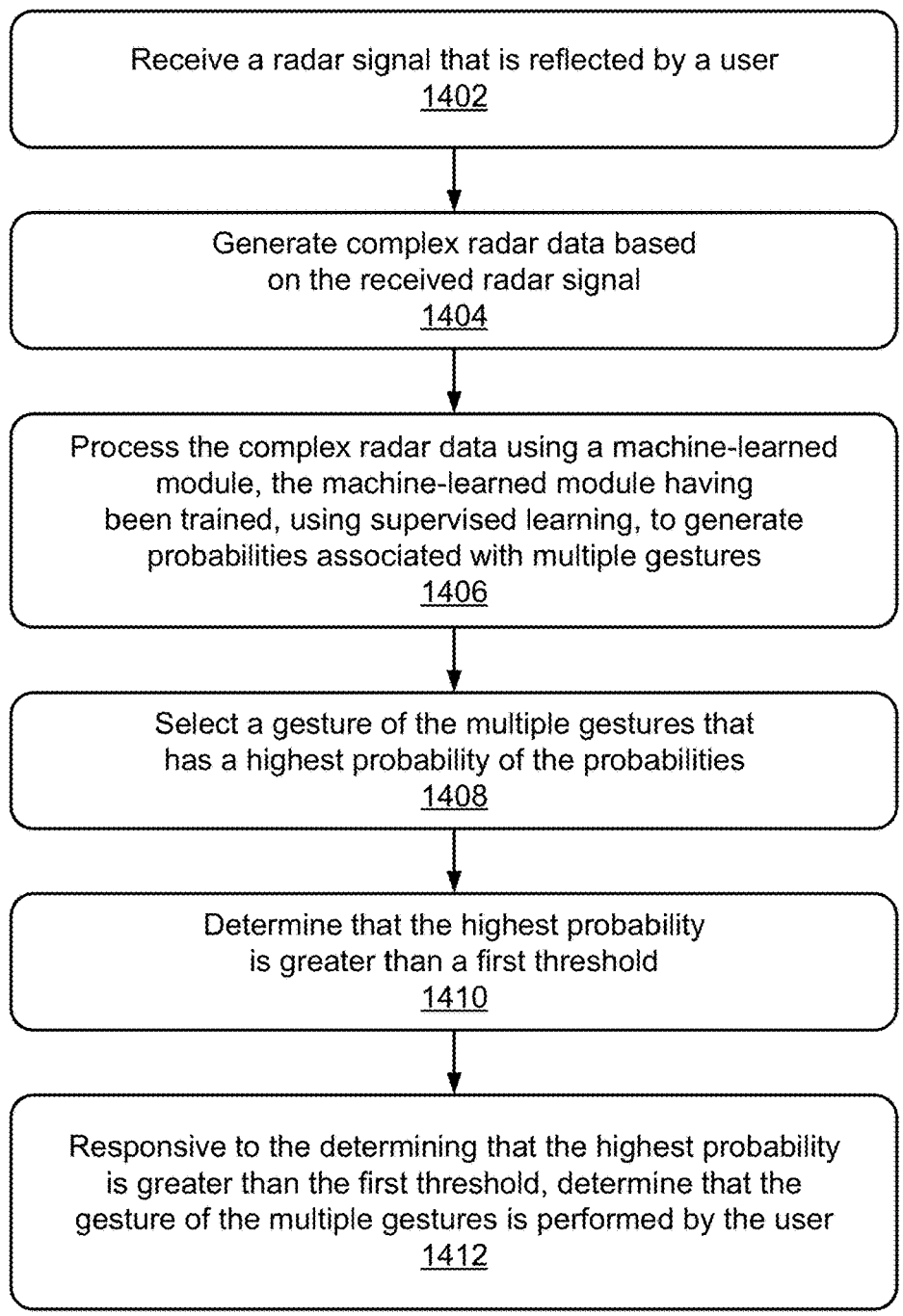
FIG. 14 illustrates another example method for generating radar-based gesture detection events in an ambient compute environment.
Figure 15:
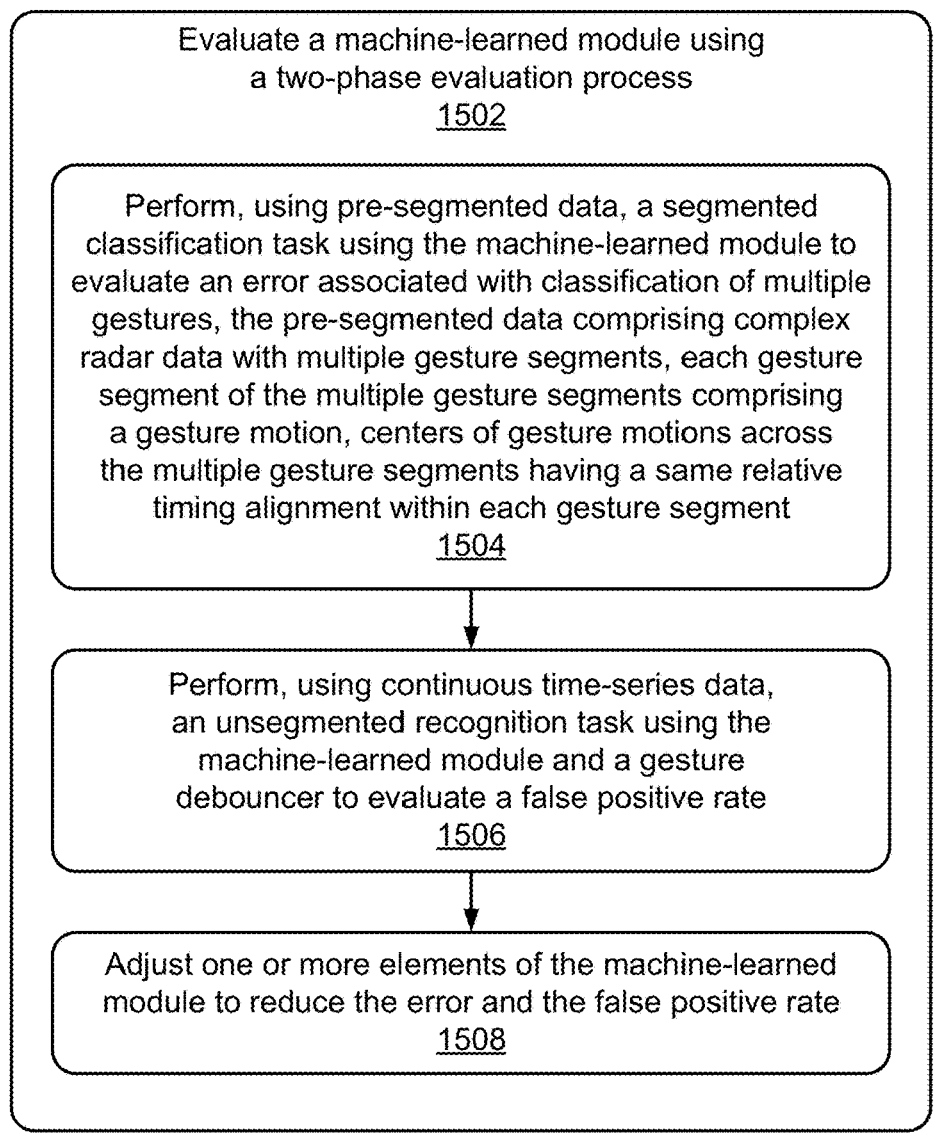
FIG. 15 illustrates an example method for training machine-learned modules to perform radar-based gesture detection in an ambient compute environment.

FIGS. 13 to 15 depict example methods 1300, 1400, and 1500 for implementing aspects of ambient computing using a radar system. Methods 1300, 1400, and 1500 are shown as sets of operations (or acts) performed but not necessarily limited to the order or combinations in which the operations are shown herein. Further, any of one or more of the operations may be repeated, combined, reorganized, or linked to provide a wide array of additional and/or alternate methods. In portions of the following discussion, reference may be made to the environment 100-1 to 100-5 of FIG. 1, and entities detailed in FIGS. 2, 4, 5, and 7-1, reference to which is made for example only. The techniques are not limited to performance by one entity or multiple entities operating on one device.

At 1302 in FIG. 13, a radar transmit signal comprising multiple frames is transmitted. Each frame of the multiple frames comprises multiple chirps. For example, the radar system 102 transmits the radar transmit signal 306, as shown in FIG. 3-1. The radar transmit signal 306 is associated with multiple feature frames 318, as shown in FIG. 3-2. Each feature frame 318 includes multiple chirps 310, which are depicted within the active radar frames 324. The multiple feature frames 318 can correspond to a same gesture frame 316.

At 1304, a radar receive signal comprising a version of the radar transmit signal that is reflected by a user is received. For example, the radar system 102 receives the radar receive signal 308, which represents a version of the radar transmit signal 306 that is reflected by a user (or more generally the object 302), as shown in FIG. 3-1.

At 1306, complex radar data for each frame of the multiple frames is generated based on the radar receive signal. For example, the hardware-abstraction module 220 of the radar system 102 generates complex radar data 502 based on the digital beat signals 428 associated with the radar receive signal 308, as shown in FIG. 6-1. The hardware-abstraction module 220 generates the complex radar data 502 for each feature frame 318 of the multiple feature frames 318. The complex radar data 502 can represent a range-Doppler map 620, as shown in FIG. 6-2.

At 1308, the complex radar data is provided to a machine-learned module. For example, the hardware-abstraction module 220 provides the complex radar data 502 to the ambient-computing machine-learned module 222, as shown in FIG. 7-1.

At 1310, a frame summary for each frame of the multiple frames is generated by a first stage of the machine-learned module and based on the complex radar data. For example, a frame model 702 of the ambient-computing machine-learned module generates a frame summary 706 for each feature frame 318 based on the complex radar data 502, as shown in FIGS. 7-1, 8-2, and 9-1.

At 1312, multiple frame summaries are concatenated by a second stage of the machine-learned module to form a concatenated set of frame summaries. For example, the temporal model 704 concatenates the frame summaries 706-1 to 706-J to form the concatenated set of frame summaries 840, as shown in FIGS. 8-3 and 9-3.

At 1314, probabilities associated with multiple gestures are generated by the second stage of the machine-learned module and based on the concatenated set of frame summaries. For example, the temporal model 704 generates the probabilities 504 based on the concatenated set of frame summaries 840. The probabilities 504 are associated with multiple gestures or multiple gesture classes 710. Example gestures include directional swipes, an omni swipe, and a tap. One of the probabilities 504 can also be associated with a background task or a background class 712.

At 1316, the user is determined to have performed a gesture of the multiple gestures based on the probabilities associated with the multiple gestures. For example, the gesture debouncer 224 determines that the user performed a gesture of the multiple gestures (e.g., detects an ambient computing event 506) based on the probabilities 504. Responsive to determining that the user performed the gesture, the smart device 104 can perform an action associated with the determined gesture.

At 1402 in FIG. 14, a radar receive signal that is reflected by a user is received. For example, the radar system 102 receives the radar receive signal 308, which is reflected by a user (or more generally the object 302), as shown in FIG. 3-1.

At 1404, complex radar data is generated based on the received radar signal. For example, the hardware-abstraction module 220 of the radar system 102 generates complex radar data 502 based on the digital beat signals 428 associated with the radar receive signal 308, as shown in FIG. 6-1. The hardware-abstraction module 220 generates the complex radar data 502 for each feature frame 318 of the multiple feature frames 318. The complex radar data 502 can represent a range-Doppler map 620, as shown in FIG. 6-2.

At 1406, the complex radar data is processed using a machine-learned module. The machine-learned module has been trained, using supervised learning, to generate probabilities associated with multiple gestures. For example, the complex radar data 502 is processed using the ambient-computing machine-learned module 222, as shown in FIG. 5. The ambient-computing machine-learned module 222 has been trained, using supervised learning, to generate probabilities 504 associated with multiple gestures (e.g., multiple gestures classes 710), as shown in FIG. 7-1.

At 1408, a gesture of the multiple gestures that has a highest probability of the probabilities is selected. For example, the gesture debouncer 224 selects a gesture of the multiple gestures that has a highest probability of the probabilities 504. Consider the example probabilities 504 given for gestures frames 316-1 to 316-5 in FIG. 7-2. In this case, the gesture debouncer 224 selects the third probability 504-3 as the highest probability for the gesture frame 316-1. For the gesture frames 316-3 and 316-4, the gesture debouncer 224 selects the second probability 504-2 as the highest probability. For the gesture frame 316-5, the gesture debouncer 224 selects the first probability 504-1 as the highest probability.

At 1410, the highest probability is determined to be greater than a first threshold. For example, the gesture debouncer 224 determines that the highest probability is greater than the first threshold. Consider the example probabilities 504 given for gestures frames 316-1 to 316-5 in FIG. 7-2. In this case, the gesture debouncer 224 determines that the highest probabilities within the gesture frames 316-1 and 316-2 (e.g., probabilities 504-3 and 504-2) are below the first threshold 714. For the gesture frames 316-3 and 316-4, however, the gesture debouncer 224 determines that the highest probability (e.g., probability 504-2) is greater than the first threshold 714.

The first threshold 714 can be predetermined to realize a target responsiveness, a target detection rate, and/or a target false positive rate for the radar system 102. In general, increasing the first threshold 714 decreases the false positive rate of the radar system 102, but can decrease the responsiveness and decrease the detection rate. Likewise, decreasing the first threshold 714 can increase the responsiveness and/or the detection rate of the radar system 102 at the cost of increasing the false positive rate. In this way, the first threshold 714 can be chosen in a manner that optimizes the responsiveness, the detection rate, and the false positive rate of the radar system 102.

At 1412, the user is determined to have performed a gesture of the multiple gestures responsive to the determining that the highest probability is greater than the first threshold. For example, the gesture debouncer 224 determines that the user performed a gesture of the multiple gestures (e.g., detects an ambient computing event 506) responsive to the selecting of the gesture and the determining that the highest probability 504 is greater than the first threshold 714. Responsive to determining that the user performed the gesture, the smart device 104 can perform an action associated with the determined gesture.

Sometimes the gesture debouncer 224 has additional logic for determining that the user perform the gesture. This logic can include determining that the highest probability is greater than the first threshold 714 for more than one consecutive gesture frame 316. Optionally, the gesture debouncer 224 can also require the probabilities 504 to have been less than a second threshold 716 for one or more consecutive gesture frames prior to a current gesture frame in which the highest probability is selected at 1408.

At 1502 in FIG. 15, a machine-learned module is evaluated using a two-phase evaluation process. For example, the ambient-computing machine-learned module 222 is evaluated using the two-phase evaluation process described with respect to FIG. 12.

At 1504, a segmented classification task is performed using pre-segmented data and the machine-learned module to evaluate an error associated with classification of multiple gestures. The pre-segmented data comprises complex radar data with multiple gesture segments. Each gesture segment of the multiple gesture segments comprises a gesture motion. Centers of gesture motions across the multiple gestures segments have a same relative timing alignment within each gesture segment.

For example, the segmented classification task described at 1208 is performed using the pre-segmented data within the test data set. The pre-segmented data comprises complex radar data 502 having multiple gesture segments. Centers of gesture motions within each gesture segment is aligned according to the flow diagram 1026 of FIG. 10-3. The error can represent an error in correctly identifying a gesture performed by a user.

At 1506, an unsegmented recognition task is performed using continuous time-series data, the machine-learned module, and a gesture debouncer to evaluate a false positive rate. For example, the unsegmented recognition task is performed using continuous time-series data, as described at 1210 in FIG. 12. The continuous time-series data is not pre-segmented.

At 1508, one or more elements of the machine-learned module are adjusted to reduce the error and the false positive rate. For example, an overall architecture of the ambient-computing machine-learned module 222, adjustments to the training data, and/or adjustments to the hyperparameters can be adjusted to reduce the error and/or the false positive rate.

Example Computing System

Figure 16:
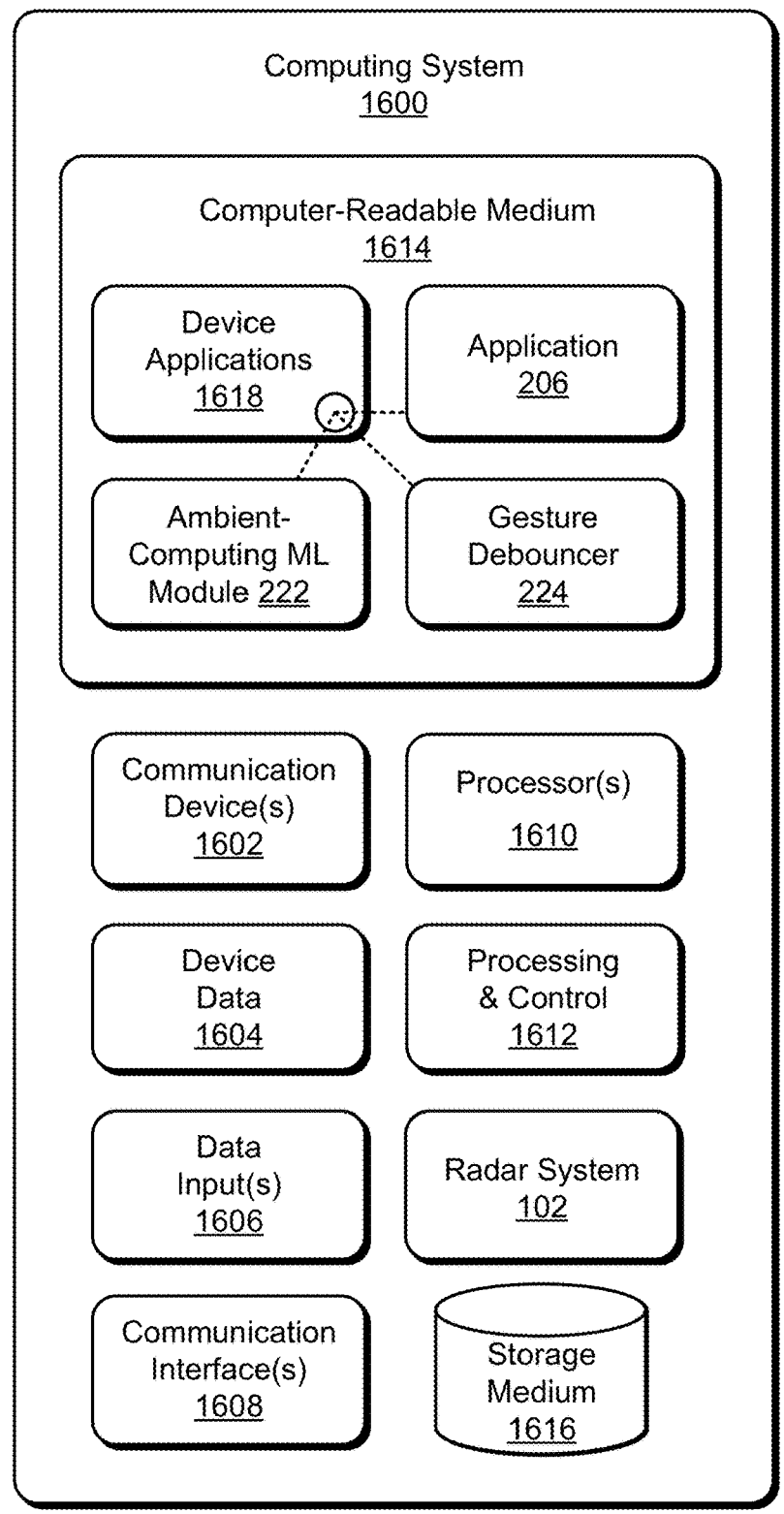
FIG. 16 illustrates an example computing system embodying, or in which techniques may be implemented that enable use of, ambient computing using a radar system.

FIG. 16 illustrates various components of an example computing system 1600 that can be implemented as any type of client, server, and/or computing device as described with reference to the previous FIG. 2 to implement aspects of ambient computing using a radar system 102.

The computing system 1600 includes communication devices 1602 that enable wired and/or wireless communication of device data 1604 (e.g., received data, data that is being received, data scheduled for broadcast, or data packets of the data). The communication devices 1602 or the computing system 1600 can include one or more radar systems 102. The device data 1604 or other device content can include configuration settings of the device, media content stored on the device, and/or information associated with a user of the device. Media content stored on the computing system 1600 can include any type of audio, video, and/or image data. The computing system 1600 includes one or more data inputs 1606 via which any type of data, media content, and/or inputs can be received, such as human utterances, user-selectable inputs (explicit or implicit), messages, music, television media content, recorded video content, and any other type of audio, video, and/or image data received from any content and/or data source.

The computing system 1600 also includes communication interfaces 1608, which can be implemented as any one or more of a serial and/or parallel interface, a wireless interface, any type of network interface, a modem, and as any other type of communication interface. The communication interfaces 1608 provide a connection and/or communication links between the computing system 1600 and a communication network by which other electronic, computing, and communication devices communicate data with the computing system 1600.

The computing system 1600 includes one or more processors 1610 (e.g., any of microprocessors, controllers, and the like), which process various computer-executable instructions to control the operation of the computing system 1600. Alternatively or in addition, the computing system 1600 can be implemented with any one or combination of hardware, firmware, or fixed logic circuitry that is implemented in connection with processing and control circuits which are generally identified at 1612. Although not shown, the computing system 1600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The computing system 1600 also includes a computer-readable medium 1614, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. The disk storage device may be implemented as any type of magnetic or optical storage device, such as a hard disk drive, a recordable and/or rewriteable compact disc (CD), any type of a digital versatile disc (DVD), and the like. The computing system 1600 can also include a mass storage medium device (storage medium) 1616.

The computer-readable medium 1614 provides data storage mechanisms to store the device data 1604, as well as various device applications 1618 and any other types of information and/or data related to operational aspects of the computing system 1600. For example, an operating system 1620 can be maintained as a computer application with the computer-readable medium 1614 and executed on the processors 1610. The device applications 1618 may include a device manager, such as any form of a control application, software application, signal-processing and control module, code that is native to a particular device, a hardware abstraction layer for a particular device, and so on.

The device applications 1618 also include any system components, engines, or managers to implement ambient computing. In this example, the device applications 1618 include the application 206, the ambient-computing machine-learned module 222, and the gesture debouncer 224 of FIG. 2.

Conclusion

Although techniques using, and apparatuses including, facilitating ambient computing using a radar system have been described in language specific to features and/or methods, it is to be understood that the subject of the appended claims is not necessarily limited to the specific features or methods described. Rather, the specific features and methods are disclosed as example implementations of facilitating ambient computing using a radar system.

Some Examples are described below.

Example 1: A method performed by a smart device, the method comprising:
  receiving a radar receive signal comprising a version of the radar transmit signal that is reflected by a user;
  generating, based on the radar receive signal, complex radar data for each frame of the multiple frames;
  providing the complex radar data to a machine-learned module;
  generating, by a first stage of the machine-learned module and based on the complex radar data, a frame summary for each frame of the multiple frames;
  concatenating, by a second stage of the machine-learned module, multiple frame summaries to form a concatenated set of frame summaries;
  generating, by the second stage of the machine-learned module and based on the concatenated set of frame summaries, probabilities associated with multiple gestures; and
  determining, based on the probabilities associated with the multiple gestures, that the user performed a gesture of the multiple gestures.

Example 2: The method of example 1, wherein the generating of the frame summary for each frame comprises:
  formatting the complex radar data into an input tensor having a first dimension associated with a quantity of range bins, a second dimension associated with a quantity of Doppler bins, and a third dimension associated with a quantity of receive channels multiplied by two;
  processing the input tensor using a series of separable residual blocks and max pooling layers to generate the frame summary; and
  storing the frame summary.

Example 3: The method of example 2, wherein the separable residual blocks each comprise:
  a main path comprising separable multi-dimensional convolution layers; and
  a bypass path comprising a multi-dimensional convolution layer.

Example 4: The method of example 2 or 3, further comprising:
  prior to applying the series of separable residual blocks and max pooling layers, reducing a size of the input tensor using an average pooling layer.

Example 5: The method of any previous example, wherein the generating of the probabilities comprises processing, by the machine-learned module, the concatenated set of frame summaries with a series of residual blocks and max pooling layers.

Example 6: The method of example 5, wherein the generating of the probabilities comprises processing, by the machine-learned module, the concatenated set of frame summaries with a dense layer and a softmax layer.

Example 7: The method of any one of examples 1 to 4, wherein the generating of the probabilities comprises processing the concatenated multiple frame summaries with a long short-term memory layer.

Example 8: The method of any previous example, wherein the concatenating of the multiple frame summaries comprises concatenating at least thirty of the multiple frame summaries.

Example 9: The method of any previous example, wherein the determining that the user performed the gesture comprises determining that the gesture has a probability that is greater than a first threshold across at least two first consecutive frames of the multiple frames.

Example 10: The method of example 9, wherein the recognizing that the user performed the gesture comprises determining that the probabilities associated with the multiple gestures are less than a second threshold across at least two second consecutive frames of the multiple frames, the at least two second consecutive frames occurring prior to the at least two first consecutive frames.

Example 11: The method of any previous example, wherein the complex radar data represents complex range-Doppler maps associated with different receive channels.

Example 12: The method of any previous example, wherein the multiple gestures comprise at least two swipe gestures associated with different directions.

Example 13: The method of example 12, wherein the multiple gestures further comprise a tap gesture.

Example 14: The method of any previous example, wherein the generating of the probabilities comprises:
  generating the probabilities associated with the multiple gestures; and
  generating another probability associated with a background task.

Example 15: The method of any previous example, wherein the gesture is performed at a distance of approximately 1.5 meters from the radar system.

Example 16: A method comprising:
  transmitting a radar transmit signal comprising at least one gesture frame, the gesture frame comprising multiple feature frames, each feature frame of the multiple feature frames comprising multiple radar frames, each radar frame of the multiple radar frames associated with a chirp, each chirp comprising a portion of the radar transmit signal that is modulated in frequency;

receiving, using multiple receive channels, a radar receive signal comprising a version of the radar transmit signal that is reflected by a user;

generating, based on the radar receive signal, complex radar data for each feature frame of the multiple feature frames, the complex radar data comprising complex numbers having magnitude and phase information, each complex number of the complex numbers associated with a range interval, a Doppler-frequency interval, and a receive channel of the multiple receive channels;

providing the complex radar data to a machine-learned module, the machine-learned module having a first stage associated with a frame model and a second stage associated with a temporal model;

generating, by the frame model of the machine-learned module, a frame summary for each feature frame of the multiple feature frames, the frame summary being a one-dimensional representation of the complex radar data associated with a corresponding feature frame;

concatenating, by the temporal model of the machine-learned module and for the at least one gesture frame, frame summaries of the multiple feature frames to form a concatenated set of frame summaries;

generating, by the temporal model of the machine-learned module and based on the concatenated set of frame summaries, probabilities respectively associated with multiple gestures; and determining, based on the probabilities associated with the multiple gestures, that the user performed a gesture of the multiple gestures.

Example 17: A system comprising a radar system and a processor, the system configured to perform any one of the methods of examples 1 to 16.

Example 18: A computer-readable storage medium comprising instructions that, responsive to execution by a processor, cause a system to perform any one of the methods of examples 1 to 16.

Example 19: A smart device comprising a radar system and a processor, the smart device configured to perform any one of the methods of examples 1 to 16.

Example 20: The smart device of example 19, wherein the smart device comprises:
a smartphone;
a smart watch;
a smart speaker;
a smart thermostat;
a security camera;
a gaming system; or
a household appliance.

Example 21: The smart device of example 19, wherein the radar system is configured to consume less than twenty milliwatts of power.

Example 22: The smart device of example 19, wherein the radar system is configured to operate using frequencies associated with millimeter wavelengths.

Example 23: The smart device of example 19, wherein the radar system is configured to transmit and receive radar signals over a time period of at least one hour.

Example 24: A method comprising:
receiving a radar signal that is reflected by a user;
generating complex radar data based on the received radar signal;
processing the complex radar data using a machine-learned module, the machine-learned module having been trained, using supervised learning, to generate probabilities associated with multiple gestures;
selecting a gesture of the multiple gestures that has a highest probability of the probabilities;
determining that the highest probability is greater than a first threshold; and
responsive to the determining that the highest probability is greater than the first threshold, determining that the gesture of the multiple gestures is performed by the user.

Example 25: The method of example 24, wherein the first threshold is associated with a target false positive rate of a radar system.

Example 26: The method of example 24 or 25, wherein:
the receiving of the radar signal comprises receiving multiple gesture frames of the radar receive signal; and
the determining that the gesture of the multiple gestures is performed comprises determining that the gesture is performed based on a probability of the gesture being greater than the first threshold across at least two first consecutive gesture frames of the multiple gesture frames.

Example 27: The method of example 26, wherein:
the multiple gesture frames comprise multiple feature frames; and
each feature frame of the multiple feature frames comprises multiple chirps of the radar signal.

Example 28: The method of any one of examples 24-27, further comprising:
receiving a second radar signal that is reflected by the user;
generating second complex radar data based on the second radar signal;
processing the second complex radar data using the machine-learned module;
generating, by the machine-learned module and based on the second complex radar data, second probabilities associated with the multiple gestures;
selecting a second gesture of the multiple gestures that has a highest probability of the second probabilities;
determining that the highest probability is less than the first threshold; and
responsive to the determining that the highest probability is less than the first threshold, determining that the user did not perform the second gesture.

Example 29: The method of any one of examples 24-28, further comprising:
receiving a third radar signal that is reflected by the user;
generating third complex radar data based on the third radar signal;
processing the third complex radar data using the machine-learned module;
generating, by the machine-learned module, third probabilities based on the third complex radar data, the third probabilities including the probabilities associated with the multiple gestures and another probability associated with a background task;
determining that the other probability associated with the background task is a highest probability of the third probabilities; and
responsive to the determining that the other probability associated with the background task is the highest probability, determining that the user did not perform a third gesture of the multiple gestures.

Example 30: The method of any one of examples 24-29, further comprising:
responsive to determining that the gesture is performed, temporarily preventing recognition of a subsequent gesture until the probabilities associated with the multiple gestures are less than a second threshold.

Example 31: The method of example 30, wherein:
the receiving of the radar signal comprises receiving multiple gesture frames of the radar receive signal; and
the preventing recognition of the subsequent gesture comprises temporarily preventing recognition of the subsequent gesture until the probabilities of the multiple gestures are less than the second threshold across at least two second consecutive frames of the multiple gesture frames.

Example 32: The method of any one of examples 24-31, wherein:
the multiple gestures are associated with respective gesture classes; and
the gesture classes are mutually exclusive.

Example 33: The method of example 32, wherein:
the probabilities comprise the probabilities associated with the multiple gestures and another probability associated with a background task; and
a summation of the probabilities is equal to one.

Example 34: The method of any one of examples 24-33, wherein the multiple gestures comprise at least two swipe gestures associated with different directions.

Example 35: The method of example 34, wherein the multiple gestures further comprise a tap gesture.

Example 36: The method of any one of examples 24-35, wherein the complex radar data represents complex range-Doppler maps associated with different receive channels.

Example 37: The method of any one of examples 24-36, wherein:
the radar signal comprises multiple frames, each frame of the multiple frames comprising multiple chirps; and
the processing the complex radar data using the machine-learned module comprises:
generating, by a first stage of the machine-learned module and based on the complex radar data, a frame summary for each frame of the multiple frames;
concatenating, by a second stage of the machine-learned module, multiple frame summaries to form a concatenated set of frame summaries; and
generating, by the second stage of the machine-learned module and based on the concatenated set of frame summaries, the probabilities associated with the multiple gestures.

Example 38: The method of any one of examples 24-37, wherein the gesture is performed at a distance of approximately 1.5 meters from the radar system.

Example 39: A method comprising:
receiving, using multiple receive channels, a radar signal that is reflected by a user, the radar signal comprising at least one gesture frame, the gesture frame comprising multiple feature frames, each feature frame of the multiple feature frames comprising multiple radar frames, each radar frame of the multiple radar frames associated with a chirp, each chirp comprising a portion of the radar transmit signal that is modulated in frequency;
generating, based on the received radar signal, complex radar data for each feature frame of the multiple feature frames, the complex radar data comprising complex numbers having magnitude and phase information, each complex number of the complex numbers associated with a range interval, a Doppler-frequency interval, and a receive channel of the multiple receive channels;
processing the complex radar data using a machine-learned module, the machine-learned module having been trained, using supervised learning, to generate probabilities associated with multiple gestures for each gesture frame of the at least one gesture frame;
selecting a gesture of the multiple gestures that has a highest probability of the probabilities within each gesture frame;
comparing the highest probability to a first threshold for each gesture frame;
determining that the highest probability is greater than the first threshold; and
responsive to determining that the highest probability is greater than the first threshold, determining that the gesture of the multiple gestures is performed by the user.

Example 40: A system comprising a radar system and a processor, the system configured to perform any one of the methods of examples 24-39.

Example 41: A computer-readable storage medium comprising instructions that, responsive to execution by a processor, cause a system to perform any one of the methods of examples 24-39.

Example 42: A smart device comprising a radar system and a processor, the smart device configured to perform any one of the methods of examples 24-39.

Example 43: The smart device of example 42, wherein the smart device comprises:
a smartphone;
a smart watch;
a smart speaker;
a smart thermostat;
a security camera;
a gaming system; or
a household appliance.

Example 44: The smart device of example 42, wherein the radar system is configured to consume less than twenty milliwatts of power.

Example 45: The smart device of example 42, wherein the radar system is configured to operate using frequencies associated with millimeter wavelengths.

Example 46: The smart device of example 42, wherein the radar system is configured to transmit and receive radar signals over a time period of at least one hour.

Example 47: A method for training a machine-learned module, the method comprising:
evaluating the machine-learned module using a two-phase evaluation process, the evaluating comprising:
performing, using pre-segmented data, a segmented classification task using the machine-learned module to evaluate an error associated with classification of multiple gestures, the pre-segmented data comprising complex radar data having multiple gesture segments, each gesture segment of the multiple gesture segments comprising a gesture motion, centers of gesture motions across the multiple gesture segments having a same relative timing alignment within each gesture segment;
performing, using continuous time-series data, an unsegmented recognition task using the machine-learned module to evaluate a false positive rate, the continuous time-series data comprising other complex radar data; and adjusting one or more elements of the machine-learned module to reduce the error and the false positive rate.

Example 48: The method of example 47, wherein the continuous time-series data is not segmented in time.

Example 49: The method of example 47 or 48, wherein the continuous time-series data comprises negative recordings associated with at least one user moving naturally or performing repetitive motions that are similar to the multiple gestures.

Example 50: The method of any one of examples 47-49, further comprising:
training internal parameters of the machine-learned module using second pre-segmented data prior to the evaluating of the machine-learned module; and
optimizing hyperparameters of the machine-learned module using third pre-segmented data prior to the evaluating of the machine-learned module.

Example 51: The method any one of examples 47-50, further comprising:
applying a random offset to the pre-segmented data and the continuous time-series data prior to evaluating the machine-learned module.

Example 52: The method of example 51, wherein the applying of the random offset comprises at least one of the following:
applying a phase rotation to the complex radar data; or
applying magnitude scaling to the complex radar data.

Example 53: The method of any one of examples 47-52, further comprising:
generating the pre-segmented data prior to performing the segmented classification task, the generating of the pre-segmented data comprising:
detecting a center of a gesture motion within each gesture segment of a positive recording;
aligning a timing window based on the detected center of the gesture motion; and
resizing the gesture segment based on the timing window to generate the pre-segmented data.

Example 54: The method of example 53, wherein the detecting the center of the gesture motion comprises detecting a zero-Doppler crossing within each gesture segment of the positive recording.

Example 55: The method of any one of examples 47-54, wherein the pre-segmented data comprises:
positive recordings associated with at least one user performing the multiple gestures; and
negative recordings associated with the at least one user moving naturally or performing repetitive motions that are similar to the multiple gestures.

Example 56: The method of example 55, wherein the positive recordings and the negative recordings comprise the complex radar data recorded by a radar system.

Example 57: The method of example 56, wherein the complex radar data represents complex range-Doppler maps associated with multiple receive channels.

Example 58: The method of any one of examples 56 or 57, wherein the positive recordings are associated with the at least one user performing each gesture of the multiple gestures multiple times at different distances from the radar system.

Example 59: The method of any one of examples 56 to 58, wherein the positive recordings are associated with the at least one user performing each gesture of the multiple gestures multiple times at different angles relative to the radar system.

Example 60: The method of any one of examples 47-59, wherein the error represents a situation in which the machine-learned module incorrectly classifies a gesture performed by a user or incorrectly classifies a background motion performed by the user as a gesture.

Example 61: The method of any one of examples 47-60, further comprising:
performing another unsegmented recognition task to evaluate a detection rate; and
adjusting the one or more elements to increase the detection rate.

Example 62: A system comprising a radar system and a processor, the processor configured to process complex radar data generated by the radar system according to a machine-learned module having been trained according to any one of the methods of examples 47-61.

Example 63: A computer-readable storage medium comprising instructions that, responsive to execution by a processor, cause a system to perform any one of the methods of examples 47-61.

Example 64: A smart device comprising a radar system and a processor, the processor configured to process complex radar data generated by the radar system according to a machine-learned module having been trained according to any one of the methods of examples 47-61

Example 65: The smart device of example 64, wherein the smart device comprises:
a smartphone;
a smart watch;
a smart speaker;
a smart thermostat;
a security camera;
a gaming system; or
a household appliance.

Example 66: The smart device of example 64, wherein the radar system is configured to consume less than twenty milliwatts of power.

Example 67: The smart device of example 64, wherein the radar system is configured to operate using frequencies associated with millimeter wavelengths.

Example 68: The smart device of example 64, wherein the radar system is configured to transmit and receive radar signals over a time period of at least one hour.

What is claimed is:

1. A method comprising:
transmitting a radar transmit signal comprising multiple frames, each frame of the multiple frames comprising multiple chirps;
receiving a radar receive signal comprising a version of the radar transmit signal that is reflected by a user;
generating, based on the radar receive signal, complex radar data for each frame of the multiple frames;
providing the complex radar data to a machine-learned module;
processing, by a first stage of the machine-learned module, the complex radar data across a spatial domain on a frame-by-frame basis;
generating, by the first stage of the machine-learned module and based on the processing of the complex radar data, a frame summary for each frame of the multiple frames, the frame summary being a one-dimensional representation of the complex radar data associated with a corresponding frame of the multiple frames;
concatenating, by a second stage of the machine-learned module, multiple frame summaries to form a concatenated set of frame summaries;

processing, by the second stage of the machine-learned module, the concatenated set of frame summaries across a temporal domain;

generating, by the second stage of the machine-learned module and based on the processing of the concatenated set of frame summaries, probabilities associated with multiple gestures; and determining, based on the probabilities associated with the multiple gestures, that the user performed a gesture of the multiple gestures.

2. The method of claim 1, wherein the generating of the frame summary for each frame comprises:

formatting the complex radar data into an input tensor having a first dimension associated with a quantity of range bins, a second dimension associated with a quantity of Doppler bins, and a third dimension associated with a quantity of receive channels multiplied by two;

processing the input tensor using a series of separable residual blocks and max pooling layers to generate the frame summary; and storing the frame summary.

3. The method of claim 2, wherein the separable residual blocks each comprise:

a main path comprising separable multi-dimensional convolution layers; and a bypass path comprising a multi-dimensional convolution layer.

4. The method of claim 2, further comprising:

prior to applying the series of separable residual blocks and max pooling layers, reducing a size of the input tensor using an average pooling layer.

5. The method of claim 1, wherein the generating of the probabilities comprises processing, by the machine-learned module, the concatenated set of frame summaries with a series of residual blocks and max pooling layers.

6. The method of claim 5, wherein the generating of the probabilities comprises processing, by the machine-learned module, the concatenated set of frame summaries with a dense layer and a softmax layer.

7. The method of claim 1, wherein the generating of the probabilities comprises processing the concatenated multiple frame summaries with a long short-term memory layer.

8. The method of claim 1, wherein the concatenating of the multiple frame summaries comprises concatenating at least thirty of the multiple frame summaries.

9. The method of claim 1, wherein the determining that the user performed the gesture comprises determining that the gesture has a probability that is greater than a first threshold across at least two first consecutive frames of the multiple frames.

10. The method of claim 9, wherein the recognizing that the user performed the gesture comprises determining that the probabilities respectively associated with the multiple gestures are less than a second threshold across at least two second consecutive frames of the multiple frames, the at least two second consecutive frames occurring prior to the at least two first consecutive frames.

11. The method of claim 1, wherein the complex radar data represents complex range-Doppler maps associated with different receive channels.

12. The method of claim 1, wherein the multiple gestures comprise at least two swipe gestures associated with different directions.

13. The method of claim 12, wherein the multiple gestures further comprise a tap gesture.

14. The method of claim 1, wherein the generating of the probabilities comprises:

generating the probabilities respectively associated with the multiple gestures; and generating another probability associated with a background task.

15. A method comprising:

transmitting a radar transmit signal comprising at least one gesture frame, the gesture frame comprising multiple feature frames, each feature frame of the multiple feature frames comprising multiple radar frames, each radar frame of the multiple radar frames associated with a chirp, each chirp comprising a portion of the radar transmit signal that is modulated in frequency;

receiving, using multiple receive channels, a radar receive signal comprising a version of the radar transmit signal that is reflected by a user;

generating, based on the radar receive signal, complex radar data for each feature frame of the multiple feature frames, the complex radar data comprising complex numbers having magnitude and phase information, each complex number of the complex numbers associated with a range interval, a Doppler-frequency interval, and a receive channel of the multiple receive channels;

providing the complex radar data to a machine-learned module, the machine-learned module having a first stage associated with a frame model and a second stage associated with a temporal model;

processing, by the frame model of the machine-learned module, the complex radar data across a spatial domain on a feature-frame-by-feature-frame basis;

generating, by the frame model of the machine-learned module and based on the processing of the complex radar data, a frame summary for each feature frame of the multiple feature frames, the frame summary being a one-dimensional representation of the complex radar data associated with a corresponding feature frame;

concatenating, by the temporal model of the machine-learned module and for the at least one gesture frame, frame summaries of the multiple feature frames to form a concatenated set of frame summaries;

processing, by the temporal model of the machine-learned module, the concatenated set of frame summaries across a temporal domain on a gesture-frame-basis:

generating, by the temporal model of the machine-learned module and based on the processing of the concatenated set of frame summaries, probabilities respectively associated with multiple gestures; and determining, based on the probabilities associated with the multiple gestures, that the user performed a gesture of the multiple gestures.

16. A smart device comprising a radar system configured to:

transmit a radar transmit signal comprising multiple frames, each frame of the multiple frames comprising multiple chirps;

receive a radar receive signal comprising a version of the radar transmit signal that is reflected by a user;

generate, based on the radar receive signal, complex radar data for each frame of the multiple frames;

provide the complex radar data to a machine-learned module;

process, by a first stage of the machine-learned module, the complex radar data across a spatial domain on a frame-by-frame basis;

generate, by the first stage of the machine-learned module and based on the processing of the complex radar data, a frame summary for each frame of the multiple frames, the frame summary comprising a one-dimensional representation of the complex radar data associated with a corresponding frame of the multiple frames;

concatenate, by a second stage of the machine-learned module, multiple frame summaries to form a concatenated set of frame summaries;

process, by the second stage of the machine-learned module, the concatenated set of frame summaries across a temporal domain;

generate, by the second stage of the machine-learned module and based on the processing of the concatenated set of frame summaries, probabilities associated with multiple gestures; and determine, based on the probabilities associated with the multiple gestures, that the user performed a gesture of the multiple gestures.

17. The smart device of claim 16, wherein the smart device comprises:
   a smartphone;
   a smart watch;
   a smart speaker;
   a smart thermostat;
   a security camera;
   a gaming system; or
   a household appliance.

18. The smart device of claim 16, wherein the radar system is configured to consume less than twenty milliwatts of power.

19. The smart device of claim 16, wherein the radar system is configured to operate using frequencies associated with millimeter wavelengths.

20. The smart device of claim 16, wherein the radar system is configured to transmit and receive radar signals over a time period of at least one hour.

* * * * *

UNITED STATES PATENT AND TRADEMARK OFFICE
CERTIFICATE OF CORRECTION

PATENT NO. : 12,265,666 B2  
APPLICATION NO. : 18/554337  
DATED : April 1, 2025  
INVENTOR(S) : Eiji Hayashi et al.

Page 1 of 1

It is certified that error appears in the above-identified patent and that said Letters Patent is hereby corrected as shown below:

In the Claims

Column 46, Lines 46-47, after "on a" before "generating," delete "gesture-frame-basis:" add --gesture-frame-basis;--

Signed and Sealed this  
Sixth Day of May, 2025

Coke Morgan Stewart  
*Acting Director of the United States Patent and Trademark Office*